United States Patent
Lamb et al.

(10) Patent No.: US 10,570,066 B2
(45) Date of Patent: *Feb. 25, 2020

(54) AGRICULTURAL COMPOSITIONS AND APPLICATIONS UTILIZING MINERAL COMPOUNDS

(71) Applicant: Ralco Nutrition, Inc., Marshall, MN (US)

(72) Inventors: Richard Dale Lamb, Balaton, MN (US); Mike David Johnson, Balaton, MN (US)

(73) Assignee: RALCO NUTRITION, INC., Marshall, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,241

(22) Filed: Sep. 4, 2018

(65) Prior Publication Data

US 2018/0370866 A1  Dec. 27, 2018

Related U.S. Application Data

(63) Continuation of application No. 14/689,991, filed on Apr. 17, 2015, now abandoned.

(60) Provisional application No. 61/980,804, filed on Apr. 17, 2014.

(51) Int. Cl.
| | |
|---|---|
| C05D 9/02 | (2006.01) |
| C05G 3/02 | (2006.01) |
| C05G 3/06 | (2006.01) |
| A01C 1/06 | (2006.01) |

(52) U.S. Cl.
CPC .............. *C05D 9/02* (2013.01); *A01C 1/06* (2013.01); *C05G 3/02* (2013.01); *C05G 3/06* (2013.01)

(58) Field of Classification Search
None
See application file for complete search history.

(56) References Cited

U.S. PATENT DOCUMENTS

| | | |
|---|---|---|
| 3,198,635 A | 8/1965 | Anderson |
| 3,388,989 A | 6/1968 | Kamil |
| 3,900,572 A | 8/1975 | Peer |
| 3,914,438 A | 10/1975 | Holt |
| 3,983,214 A | 9/1976 | Misato |
| 4,009,263 A | 2/1977 | Shafer |
| 4,009,264 A | 2/1977 | Mizutani |
| 4,319,910 A | 3/1982 | Meyer |
| 4,326,523 A | 4/1982 | Wolfrom et al. |
| 4,551,164 A | 11/1985 | Tenzer |
| 5,110,965 A | 5/1992 | Thunberg et al. |
| 5,186,738 A | 2/1993 | Wendt et al. |
| 5,504,055 A | 4/1996 | Hsu |
| 5,591,878 A | 1/1997 | Nelson et al. |
| 5,707,679 A | 1/1998 | Nelson |
| 5,759,226 A | 6/1998 | Harold |
| 5,797,976 A | 8/1998 | Yamashita |
| 5,846,581 A | 12/1998 | Catron |
| 5,882,685 A | 3/1999 | Ashmead |
| 6,033,689 A | 3/2000 | Waterman et al. |
| 6,293,045 B1 | 9/2001 | Morgan |
| 6,352,706 B1 | 3/2002 | Puritch |
| 2001/0001996 A1 | 5/2001 | Shirataki et al. |
| 2001/0015363 A1 | 8/2001 | Rahmey |
| 2001/0019996 A1 | 9/2001 | Soula et al. |
| 2004/0050126 A1 | 3/2004 | Green |
| 2004/0097372 A1 | 5/2004 | Abraham et al. |
| 2004/0121914 A1 | 6/2004 | Catalano |
| 2004/0228928 A1 | 11/2004 | Zeigler |
| 2005/0281792 A1 | 12/2005 | Short et al. |
| 2006/0084573 A1 | 4/2006 | Grech |
| 2006/0165824 A1 | 7/2006 | Khambe |
| 2006/0168881 A1 | 8/2006 | Straumietis |
| 2006/0240984 A1 | 10/2006 | Pallett et al. |
| 2007/0065413 A1 | 3/2007 | Castillo |
| 2007/0232693 A1 | 10/2007 | Abou-Nemeh |
| 2008/0033196 A1 | 2/2008 | Goh et al. |

(Continued)

FOREIGN PATENT DOCUMENTS

| | | |
|---|---|---|
| CA | 2278383 | 1/2001 |
| CA | 2718211 | 9/2009 |

(Continued)

OTHER PUBLICATIONS

Extended European Search Report for European Application No. 13813126.3 dated Nov. 12, 2015, 7 pages.
"Communication pursuant to Article 94(3) EPC", related European Application No. 13813126.3, dated Mar. 1, 2017, 3 pages.
"EPO Translation of Umizaki, JP2000226303, assessed on Apr. 7, 2015".
"Role of Chelated Trace Minerals in Animal Production", Sep. 30, 2002, 2 pages.
"SMART! Chelate Fertilizers", http://www.smart-fertilizer.com/articles/chelate-fertilizers, Aug. 29, 2007, retrieved online Mar. 18, 2013, 1 page.
"Standard Process, Manganese B12", https://www.standardprocess.com/Standard-Process-Document-Library/Product-Detail-Sheets/maganeseb125490.pdf, Apr. 15, 1999, 2 pages.

(Continued)

*Primary Examiner* — Alton N Pryor
(74) *Attorney, Agent, or Firm* — Billion & Armitage; Benjamin C. Armitage

(57) ABSTRACT

Embodiments provide inorganic mineral chelated compositions, inorganic and organic salts of minerals, cobalt compounds and compositions, and treatment compositions, and methods of making and using the same. Mineral chelated compositions in combination with mineral salts have been shown to improve plant health, plant emergence, crop yield, plant health consistency, consistent or time-released bioavailability of nutrients in and around a plant, seed, or soil, plant resistance to disease and drought, and microbial catalysis. The compositions described herein can be applied directly to seeds, soil, or plants, or they can be incorporated with existing agricultural treatments and processes, reducing cost and time for farmers to implement the methods described herein. Compositions described herein may also be combined with other commercial products to enhance the efficacy thereof.

20 Claims, 36 Drawing Sheets

(56) References Cited

U.S. PATENT DOCUMENTS

| | | |
|---|---|---|
| 2008/0314107 A1 | 12/2008 | Ettlin et al. |
| 2009/0126719 A1 | 5/2009 | Almagro |
| 2009/0133456 A1 | 5/2009 | Zapata et al. |
| 2009/0252827 A1 | 10/2009 | Baginski |
| 2009/0306121 A1 | 12/2009 | Cook et al. |
| 2009/0308121 A1 | 12/2009 | Reddy et al. |
| 2010/0311583 A1 | 12/2010 | Laurent et al. |
| 2011/0152363 A1 | 6/2011 | Knochenmus et al. |
| 2011/0201649 A1 | 8/2011 | Matsuzaki et al. |
| 2014/0011675 A1 | 1/2014 | Knochenmus |
| 2014/0026629 A1 | 1/2014 | Knochenmus |
| 2015/0299058 A1 | 10/2015 | Lamb et al. |

FOREIGN PATENT DOCUMENTS

| | | |
|---|---|---|
| CA | 2718211 A1 | 9/2009 |
| CL | 44783 | 10/2009 |
| CN | 1104625 A | 7/1995 |
| CN | 1344136 A | 4/2002 |
| CN | 1636459 A | 7/2005 |
| CN | 1824606 A | 8/2006 |
| CN | 101496556 A | 8/2009 |
| CN | 102584488 A | 7/2012 |
| CN | 102781254 | 11/2012 |
| CN | 103588564 A | 2/2014 |
| CN | 103708970 A | 4/2014 |
| EP | 0945065 A1 | 9/1999 |
| EP | 1795516 A1 | 6/2007 |
| EP | 3131865 A1 | 2/2017 |
| GB | 1500326 A | 2/1978 |
| JP | 2000-226303 A | 8/2000 |
| KR | 100480681 B1 | 4/2005 |
| RU | 2268868 C2 | 1/2006 |
| WO | 199821166 | 5/1998 |
| WO | 9926898 A1 | 6/1999 |
| WO | 2001038262 A1 | 5/2001 |
| WO | 200221930 A1 | 3/2002 |
| WO | 2007/069072 A2 | 6/2007 |
| WO | 2009138761 | 11/2009 |
| WO | 2011078891 A1 | 6/2011 |
| WO | 2014008472 A1 | 1/2014 |
| WO | 2014008472 A2 | 1/2014 |
| WO | 2015161269 A1 | 10/2015 |

OTHER PUBLICATIONS

AU2010333959, "Office Action for corresponding Australian Application No. 2010333959", dated Jun. 21, 2013, 4 pages.

CN201080063204.X, "Office Action for corresponding Chinese Application No. 201080063204.X", dated Apr. 8, 2013, 45 pages.

Das, et al., "Biosorption of heavy metals—An overview", Indian Journal of Biotechnology, vol. 7, Apr. 2008, pp. 159-169.

Deepatana, et al., "Steric hindrance effect on adsorption of metal-organic complexes onto aminophosphonate chelating resin", Desalination, vol. 218, 2008, pp. 297-303.

Farooq, et al., "Micronutrient application through seed treatments—a review", Journal of Soil Science and Plant Nutrition, vol. 12 (1), 2012, pp. 1-14.

Furia, "Stability constants (I0g K1) of Various Metal Chelates", CRC Handbook of Food Additives <http://www.coldcure.com/html/stability_constants.html>, Oct. 26, 2006, 9 pages.

Gad, et al., "Barley response to salt stress at varied levels of cobalt II. Some physiological and chemical characteristics", Journal of Applied Sciences Research, vol. 7 (11), 2011, pp. 1447-1453.

Gad, et al., "Influence of cobalt and phosphorus on growth, yield quantity and quality of sweet potato (*Ipomoea batatas* L)", Journal of Applied Sciences Research, vol. 7 (11), 2011, pp. 1501-1506.

Gad, et al., "Influence of cobalt and phosphorus uptake, growth and yield of tomato", Agriculture and Biology Journal of North America, vol. 1 (5), 2010, pp. 1069-1075.

Gad, et al., "Maximizing the tolerance of wheat plants to soil salinity using cobalt 2—some physiological and chemical characteristics", Journal of Applied Sciences Research, vol. 7 (11), 2011, pp. 1551-1557.

Hamza, et al., "Biostimulants: Myths and Realities", Turf Grass Trends, 2001, pp. 6-10.

Jaleel, et al., "Effect of soil applied cobalt on activities of antioxidant enzymes in Arachis hypogaea", Global Journal of Molecular Sciences, vol. 3 (2), 2008, pp. 42-45.

Jaleel, et al., "Low concentration of cobalt increases growth, biochemical constituents, mineral status and yield in *Zea mays*", Journal of Scientific Research, vol. 1 (1), 2009, pp. 128-137.

Jayakumar, et al., "Changes in growth, biochemical constituents, and antioxidant potentials in radish (*Raphanus sativus* L) under cobalt stress", Turk. J. Biol., vol. 31, 2007, pp. 127-136.

Jayakumar, et al., "Uptake and accumulation of cobalt in plants: a study based on exogenous cobalt in soybean", Botany Research International, vol. 2 (4), 2009, pp. 310-314.

Johnson, et al., "A cobalt requirement for symbiotic growth of azolla filiculoides in the absence of combined nitrogen", Plant Physiol., vol. 41, 1966, pp. 852-855.

Long, et al., "Effect of multi-element organic complex fertilizer on increasing the yields of cole plant", Southwest China Journal of Agricultural Sciences, vol. 17 (4), Dec. 2004, 538-540.

NZ601352, "Office Action for corresponding New Zealand Application No. 601352", dated Mar. 12, 2013, 3 pages.

Palit, et al., "Effects of cobalt on plants", The Botanical Review, vol. 60 (2), Apr.-Jun. 1994, pp. 149-181.

PCT/US2010/041848, "International Preliminary Report on Patentability for corresponding International Application No. PCT/US2010/041848", dated Jun. 26, 2012, 6 pages.

PCT/US2010/041848, "International Search Report", for corresponding International Application No. PCT/US2010/041848, dated Feb. 23, 2011, 5 pages.

PCT/US2010/041848, "International Search Report and Written Opinion", dated Feb. 23, 2011, 10 pages.

PCT/US2010/041848, "Written Opinion", for corresponding International Application No. PCT/US2010/041848, dated Feb. 23, 2011, 5 pages.

PCT/US2013/049447, "International Search Report", for related International Application No. PCT/US2013/049447, dated Dec. 12, 2013, 2 pages.

PCT/US2013/049447, "Written Opinion", for related International Application No. PCT/US2013/049447, dated Dec. 12, 2013, 8 pages.

PCT/US2015/026495, "International Search Report", for related International Application No. PCT/US2015/026495, dated Jul. 8, 2015, 5 pages.

PCT/US2015/026495, "Written Opinion", for related International Application No. PCT/US2015/026495, dated Jul. 8, 2015, 5 pages.

Pothalkar, "Key to physiological investigations on drought tolerance in Pigeonpea (*Cajanus cajan* L)", Thesis submitted to the University of Agricultural Sciences, Dharwad in partial fulfillment of the requirements for the Degree of Doctor of Philosophy in Crop Physiology, Apr. 2007, pp. 1-122.

Quintao Lana, et al., "Cobalt and molybdenum concentrated suspension for soybean seed treatment", R. Bras. Ci. Solo, vol. 33, 2009, pp. 1715-1720.

Robinson, et al., "Soil amendments affecting nickel and cobalt uptake by Berkheya coddii: Potential use for phytomining and phytoremediation", Annals of Botany, vol. 84, 1999, pp. 689-694.

RU2012131271/13(049252), "Office Action for corresponding Russian Application No. 2012131271/13(049252)", dated Jun. 30, 2014, 8 pages.

Schulte, et al., "Soil and Applied Manganese", Understanding Plant Nutrients A2526, 1999, 1-4.

Shaukat-Ahmed, et al., "The Essentiality of Cobalt for Soybean Plants Grown Under Symbiotic Conditions", PNAS, vol. 47, 1961, pp. 24-36.

Wang, "Effect of microelement copper, iron, iodine, molybdenum on fermentation of rumen microbe", Animal Feed Journal, Dec. 31, 2003, pp. 23-26.

(56) References Cited

OTHER PUBLICATIONS

Office Action for corresponding Canadian Application No. 2,877,981, dated Oct. 8, 2019.
"Translation of PCT/RU2001/00166", dated Mar. 21, 2002.

AGRICULTURAL COMPOSITIONS AND APPLICATIONS UTILIZING MINERAL COMPOUNDS

CROSS REFERENCE TO RELATED APPLICATION

This application is a continuation application of U.S. application Ser. No. 14/689,991, filed on Apr. 17, 2015 which claims benefit of U.S. Provisional Application No. 61/980,804, filed on Apr. 17, 2014 and which application is incorporated herein by reference. A claim of priority is made.

BACKGROUND

Nitrogen, potassium and phosphorus (i.e., "NPK") often capture the focus of the agricultural industry as essential requirements for plant or crop growth and health. Calcium, magnesium and sulfur are sometimes measured and monitored as essential macronutrients required for healthy plant growth. In addition to these important ingredients, many trace inorganic minerals (i.e., micronutrients) have been found to further facilitate growth, yield and health in agricultural crops. Such micronutrients include chlorine, iron, boron, manganese, zinc, copper, molybdenum, sodium, silicon and cobalt.

Cobalt is essential for the growth of the rhizobium, a specific bacterium important in legumes that synthesizes vitamin $B_{12}$. Cobalt assists in nitrogen fixation in plants and increases the availability and uptake of other micro or even macro nutrients.

Other trace minerals found in the soil or supplemented in the soil have additional benefits. For example, zinc improves phosphorus utilization in plants, regulates growth, increases leaf size and corn ear size, promotes silking, hastens maturity and adds healthy weight to crops. Manganese improves nitrogen utilization, plays a vital role in pollination and aids cell energy release mechanisms. Iron is utilized in chlorophyll production and has a role in photosynthesis. Copper helps regulate a plant's immune system, controls mold and fungi, contributes to the photosynthesis process and increases stalk strength. Boron increases calcium uptake, is necessary for sugar translocation within the plant, promotes flowering and pollen production, and is required for cell division and plant growth.

Although naturally found in many types of soil, trace mineral amounts vary by geography, soil type, density of agricultural operations and supplemental programs. Limitations to providing ideal trace mineral supplies to plants or crops include farming costs, time, availability to the plant and chemical and physical compatibility with other agricultural compositions and farming equipment. For example, pre-treatment (or treatment prior to planting of seeds) of seeds with agricultural compositions is not widely utilized, with the exception of fungicides. The sensitivity of seeds to chemical and physical (churning, mixing, etc.) is high and the efficiency of coating and retaining the compositions is low. During agricultural operations, farmers and farming operations strive to remain profitable by reducing time in the field and the costs of additional chemical or biological applications.

Nutrient uptake of plants, and overall health characteristics such as wet weight and leaf size, can vary drastically over the lifetime of the plant, depending on soil conditions, weather, pests, and other factors. Plant health can be a determining factor in harvest timing. Alternatively, extenuating circumstances can require harvesting when plant nutrient content, health, or size is not ideal.

SUMMARY

In general, embodiments of the present invention provide mineral products, seed, soil, and plant treatment compositions, and methods of making and using such products and compositions. The use of these products and compositions can increase the growth, health, and yield of various seeds and plants such as crops and grasses, and further provide similar benefit to soils.

Accordingly, embodiments of the present invention provide a seed, soil, or plant treatment composition comprising a mineral chelated compound and a salt of the same mineral, wherein the mineral is one of scandium, selenium, titanium, vanadium, magnesium, calcium, manganese, cobalt, iron, nickel, copper, tin, zinc, or molybdenum, wherein the chelant is one of lactate, ethylene diamine, ethylenediamine tetraacetate (EDTA), propionate, butyrate, acetate, and wherein the salt anion is one of bromide, chloride, fluoride, carbonate, hydroxide, nitrate, oxide, phosphate, sulfate, formate, acetate, propionate, butyrate, oxalate, citrate, malate, lactate, or tartrate. Although not commonly found or used in agricultural products, one or more of aluminum, tin, and chromium may be suitable minerals for some embodiments disclosed herein.

Embodiments may further include a plurality of mineral chelated compounds and/or mineral salts, or a mineral chelate mineral salt (MCMS) composition. Such embodiments may provide the additional minerals in chelated and/or salt form.

The compositions described herein can be further combined with, for example, an inorganic fertilizer, an herbicide, an insecticide, a biological fertilizer, or combinations thereof. Compositions may also include one or more of carriers, fibers, enzymes, and adherents. Such compositions can be applied to seeds, soil, or plants.

A particular composition describe herein is a seed, soil, or plant treatment composition comprising cobalt sulfate and at least one cobalt chelated compound. In some embodiments, the cobalt chelated compound is cobalt lactate.

A particular composition described herein is a seed, soil, or plant treatment composition comprising one or more enzymes. A suitable enzyme blend can comprise one or more of a carbohydrase derived from *Aspergillus oryzae*, a protease enzyme derived from *Aspergillus oryzae*, a celfulase enzyme derived from *Aspergillus niger*, a lipase enzyme derived from *Aspergillus niger*, and a pectinase enzyme derived from *Aspergillus niger*.

The details of one or more examples are set forth in the accompanying drawings and the description below. Other features, objects, and advantages will be apparent from the description and drawings, and from the claims.

DETAILED DESCRIPTION

Figure 1A:
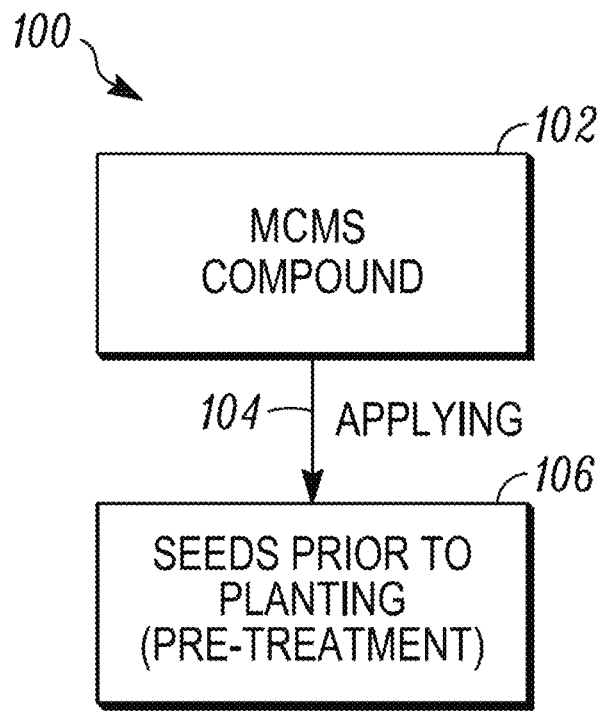
FIGS. 1A-B illustrate block flow diagrams of methods of using a mineral product, according to one or more embodiments of this disclosure.

Provided herein are mineral compositions for treating seeds soils and plants. The use of these products and compositions can increase the growth, health, and yield of various seeds and plants such as crops and grasses, and further provide similar benefit to soils. The compositions disclosed herein are advantageous to many commercial fertilizer products. They are more environmentally friendly as they can be applied at similar or lower rates, and do not pose bioaccumulation and cytoxicity risks associated with many commercial agricultural products used today.

The mineral compositions provided herein are particularly suited for treating seeds. Traditionally, seeds are more susceptible to harm or damage caused by harsh chemical treatments and therefore, farmers are forced to apply treatments at a later stage in the agricultural process or plant growth cycle. Such practices can be more costly and time consuming. Embodiments of the present disclosure describe treatments benign to seed health and can be applied early and in a concentrated form—not only saving money and time, but giving the plants access to nutrients much earlier in the plant growth cycle.

Definitions

As used herein, the recited terms have the following meanings. All other terms and phrases used in this specification have their ordinary meanings as one of skill in the art would understand after review of this disclosure.

As used herein, the term "chelation" refers to the formation of two or more separate coordinate bonds between a polydentate (multiple bonded) ligand and a single central atom, typically a metal ion. The ligands are typically organic compounds, often in anionic form, and can be referred to as chelants, chelators, or sequestering agents. A ligand forms a chelate complex with a substrate such as a metal ion. While chelate complexes typically form from polydentate ligands, as used herein the term chelate also refers to coordination complexes formed from monodentate ligands and a central atom. Mineral chelated compositions include chelation.

As used herein, a "carboxylic acid" refers to organic acids characterized by the presence of a carboxyl group, which has the formula —C(=O)OH, often written —COOH or —$CO_2H$. Examples of carboxylic acids include lactic acid, acetic acid, EDTA, propionic acid and butyric acid.

As used herein, a "fatty acid" refers to a carboxylic acid, often with a long unbranched aliphatic tail (chain), which may be either saturated or unsaturated. Short chain fatty acids typically have aliphatic tails of six or fewer carbon atoms. Examples of short chain fatty acids include lactic acid, propionic acid and butyric acid. Medium chain fatty acids typically have aliphatic tails of 6-12 carbon atoms. Examples of medium chain fatty acids include caprylic acid, capric acid and lauric acid. Long chain fatty acids typically have aliphatic tails of greater than 12 carbon atoms. Examples of long chain fatty acids include myristic acid, palmitic acid and stearic acid. A fatty acid having only one carboxylic acid group can be a ligand of a mineral.

As used herein, "lactic acid" refers to a carboxylic acid having the chemical structural formula of $CH_3CH(OH)CO_2H$. Lactic acid forms highly soluble chelates with many important minerals.

As used herein, an "inorganic mineral compound" or "mineral" refers to an elemental or compound composition including one or more inorganic species. For example, an inorganic mineral compound may be cobalt, cobalt carbonate, zinc oxide, cupric oxide, manganese oxide or a combination thereof. Inorganic mineral compounds may also include scandium, selenium, titanium, vanadium, manganese, magnesium, calcium, iron, nickel, copper, molybdenum, and zinc, for example. Transition metals can also be included and salts, oxides, hydroxides and carbonates of the above mentioned compounds can be suitable inorganic mineral compounds. Although not commonly found or used in agricultural products, one or more of aluminum, tin, and chromium may be suitable minerals for some embodiments disclosed herein.

As used herein, "mineral chelated compound" refers to chemical compound or mixture including at least one inorganic substance and a derivative of a carboxylic acid, or reaction product of a carboxylic acid and an inorganic mineral compound. Examples of mineral chelated compounds include but are not limited to cobalt, scandium, selenium, titanium, vanadium, manganese, iron, nickel, copper, zinc, or a combination thereof chelated to one or more ligands to form a chelate (a chelate complex or coordinate complex). Although not commonly found or used in agricultural products, mineral chelated compounds can include one or more of aluminum, tin, and chromium in some embodiments disclosed herein. Examples of suitable ligands include lactate, acetate, propionate, butyrate, ethylene diamine, and EDTA.

As used herein, an "inorganic fertilizer" refers to a composition intended to enhance the growth of plants by providing macronutrients such as one or more of nitrogen, potassium, phosphorus, calcium, magnesium, and sulfur. The inorganic fertilizer typically does not include significant amounts of living organisms. Inorganic fertilizers often include micronutrients, such as boron, chlorine, copper, iron, manganese, molybdenum and zinc. Inorganic fertilizers can also include optional ingredients such as greensand or rock phosphate. The inorganic fertilizer can be, for example, an NPK fertilizer, a known commercial fertilizer, or the like.

As used herein, "biological fertilizer", "natural fertilizer" or "organic fertilizer" refers to a fertilizer that includes living organisms, plant or animal matter, or combinations thereof. A biological fertilizer can include components such as manure, blood meal, alfalfa meal, seaweed, or compost. The fertilizers can be provided in a variety of granular or liquid forms.

As used herein, "pesticide" refers to a composition or product that kills or repels plant or seed pests, and may be broken into a number of particular sub-groups including, but not limited to, acaricides, avicides, bactericides, fungicides, herbicides, insecticides, miticides, molluscicides, nematicides, piscicides, predacides, rodenticides, and silvicides. Pesticides can also include chemicals which are not normally used as pest control agents, such as plant growth regulators, defoliants, and desiccants, or which are not directly toxic to pests, such as attractants and repellants. Some microbial pesticides can be bacteria, viruses, and fungi that cause disease in given species of pests. Pesticides can be organic or inorganic. Pesticides applied to plant seeds may remain on the surface of the seed coat following application, or may absorb into the seed and translocate throughout the plant.

As used herein, "herbicide" refers to a composition or product that kills or deters weed growth. One example of an herbicide includes glyphosate (i.e., RoundUp® herbicide).

As used herein, "insecticide" refers to a composition or product that kills or repels insects. Examples of insecticides include Sevin (carbaryl), permethrin, and *bacillus thruingiensis*

As used herein, "foliar" or "folial" refers to the foliage of a plant or crop, or applying to the foliage of a plant or crop.

As used herein, "in-furrow" refers to applying a substance within a planting furrow in contact with or in near proximity to a seed. In-furrow application can occur before a seed is planted, simultaneous with seed planting, or after seed planting.

As used herein, "seed" refers to anything that can be sown to produce a plant. Seed can refer to an unfertilized plant ovule, a fertilized plant ovule, an embryonic plant. "Seed" can also refer to a whole of portion of a plant which is sown. For example, "seed" can refer to a whole or portion of a potato tuber. In other example, "seed" can refer to a bean which is planted to produce a plant, such as a soybean.

As used herein, "solution" refers to a homogeneous or substantially homogeneous mixture of two or more substances, which may be solids, liquids, gases or a combination thereof.

As used herein, "mixture" refers to a combination of two or more substances in physical or chemical contact with one another.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo. Accordingly, treating, tumbling, vibrating, shaking, mixing, and applying are forms of contacting to bring two or more components together.

As used herein, "applying" refers to bringing one or more components into nearness or contact with another component. Applying can refer to contacting or administering.

As used herein, "pre-treatment" or "seed treatment" refers to chemically and/or physically contacting seeds with a composition prior to planting.

As used herein, "carrier" refers to a substance that physically or chemically binds or combines with a target or active substance to facilitate the use, storage, or application of the target or active substance. Carriers are often inert materials, but can also include non-inert materials when compatible with the target or active substances. Examples of carriers include, but are not limited to, water for compositions that benefit from a liquid carrier, or diatomaceous earth for compositions that benefit from a solid carrier.

As used herein, "adherent" refers to a material, such as a polymer, that facilitates contact or binding of one or more chemicals with a seed during a seed-pre-treatment process.

As used herein, "enzymes" refers to one or more biological molecules capable of breaking down materials such as cellulose, proteins, and fats, among many others. For example, a cellulase is an enzyme which is capable of breaking down cullulosic material.

As used herein, "MCMS compositions" refers to a composition having one or more mineral chelate compounds and one or more mineral salt compounds. MCMS compositions can be beneficial when applied to seeds, plants, and soil. A specific example of a MCMS composition is one which contains cobalt lactate and cobalt sulfate.

Embodiments of the present invention provide a variety of treatment compositions for enhancing the germination rate, health, growth, nutrient uptake and retention, drought resistance of seeds and growing plants, and temporal bio-availability of nutrients in and around a seed or plant. Embodiments further provide for earlier and more consistent enhancement of these benefits throughout the lifespan of a plant. Earlier and more consistent enhancement of these benefits can be particularly advantageous where harvest timing is based on factors independent from plant growth, such as time of year, weather, and market demand, among others. The treatment compositions can be used to improve the quality of soil. The treatment compositions can also act as microbial catalysts by providing a biological and/or physiological synergy between seeds and microbes, and between plants and microbes.

Many embodiments relate to compositions that can be used to treat seeds, plants, and soil including mixtures having natural, organic, inorganic, or biological fertilizers, or combinations thereof, with one or more compatible pesticides. These compositions may also contain enzymes, fibers, water, and minerals as discussed herein. Such mixtures ensure or enhance seed germination and plant growth, health, and yield, while protecting seeds and plants from infection or infestation and harsh conditions, such as drought. Seed pre-treatment has shown to be beneficial for a number of reasons. Seed pre-treatment can create a zone of pest suppression after planting in the immediate area of the seed. As a result, fewer pesticide applications are required, which minimizes physical damage to plants, reduces application and handling costs, and cuts down on pesticide drift problems. Seed pre-treatment can allow for more accurate application of active ingredient per seed or acre. Further, seed re-treatment can require less active ingredient per seed or acre than other application methods, such as in-furrow.

For some pests, such as fungal diseases, protectant seed treatments are preferable to post-infestation or post-infection treatments because the pathogens live in such close association with host plants that it can be difficult to kill the pest without harming the host. Other types of fungicidal seed pre-treatments include seed disinfestation, which controls spores and other forms of disease organisms on the seed surface, and seed disinfection, which eliminates pathogens that have penetrated into the living cells of the seed.

Treatment methods include direct seed treatment, folial, and in furrow. FIG. 1A illustrates a block flow diagram of a method 100 of using a composition, such as an MCMS composition, in direct seed treatment, or pre-treatment, of seeds, according to some embodiments. Method 100 can comprise applying 104 one or more MCMS compounds 102 to one or more seeds 106 prior to planting in a pre-treatment stage. Direct seed treatment methods can be accomplished away from a planting site, at a planting site, and during planting, or some combination thereof. For example, seeds can be contacted with a seed treatment during planting. Direct seed treatment can provide advantages over folial and in furrow treatment methods by reducing wasted active ingredients and thereby the overall amount of necessary or sufficient treatment product for a given seed lot or acreage. Additionally, direct seed treatment formulations can be more concentrated than formulations directed to folial and in furrow treatment methods. In some cases this is because formulations directed to folial and in furrow treatment methods have a higher percentage of carrier material. The more highly concentrated direct seed treatment formulations therefore also provide advantages as they are more easily transported, and additionally or alternatively do not require facilities and equipment for mixing the formulations with carriers or other elements. Seed treatment methods can also reduce damage to plants caused by some methods of folial and in-furrow application methods, and can further reduce energy usage and equipment required by the same.

Seed pre-treatment pesticides can be applied as dusts, but are often homogeneous solutions or heterogeneous slurries or suspensions. Seed treatment or pre-treatment 106 can be accomplished within a seed bag or by mechanical means, such as in a tumbler. The one or more seeds can be agitated after applying 104. Agitating can include tumbling, vibrating, mixing, shaking, and combinations thereof. The applying 104 can be accomplished by spraying, pouring or other means of contacting the MCMS compound and seeds. Applying 104 a MCMS compound can be performed at an end amount of about 4-5 grams/acre, about 2-5 gms/a, about 5-35 gms/a, about 25-70 gms/a, about 45-95 gms/a, about 75-140 gms/a, about 100-500 gms/a or about 5-5000 gms/a, for example. Seed pre-treatment can be carried out at an off-site facility, on-site at the farm, or on-board planting equipment immediately prior to planting.

Figure 1B:
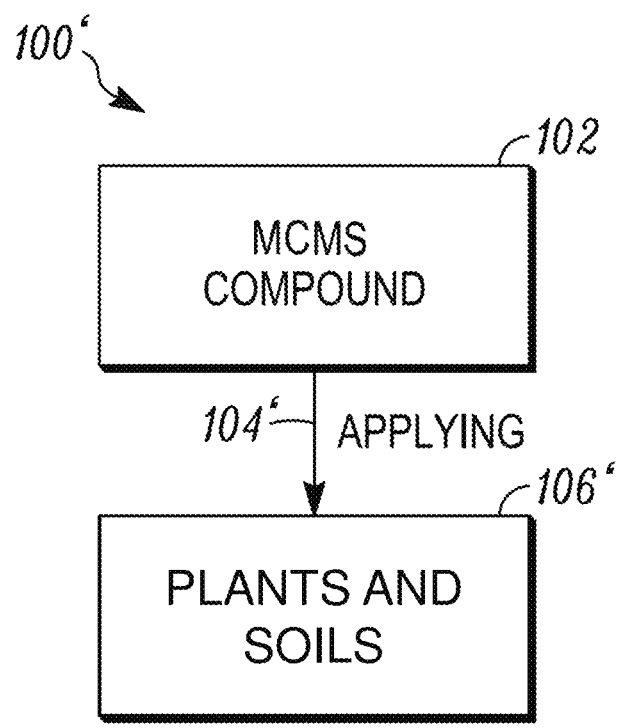

FIG. 1B illustrates a block flow diagram of a method 100' of using a composition, such as an MCMS composition, for treating plants and soils, according to some embodiments. Method 100' can comprise applying 104' one or more MCMS compounds 102 to one or more soils and plants 106' prior to planting, during planting, or after planting. Method 100' can be used in combination with method 100 or as an alternative to method 100.

The MCMS compound can be combined with one or more pesticides, including herbicides, insecticides, fungicides, and adherents, including commercial products, without negatively affecting the commercial product or seeds. The adherent can be a polymer (e.g., polysaccharide) such as a biocompatible and biodegradable adhesive material used in agricultural settings. Adherents can comprise sticky fibers. An adherent can be used in combination with a stabilizer, including commercial products such as TIC gum. TIC gum comprises propylene glycol alginate and Xanthan gum.

The treatment compositions described herein can be beneficial to a variety of seeds, plants, and soils. The compositions can be particularly beneficial to crops and grasses, and for improving the health of soil used for crops and grasses.

Examples of crop plants that benefit from treatment with the compositions described herein include, but are not limited to, corn, alfalfa, beans, sugar beets, potatoes, wheat, fruits, oats, cotton, rice, soy, and the like. Additionally, GMO variants of the above and other plants can be strengthened and benefit from the embodiments of the present invention.

Examples of grasses that benefit from treatment with the compositions described herein include, but are not limited to, lawn grasses, turf grasses such as grass for sports fields and greens. Specific examples include Kentucky bluegrass, annual bluegrass, clover, Bermuda grass, bentgrass, ryegrass, Indian ricegrass, jointed goatgrass, purple threeawn grass, downy brome, common rye, and the like.

One composition that can be used to treat seeds, plants, and soil is a mineral chelate or mineral chelated compound. A specific example of a mineral chelate is cobalt lactate (CoL). An additional or alternative composition includes a cobalt compound, such as an inorganic or organic salt, and can include cobalt carbonate, cobalt gluconate, cobalt sulfate, cobalt oxides, or a combination thereof, among others as will be identified herein.

The composition can include a variety of minerals, either as chelates, salts, or both. The chelates can be any suitable and effective chelate described herein. Examples of mineral chelated compounds include a cobalt chelated compound, a scandium chelated compound, a selenium chelated compound, a titanium chelated compound, a vanadium chelated compound, a manganese chelated compound, an iron chelated compound, a nickel chelated compound, a copper chelated compound, a zinc chelated compound, or a combination thereof. Although not commonly found or used in agricultural products, one or more of aluminum chelated compounds, tin chelated compounds, and chromium chelated compounds may be suitable mineral chelated compounds for some embodiments disclosed herein. The chelated portion may include lactate, ethylene diamine, ethylenediamine tetraacetate (EDTA), propionate, butyrate, acetate and combinations thereof. Examples of a chelated mineral compound include mineral lactate compound, a mineral propionate compound, a mineral butyrate compound, a mineral EDTA compound, a mineral acetate compound, or a combination thereof.

One specific, non-limiting example of a chelated compound is organically chelated cobalt, for example, having the chemical formula: $(CH_3—CH(OH)COO^-)_2$-Co which can be shown as:

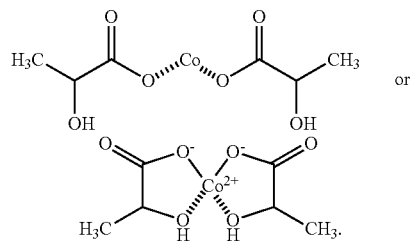

The minerals of the mineral chelated compounds include scandium, selenium, titanium, vanadium, magnesium, calcium, manganese, cobalt, iron, nickel, copper, zinc, molybdenum. For example, cobalt, iron, manganese, copper, and zinc can in a lactate compound, or an EDTA compound.

Salt compounds can include scandium, selenium, titanium, vanadium, magnesium, manganese, calcium, cobalt, iron, nickel, copper, zinc, molybdenum. Although not commonly found or used in agricultural products, salt compounds can include one or more of aluminum, tin, and chromium in for some embodiments disclosed herein. Salt anions can include bromide, chloride, fluoride, carbonate, hydroxide, nitrate, oxide, phosphate, sulfate, formate, acetate, propionate, butyrate, oxalate, citrate, malate, lactate, or tartrate.

The compositions can be prepared using carriers. Carriers are ideally inert materials which do not react with the active components of the composition chemically, or bind the active components physically by absorption or adsorption. Liquid carriers include pure water, such as reverse osmosis water, or other liquids such as crop oils or surfactants which are compatible with the composition and plant tissue. The composition can be at least about 50% liquid by weight, at least about 75% liquid by weight, at least about 85% liquid by weight, or at least about 90% liquid. In some embodiments, the composition will be about 80% to about 99% liquid, about 85% to about 98% liquid, about 90% to about 95% liquid, or about 91% to about 94% liquid. In other embodiments, the composition can be about 60% liquid to about 74% liquid, about 63% liquid to about 71% liquid, about 66% liquid to about 68% liquid, or about 67% liquid.

The total amount of carrier in a composition can be determined based on a ratio of one or more carriers to one or more elements within the composition. In some examples, a particular ratio or ratio range of one or more carriers to elements within the composition can be determined based on plant nutrition, growth, or other factors. In some other examples, a particular ratio or ratio range of one or more carriers to elements within the composition can be determined based on technical limitations of agricultural or processing machinery.

In some other compositions it is preferable to use one or more solid carriers such as diatomaceous earth, finely ground limestone ($CaCO_3$), or magnesium carbonate ($MgCO_3$). Sugars such as sucrose, maltose, maltodextrin, or dextrose may also be used as solid carriers. In other compositions it is beneficial to use a combination of solid and liquid carriers. Carriers can further include gases or vapors, such as steam, air, or inert gases such as diatomic nitrogen, which can be used to fluidize a solid composition. Other similar or different carriers may be suitable for the techniques described herein, as would be recognized by one of skill in the art after review of this disclosure.

The composition can also include a fiber, for example, a fiber that can act as a food source for beneficial bacteria in soil or another growth medium. Fiber can also act as an adherent. Soluble fibers can be utilized as they generally enhance product efficacy and stability by keeping less soluble materials in solution or suspension due to their inherent charge and ability to disperse other charged components in solution. Soluble fibers also allow for higher composition-to-seed adhesion in pre-treatment. Fiber content within the composition is adjustable to better maintain less soluble materials in solution or suspension, and to modify composition "stickiness" or adhesion properties. Higher fiber content and "stickiness" is often desirable in seed pre-treatments in order to ensure sufficient composition binding to and coverage of the seeds. Accordingly, fiber which exhibits sufficient stickiness may be utilized as an adherent.

Fiber content and type can also be modified to control composition-seed adhesion time, and adhesion strength. Because seeds can be pre-treated off-site and must be transported to farms, adhesion strength is important to ensure that pre-treatment compositions do not shake, rub, or fall off the seeds during processing, shipping, storage, or planting. The higher fiber content and overall concentration of pre-treatment compositions in comparison to foliar and in-furrow application compositions may increase composition density. Lower fiber content may be preferable for liquid foliar or in-furrow application compositions, which ideally have lower percent solids and viscosities to allow for easier transport and application, and to minimize equipment clogging. Suitable and effective fibers include hemicellulose, for example, the hemicellulose extracted from Larch trees. Another example of a suitable fiber is a yucca plant extract, which has additional uses as described below.

The composition can further include one or more enzymes, including a blend of enzymes. Compositions as provided herein can comprise one or more useful and beneficial enzymes including enzymes which break down starch, such as amylases, enzymes which break down protein, such as proteases, enzymes which break down fats and lipids, such as lipases, and enzymes which break down cellulosic material, such as cellulases. Enzymes can be provided within the compositions described herein, for example, to facilitate a degradation of cellulosic material in and/or around a seed, soil, or plant. In one example, enzymes can break down cellulosic material and other material such as stover left on a field after harvest.

In one embodiment, an enzyme blend can comprise one or more of a carbohydrase derived from *Aspergillus oryzae*, a protease enzyme derived from *Aspergillus oryzae*, a cellulase enzyme, derived from *Aspergillus niger*, a lipase enzyme derived from *Aspergillus niger*, a pectinase enzyme derived from *Aspergillus niger*, and combinations thereof. A particular enzyme blend, known as Enzyme W, comprises carbohydrase derived from *Aspergillus oryzae*, protease enzyme derived from *Aspergillus oryzae*, celfulase enzyme derived from *Aspergillus niger*, lipase enzyme derived from *Aspergillus niger*, pectinase enzyme derived from *Aspergillus niger*. Enzyme W can optionally comprise rice. Enzyme blends can be applied to seeds, soils, and plants Enzyme blends can be used in combination with an MCMS composition, in combination with a mineral chelated composition, in combination with a mineral sulfate composition, or as a stand-alone agricultural product for treating seeds, soils, and plants. For example, an enzyme blend can be applied directly to a soil in-furrow, to the foliage of a plant, or on a seed as a pre-treatment. An example of a suitable enzyme blend is Enzyme W. In other embodiments, Enzyme W can be combined with a water soluble carrier. In some such embodiments, the water soluble carrier can partially or wholly replace the rice carrier. A list of non-limiting examples of water soluble carriers include sugars such as dextrose, sucrose, and the like, among many others. More generally, suitable enzyme blends can comprise one or more of a carbohydrase, a protease, a cellulase, a lipase, a pectinase enzyme, and optionally a carrier.

The composition can further include one or more chemical wetting agents, such as a non-ionic wetting agent. Wetting agents are typically comprised of surfactants, Wetting agents can promote water penetration of soil. An example of a commercial wetting agent is X-Celerate, sold by Royal Oil Co. from Fort Worth, Tex. Another example of a suitable surfactant is a yucca plant extract. Yucca extract is commercially available as Saponix 5000 or BioLiquid 5000.

The composition can further include one or more compatible pesticides, such as glyphosate. The composition can include many different types of fungicides, which may contain active ingredients including but not limited to: chlorothalonil, copper hydroxide, copper sulfate, mancozeb, flowers of sulfur, cymoxanil, thiabendazole, captan, vinclozolin, maneb, metiram, thiram, ziram, iprodione, fosetyl-aluminum, azoxystrobin, and metalaxyl.

The composition can include many different types of insecticides, which may contain active ingredients including but not limited to: aldicarb, acephate, chlorpyrifos, pyrethroids, malathion, carbaryl, sulfuryl fluoride, naled, dicrotophos, phosmet, phorate, diazinon, dimethoate, azinphos-methyl, endosulfan, imidacloprid, and permethrin.

The composition can include many different types of herbicides, which may contain active ingredients including but not limited to: diuron, 2-methyl-4-chlorophenoxyacetic acid (MCPA), paraquat, dimethenamid, simazine, trifluralin, propanil, pendimenthalin, metolachlor-S, glyphosate, atrazine, acetochlor, "2,4-D", methylchlorophenoxypropionic acid (MCPP), pendimethalin, dicamba, pelarganoc acid, triclopyr, monosodium methyl arsenate (MSMA), sethoxydim, quizalofop-P, primisulfuron, imazamox, cyanazine, bromoxylin, s-ethyl dipropylthiocarbamate (EPTC), glufosinate, norflurazon, clomazone, fomesafen, alachlor, diquat, and isoxaflutole.

In one embodiment, the composition is prepared to provide aqueous soluble minerals. Additional optional components include forms of soluble calcium, boric acid, and the like.

In some embodiments, an MCMS composition comprises one or more mineral chelated compounds (e.g., cobalt chelated compound), and one or more organic or inorganic mineral salts (e.g., cobalt sulfate). The mineral chelated compound can include one or more of a cobalt chelated compound, scandium chelated compound, selenium chelated compound, titanium chelated compound, vanadium chelated compound, manganese chelated compound, iron chelated compound, nickel chelated compound, copper chelated compound, and zinc chelated compound. Although not commonly found or used in agricultural products, one or more of aluminum chelated compounds, tin chelated compounds, and chromium chelated compounds may be suitable mineral chelated compounds for some embodiments disclosed herein. The mineral chelated compound can also include one or more mineral lactate compounds, mineral propionate compounds, mineral butyrate compounds, mineral EDTA compounds, mineral acetate compound, or a combination thereof. Cobalt lactate is one specific example of a mineral chelated compound.

Some organic or inorganic salts particular to this embodiment include salts of scandium, selenium, titanium, vanadium, magnesium, calcium, manganese, cobalt, iron, nickel, copper, zinc, molybdenum, or combinations thereof. Although not commonly found or used in agricultural products, salt compounds can include one or more of aluminum, tin, and chromium in for some embodiments disclosed herein. Suitable salt anions can include bromide, chloride, fluoride, carbonate, hydroxide, nitrate, oxide, phosphate, sulfate, formate, acetate, propionate, butyrate, oxalate, citrate, malate, lactate, or tartrate. Cobalt sulfate is one specific example of an inorganic mineral salt.

Some embodiments may particularly exclude ferric and/or ferrous content. One reason for excluding ferric and/or ferrous content, among many, is it may be difficult to provide a stable form of iron within certain compositions. Some embodiments may particularly exclude nitrogen content. Some embodiments may particularly exclude both ferric and/or ferrous content and nitrogen content.

Further embodiments of such general mineral complexes include one or more of a carrier, soluble fiber, and enzymes. Examples of such compounds and methods of making are described in co-owned U.S. patent application Ser. No. 12/835,545, the disclosure of which is herein incorporated by reference.

In some embodiments, one or more mineral chelated compounds are combined with one or more one or more organic or inorganic mineral salts in order to, for example, beneficially enhance temporal bio-availability of nutrients. Such a combination may act as a microbial catalysts by providing a biological and/or physiological synergy between seeds and microbes, and between plants and microbes. Such a combination may further provide for a heightened and/or more consistent plant nutrient content and health throughout the lifetime of a plant. Some treatment compositions known in the art may enhance, for example, plant nutrient uptake early or late in the lifetime of a plant. As a result, a plant may be ideally harvested only early or only late in its lifetime to provide a harvested crop with a desired nutrient content. Such a limitation does not allow for flexibility with inherent harvesting influences, such as weather, market demand for crops, pest influxes, and other considerations.

MCMS compositions, as described herein, can provide a higher and more consistent level of plant health and nutrient content throughout the course of a plant lifespan (e.g., planting to harvesting). Although many uptake mechanisms may describe and may be applicable to MCMS composition interactions with a seed, soil, or plant, in some embodiments a mineral chelate component can be more bio-available than a mineral salt component, particularly an inorganic salt component. In other potential mechanisms, a MCMS composition can catalyze microbes in such a way that nutrient uptake and plant health is enhanced. In many cases, apply MCMS compositions to seeds, soils, and plants can lead to earlier plant emergence, which is a strong indicator of future plant performance and health, including height, leaf area, extended leaf height, growth rate, biomass, and bean produce, among others.

In some embodiments, MCMS compositions can comprise a pairing of both a chelate compound and an inorganic or organic salt of a mineral, such as those previously described. For example, a MCMS composition can comprise a cobalt chelated compound and a cobalt salt, a scandium chelated compound and a scandium salt, a selenium chelated compound and a selenium salt, a titanium chelated compound and a titanium salt, a vanadium chelated compound and a vanadium salt, a manganese chelated compound and a manganese salt, an iron chelated compound and an iron salt, a nickel chelated compound and a nickel salt, a copper chelated compound and a copper salt, a zinc chelated compound and a zinc salt, or a molybdenum chelated compound and a molybdenum salt. In an example, a MCMS composition can comprise cobalt lactate and cobalt sulfate. Although not commonly found or used in agricultural products, mineral chelate and mineral salt pairings can include one or more of an aluminum chelated compound and an aluminum salt, a tin chelated compound and a tin salt, a chromium chelated compound and a chromium salt, in some embodiments disclosed herein.

The ratio of the weight or moles of a mineral in the chelated compound to the same mineral in the salt can be 1:100 to 100:1, 50:40 to 90:10, and 6:94 to 12:88. Ratios of the mineral in the chelated compound to the same mineral in the salt can be 20:80 to 30:70. In one embodiment, the ratio of the mineral in the chelated compound to the same mineral in the salt is 21:79 to 25:75, or about 23:77.

The combined weight percent of the mineral chelated compound and mineral salt pairing in a MCMS composition can be up to about 6%, up to about 12%, up to about 24%, up to about 36%, or up to about 48%. For example, a MCMS composition can be about 36% by weight cobalt sulfate and cobalt lactate.

In some embodiments a MCMS composition can further comprise one or more additional mineral chelated compounds and/or salts. In such embodiments, the MCMS composition can be up to about 1%, up to about 2%, up to about 3%, up to about 4%, up to about 7%, up to about 9%, up to about 12%, up to about 17%, up to about 19%, up to about 23%, up to about 28%, or up to about 35%, by weight of one or more additional mineral chelated compounds and/or salts. For example, a MCMS composition can comprise cobalt lactate, cobalt sulfate, and one or more of ferric sodium EDTA, manganese lactate, copper sulfate, and zinc sulfate. Such a MCMS composition can further comprise one or more mineral acids, such as molybdic acid.

MCMS compositions can further comprise other mineral chelated compounds and mineral salts as described herein, and additionally may comprises other minerals, carriers, fibers, adherents, and enzymes. For example, a MCMS composition can comprise a mineral chelated compound (e.g. cobalt lactate), a mineral salt (e.g. cobalt sulfate), and a carrier (e.g. water).

MCMS compositions can further comprise a plurality of mineral chelate and mineral salt pairings. For example, a MCMS composition can comprise two or more of a cobalt chelated compound and a cobalt salt, a scandium chelated compound and a scandium salt, a selenium chelated compound and a selenium salt, a titanium chelated compound and a titanium salt, a vanadium chelated compound and a vanadium salt, a manganese chelated compound and a manganese salt, an iron chelated compound and an iron salt, a nickel chelated compound and a nickel salt, a copper chelated compound and a copper salt, a zinc chelated compound and a zinc salt, and a molybdenum chelated compound and a molybdenum salt. Although not commonly found or used in agricultural products, mineral chelate and mineral salt pairings can include one or more of an aluminum chelated compound and an aluminum salt, a tin chelated compound and a tin salt, a chromium chelated compound and a chromium salt, in some embodiments disclosed herein.

In one embodiment, an MCMS composition can comprise cobalt lactate, cobalt sulfate, and one of a combination of manganese lactate and manganese sulfate, a combination of copper lactate and copper sulfate, a combination of nickel lactate and nickel sulfate, or a combination of zinc lactate and zinc sulfate. In some embodiments, an MCMS composition can comprise can comprise cobalt lactate, cobalt sulfate, and two of a combination of manganese lactate and manganese sulfate, a combination of copper lactate and copper sulfate, a combination of nickel lactate and nickel sulfate, or a combination of zinc lactate and zinc sulfate. In some embodiments, an MCMS composition can comprise can comprise cobalt lactate, cobalt sulfate, and three of a combination of manganese lactate and manganese sulfate, a combination of copper lactate and copper sulfate, a combination of nickel lactate and nickel sulfate, or a combination of zinc lactate and zinc sulfate. In some embodiments, an MCMS composition can comprise cobalt lactate, cobalt sulfate, manganese lactate and manganese sulfate, copper lactate and copper sulfate, nickel lactate, nickel sulfate, zinc lactate and zinc sulfate. In some embodiments, an MCMS composition can comprise two of a combination of cobalt lactate and cobalt sulfate, a combination of manganese lactate and manganese sulfate, a combination of copper lactate and copper sulfate, a combination of nickel lactate and nickel sulfate, and a combination of zinc lactate and zinc sulfate. In some embodiments, an MCMS composition can comprise three of a combination of cobalt lactate and cobalt sulfate, a combination of manganese lactate and manganese sulfate, a combination of copper lactate and copper sulfate, a combination of nickel lactate and nickel sulfate, and a combination of zinc lactate and zinc sulfate. In some embodiments, an MCMS composition can comprise four of a combination of cobalt lactate and cobalt sulfate, a combination of manganese lactate and manganese sulfate, a combination of copper lactate and copper sulfate, a combination of nickel lactate and nickel sulfate, and a combination of zinc lactate and zinc sulfate.

In some embodiments, MCMS compositions can comprise a pairing of one or more chelated compounds and one or more salts of a mineral. For example, a MCMS composition can comprise cobalt lactate, cobalt propionate, and cobalt sulfate. Similarly, a MCMS composition can comprise cobalt lactate, cobalt sulfate, and cobalt carbonate.

All such embodiments may be a dry mixture of components. Such embodiments may also provide varying ranges of viscosities, such that the composition may be a paste, or the like. Further, embodiments may comprise aqueous solutions, or aqueous dispersions or suspensions.

In some embodiments, the treatment compositions disclosed herein can further comprise one or more commercial seed, soil, or plant treatment compositions. For example, compositions disclosed herein can readily be combined with commercial fertilizers and pesticides without reacting or otherwise detrimentally affecting plant health or growth. Such combinability lends efficiency and convenience to agricultural practices. In one example, compositions disclosed herein can be combined with QUICK ROOTS® manufactured by TJ Technologies, Inc. QUICK ROOTS® comprises *Bacillus amyloliquefaciens* and *Trichoderma virens*. In other embodiments compositions disclosed herein can be combined with Optimize® 400 manufactured by Novozymes. Optimize® 400 comprises *Bradyrhizobium japonicum* bacterium and Lipo-chitooligosaccharide.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

Example 1: Corn Seed Treatment

A study was conducted wherein a cobalt MCMS composition pre-treatment was applied to corn seeds at an active ingredient weight in grams per acre (ai/a) of 55 ai/a, 70 ai/a, 85 ai/a, 100 ai/a, 115 ai/a, and 130 ai/a. In this case, "active ingredient" refers to the total weight of all non-carrier components in the MCMS composition, and 1 acre is the equivalent of 50 lbs of seeds. The cobalt MCMS composition was applied to corn seeds in a combination conveyor/tumbler, wherein application rate is controlled by sprayers. The cobalt MCMS composition is detailed in Table 1:

TABLE 1

Cobalt MCMS Composition for Example 1

| Cobalt MCMS Composition Ingredients | %/wt | grams |
|---|---|---|
| R.O. Water (Carrier) | 67.13 | 671.3 |
| Cobalt Lactate, Dihydrate (21.579% Co) | 2.8 | 28 |
| Cobalt Sulfate, Heptahydrate (20.965% Co) | 9.18 | 91.8 |
| Ferric Sodium EDTA (13.26% Fe) | 9.38 | 93.8 |
| Manganese Lactate, Dihydrate (20.42% Mn) | 3.99 | 39.9 |
| Copper Sulfate, Pentahydrate (25.46% Cu) | 2.34 | 23.4 |
| Zinc Sulfate, Monohydrate (36% Zn) | 1.41 | 14.1 |
| Molybdic Acid (59.2% Mo) | 0.01 | 0.1 |
| Enzyme W | 0.01 | 0.1 |
| Larafeed Liquid (Commercial Product) | 0.94 | 9.4 |
| Saponix 5000 (Commercial Product) | 2.81 | 28.1 |
| Total | 100 | 1000 |

The cobalt MCMS composition was tested against a cobalt lactate composition and a cobalt sulfate composition at each active ingredient rate. All three compositions contain the same percent cobalt per unit with or without the carrier (R.O. water). The cobalt sulfate composition is detailed in Table 2, and the cobalt lactate composition is detailed in Table 3:

TABLE 2

Cobalt Sulfate Composition for Example 1:

| Cobalt Sulfate Composition | %/wt | grams |
|---|---|---|
| R.O. Water (Carrier) | 67.047 | 670.47 |
| Cobalt Sulfate, Heptahydrate (20.964% Co) | 12.063 | 120.63 |
| Ferric Sodium EDTA (13.26% Fe) | 9.38 | 93.8 |
| Manganese Lactate, Dihydrate (20.42% Mn) | 3.99 | 39.9 |
| Copper Sulfate, Pentahydrate (25.46% Cu) | 2.34 | 23.4 |
| Zinc Sulfate, Monohydrate (36% Zn) | 1.41 | 14.1 |
| Molybdic Acid (59.2% Mo) | 0.01 | 0.1 |
| Enzyme W | 0.01 | 0.1 |
| Larafeed Liquid (Commercial Product) | 0.94 | 9.4 |
| Saponix 5000 (Commercial Product) | 2.81 | 28.1 |
| Total | 100 | 1000 |

TABLE 3

Cobalt Lactate Composition for Example 1:

| Cobalt Lactate Composition | %/wt | grams |
|---|---|---|
| R.O. Water (Carrier) | 66.79 | 667.9 |
| TIC Gum | 0.6 | 6 |
| Cobalt Lactate, Dihydrate (21.579% Co) | 11.72 | 117.2 |
| Ferric Sodium EDTA (13.26% Fe) | 9.38 | 93.8 |

TABLE 3-continued

Cobalt Lactate Composition for Example 1:

| Cobalt Lactate Composition | %/wt | grams |
|---|---|---|
| Manganese Lactate, Dihydrate (20.42% Mn) | 3.99 | 39.9 |
| Copper Sulfate, Pentahydrate (25.46% Cu) | 2.34 | 23.4 |
| Zinc Sulfate, Monohydrate (36% Zn) | 1.41 | 14.1 |
| Molybdic Acid (59.2% Mo) | 0.01 | 0.1 |
| Enzyme W | 0.01 | 0.1 |
| Larafeed Liquid (Commercial Product) | 0.94 | 9.4 |
| Saponix 5000 (Commercial Product) | 2.81 | 28.1 |
| Total | 100 | 1000 |

Figure 2A:
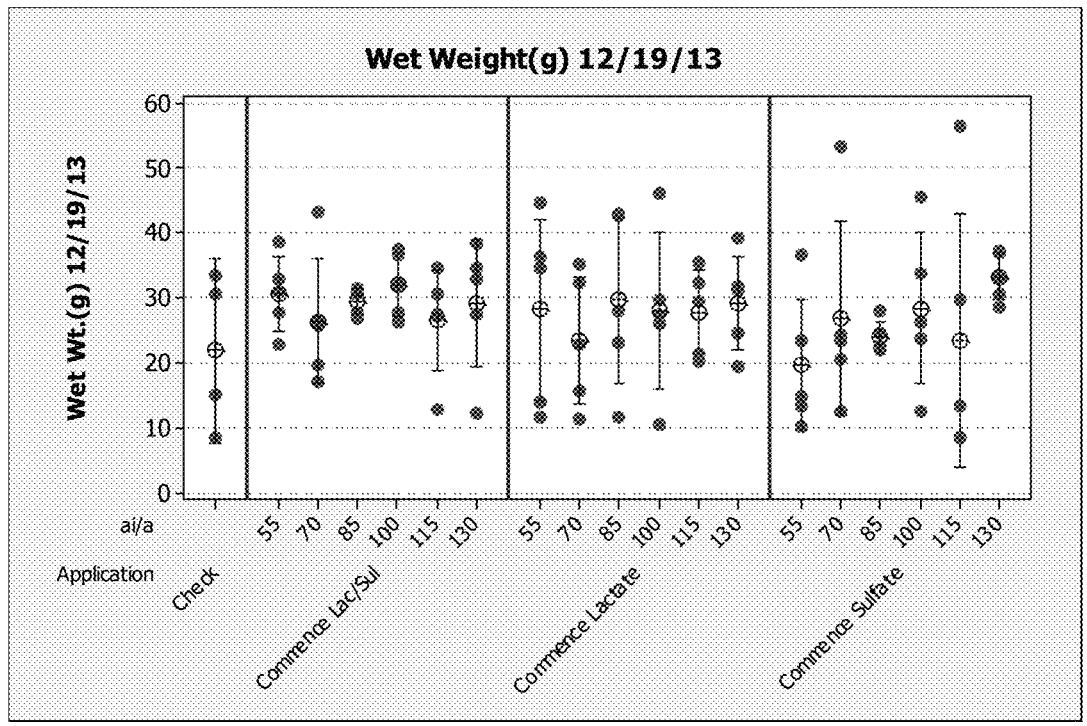
FIGS. 2A-B illustrate wet weight data for corn seed pre-treatment studies, according to one or more embodiments of this disclosure.
Figure 2B:
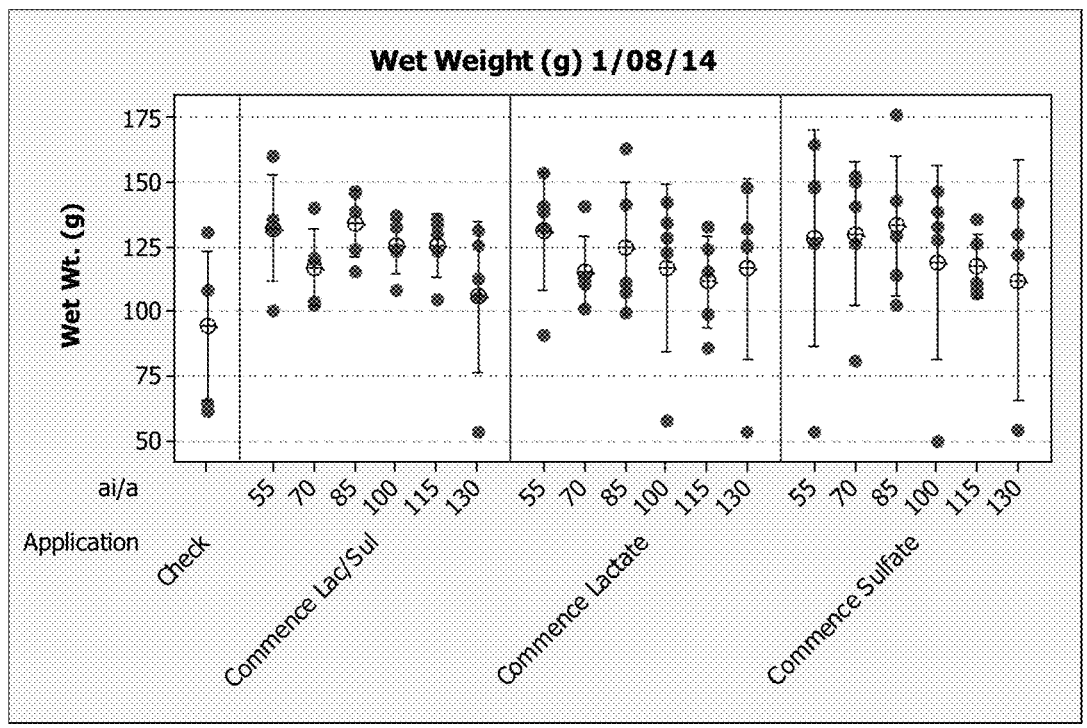
Figure 3A:
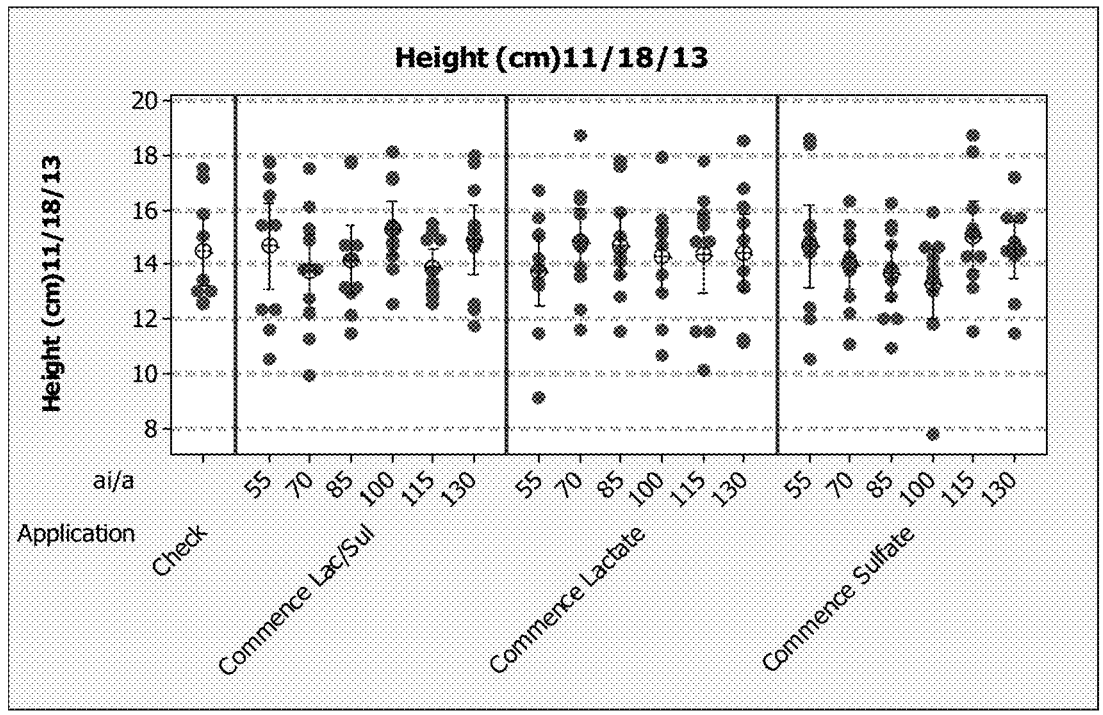
FIGS. 3A-D illustrate leaf height data for corn seed pre-treatment studies, according to one or more embodiments of this disclosure.
Figure 3B:
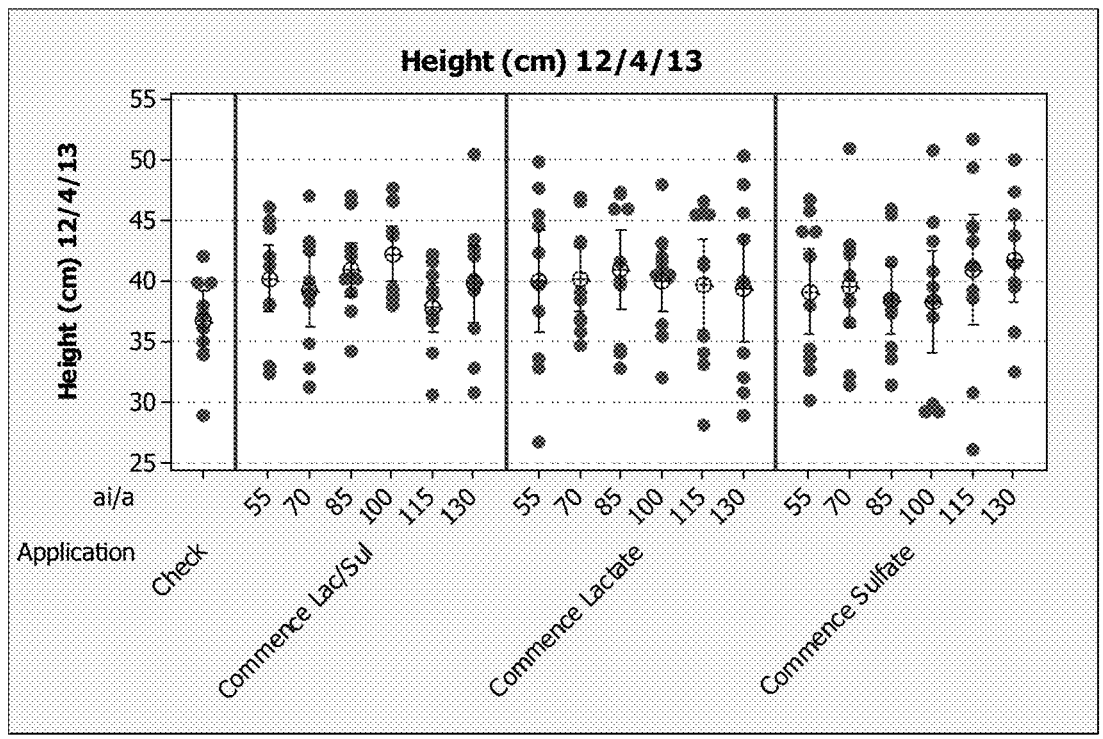
Figure 3C:
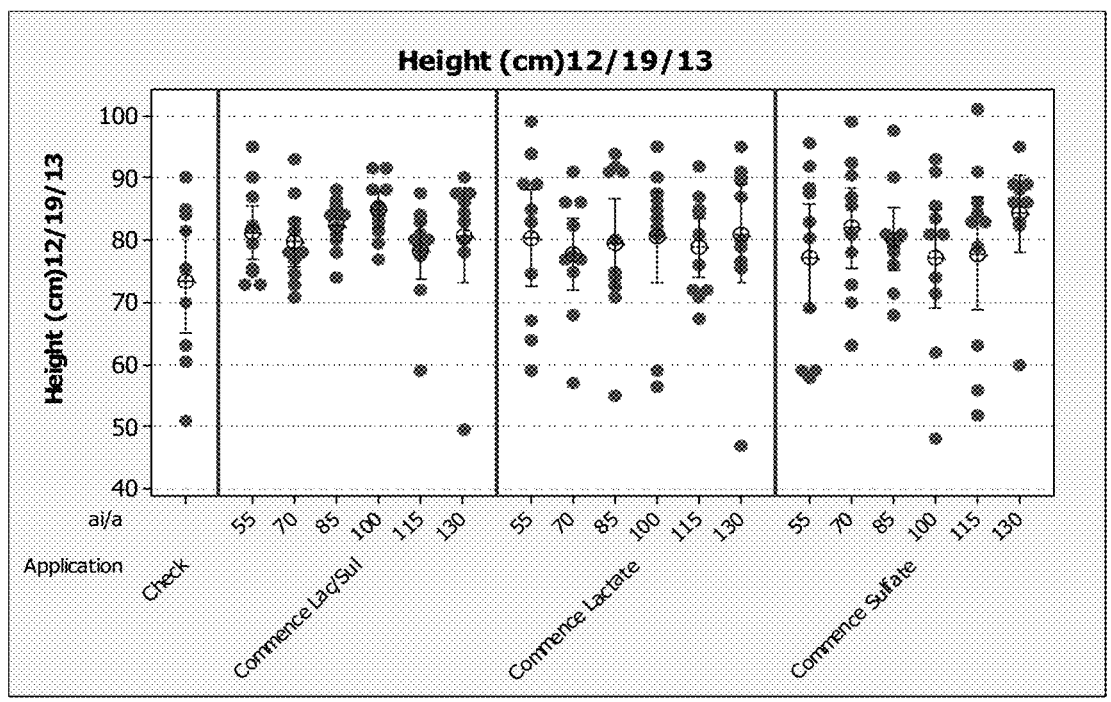
Figure 3D:
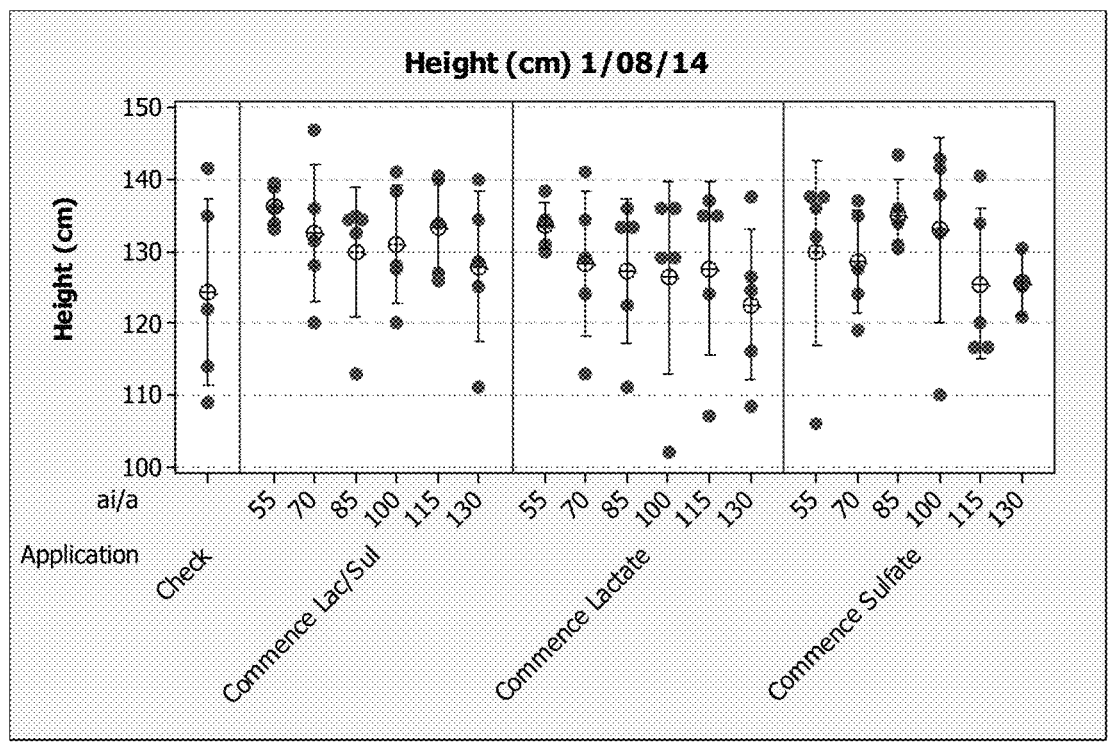
Figure 4A:
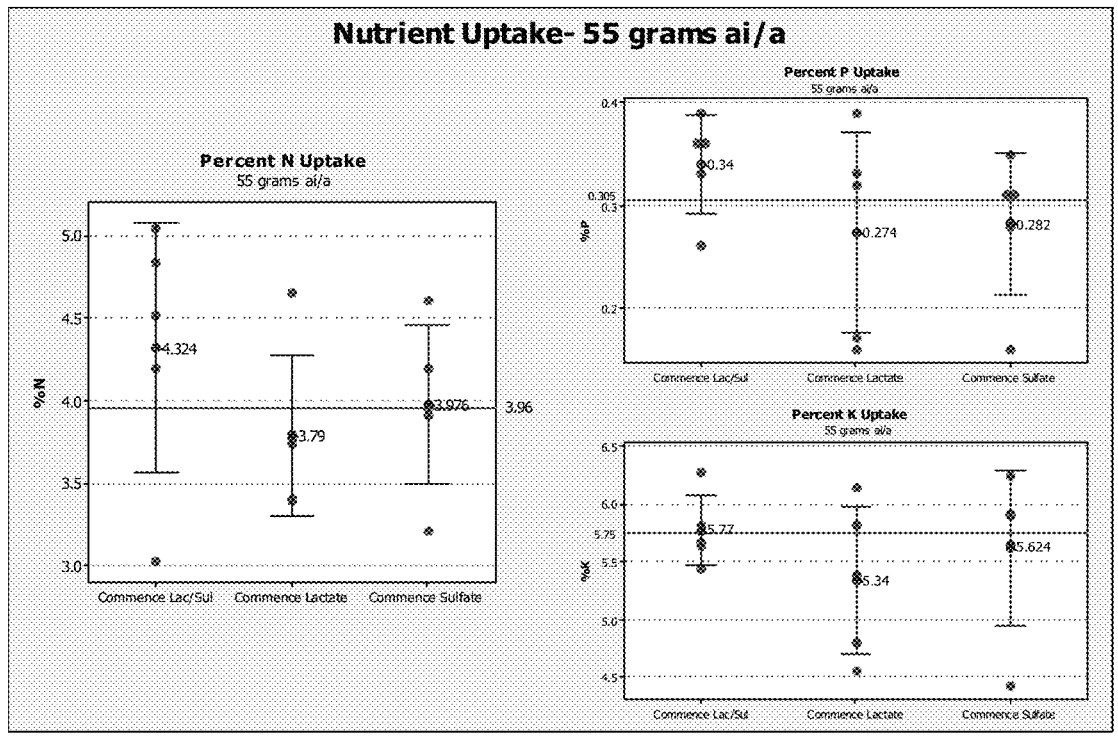
FIGS. 4A-F illustrate early nutrient uptake data for corn seed pre-treatment studies, according to one or more embodiments of this disclosure.
Figure 4B:
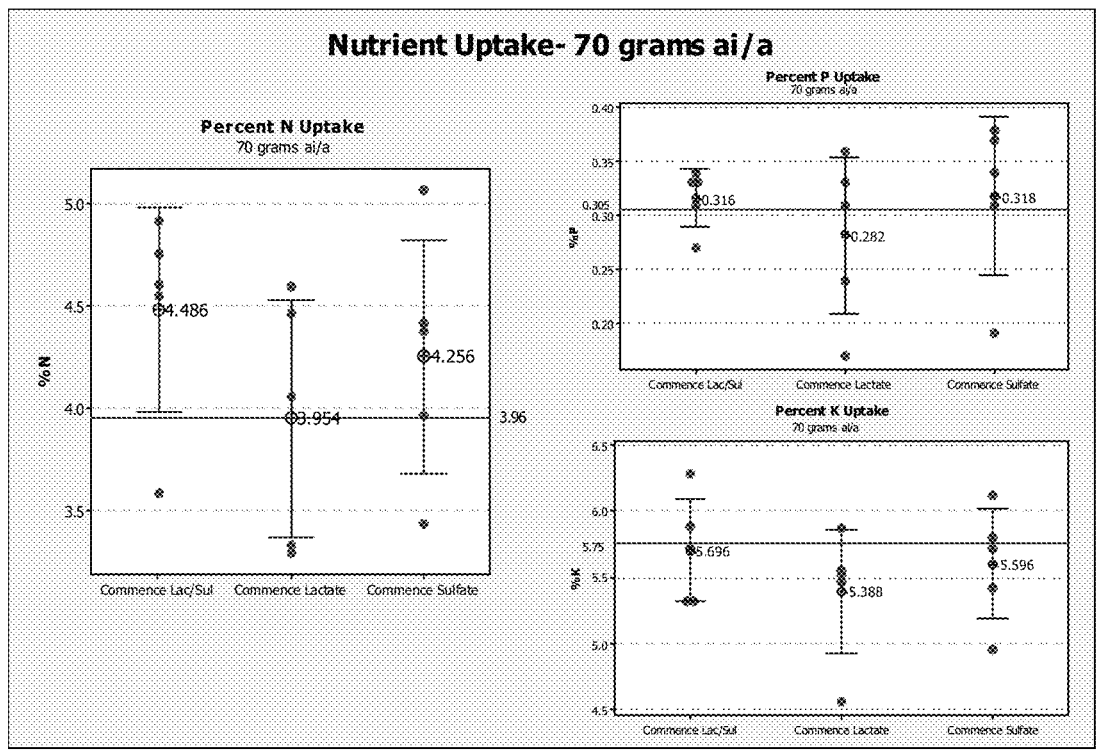
Figure 4C:
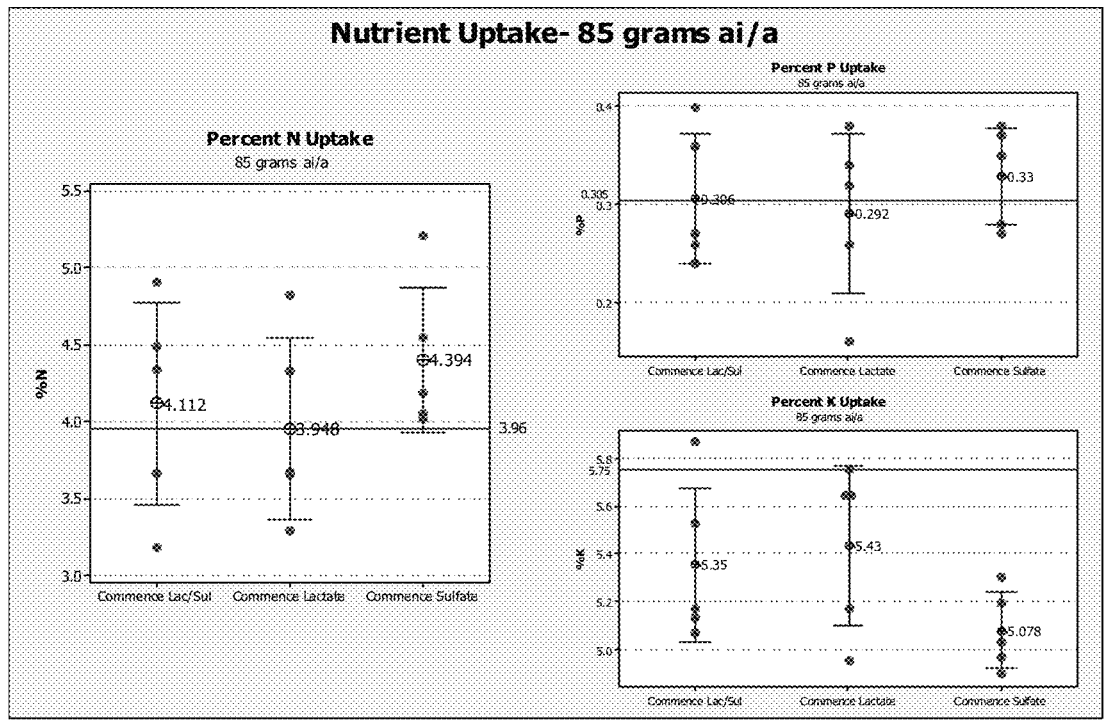
Figure 4D:
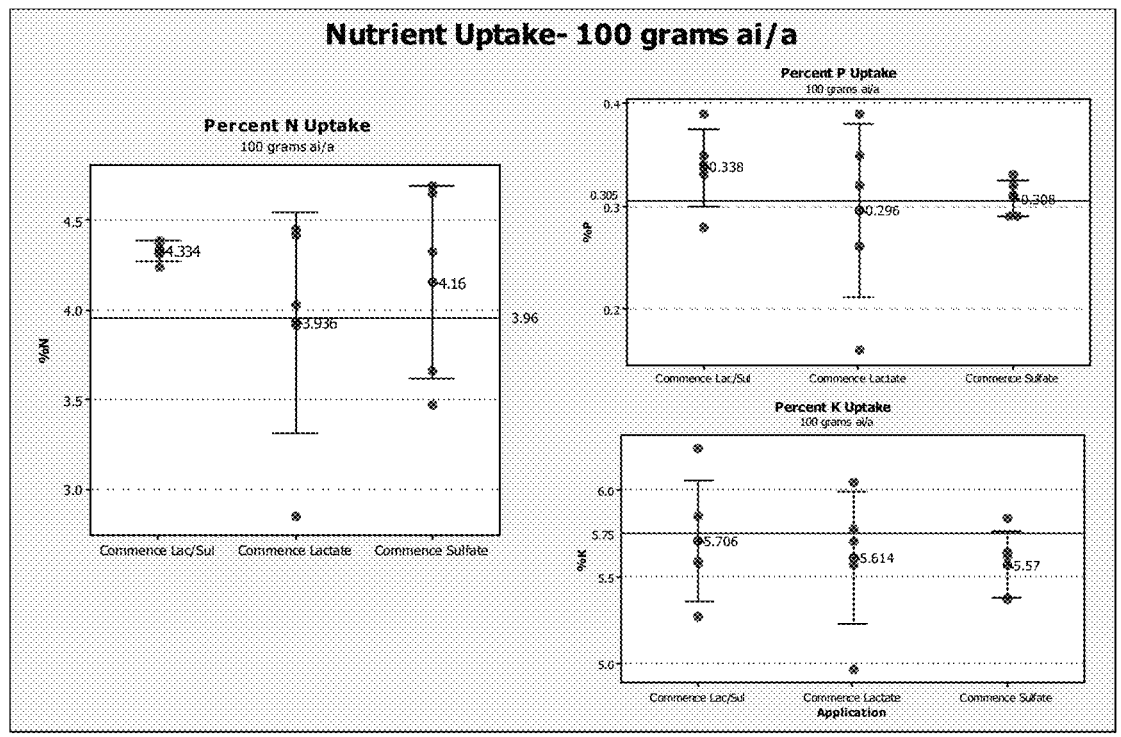
Figure 4E:
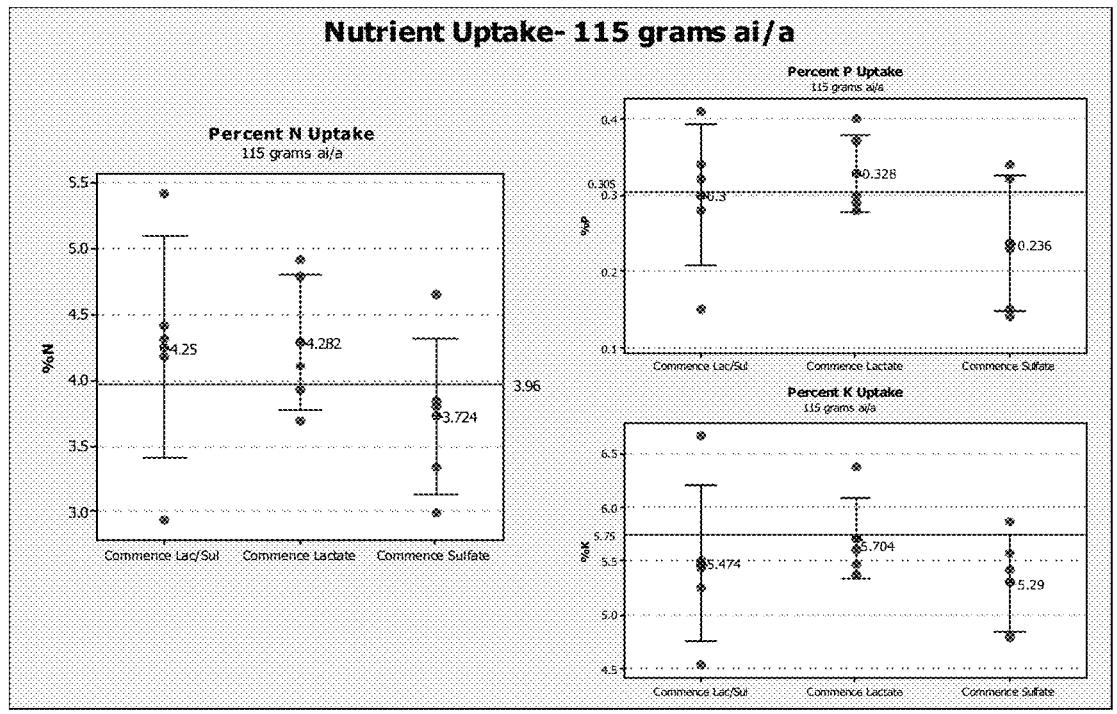
Figure 4F:
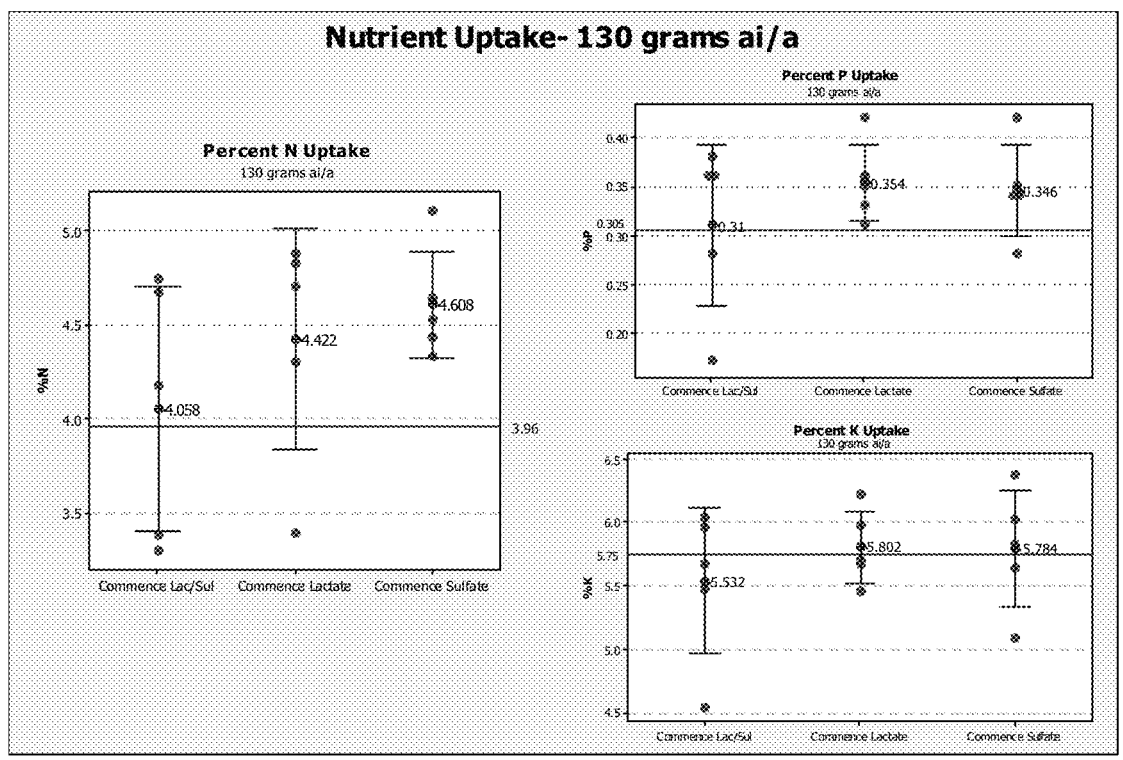
Figure 5A:
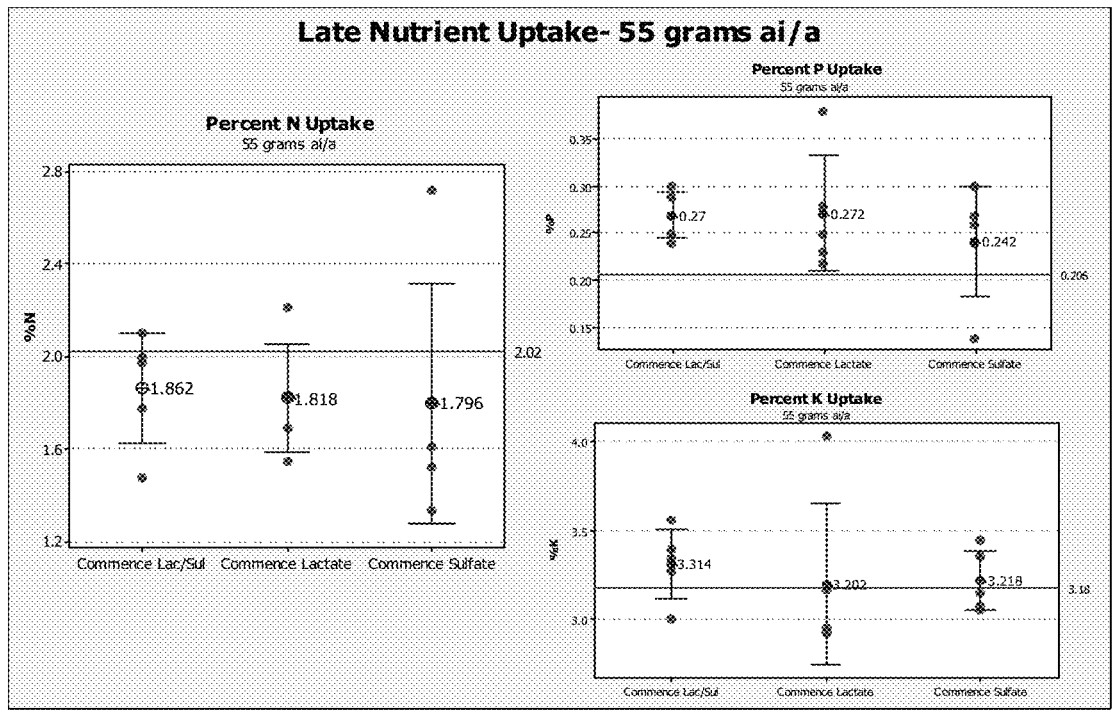
FIGS. 5A-F illustrate late nutrient uptake data for corn seed pre-treatment studies, according to one or more embodiments of this disclosure.
Figure 5B:
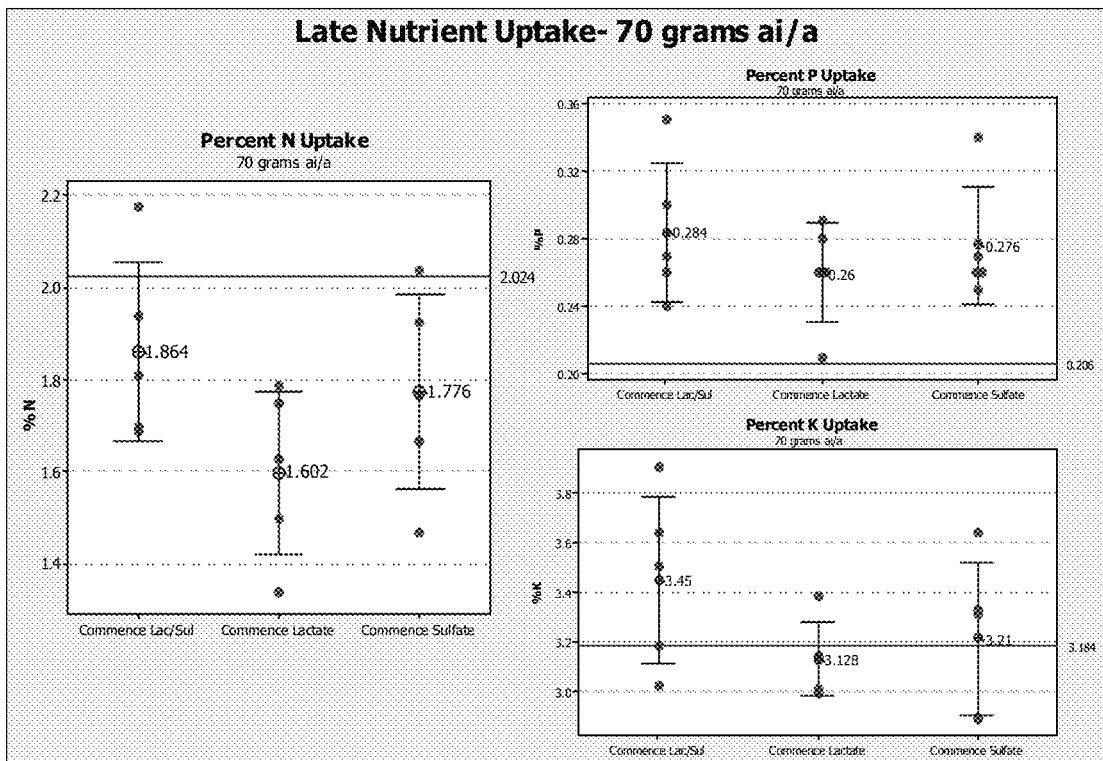
Figure 5C:
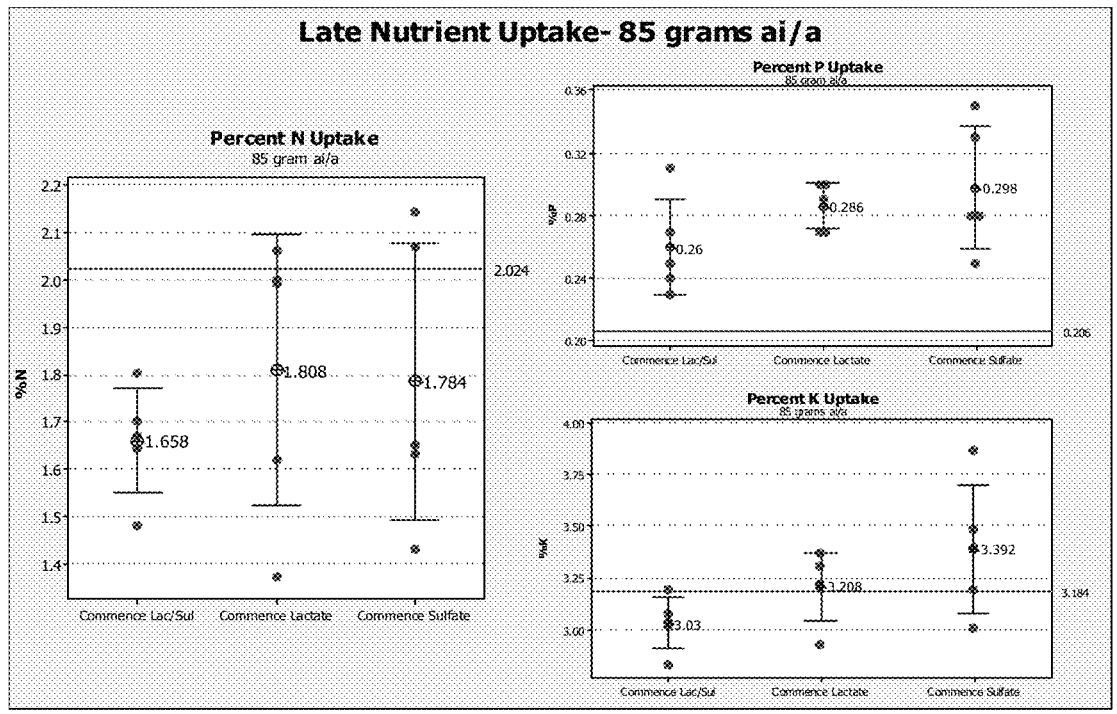
Figure 5D:
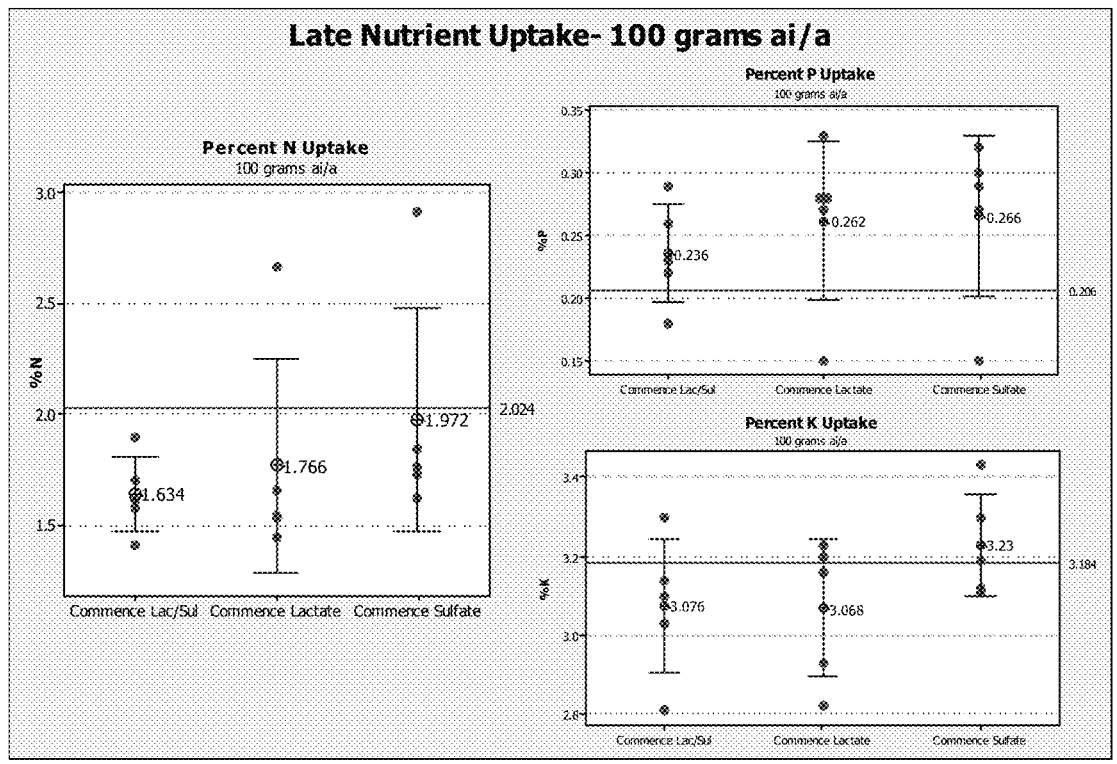
Figure 5E:
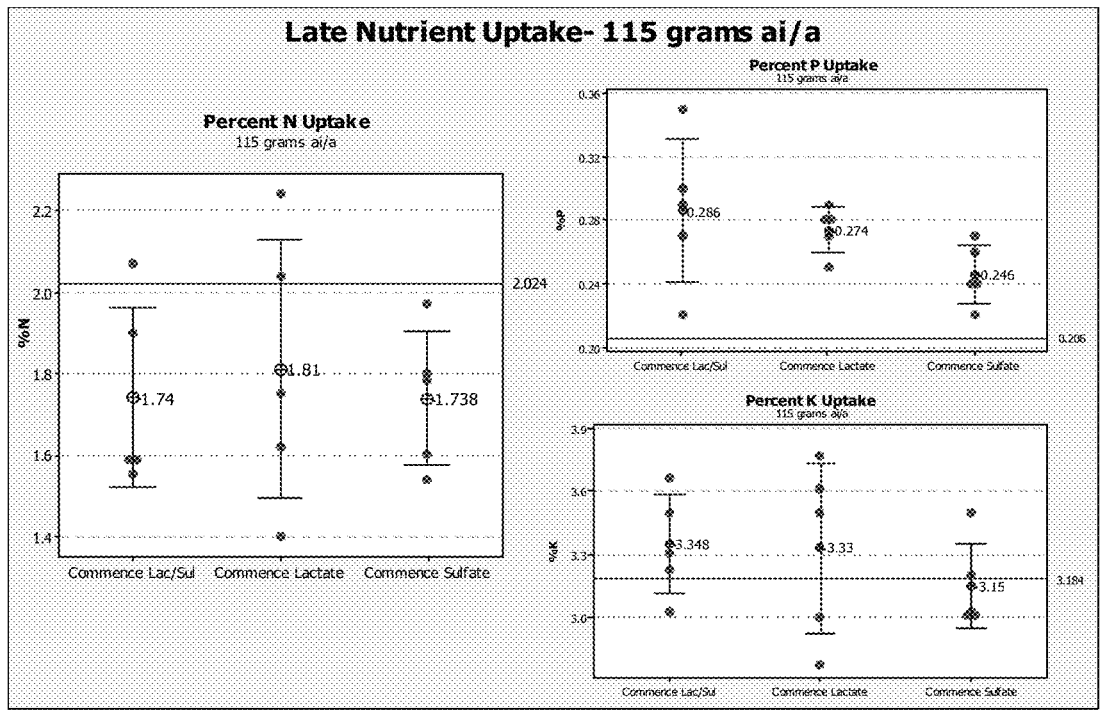
Figure 5F:
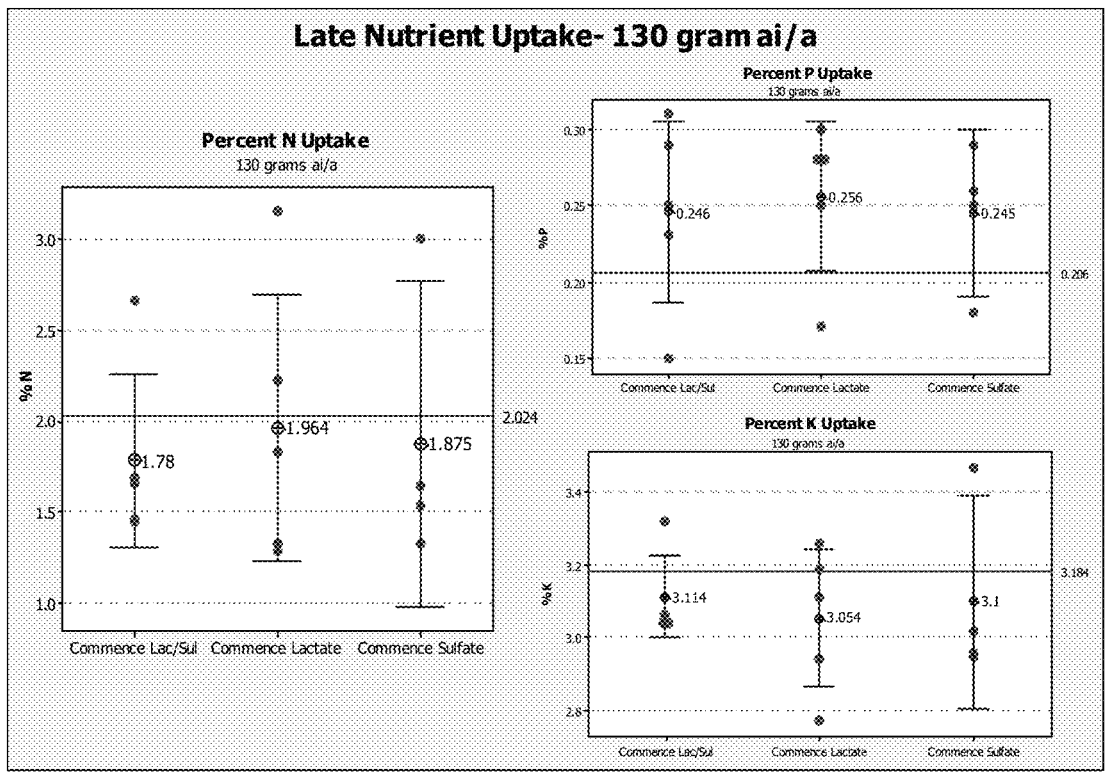

The study was conducted in a greenhouse with a complete randomized block format. Seeds were planted 1½ inches deep and watered consistently throughout the trial. Wet weight, leaf height, and NPK nutrient uptake were measured for seeds treated with all three compositions, and were also measured against a check (untreated seeds). There were 10 replications and 19 treatments. Wet weight was measured on two separate dates, Dec. 19, 2013 (45 days after planting) and Jan. 8, 2014 (65 days after planting), as shown in FIG. 2A-B. Extended leaf height was measured on four separate dates, Nov. 18, 2013, Dec. 4, 2013, Dec. 19, 2013, and Jan. 8, 2014, as shown in FIG. 3A-D. Tissue samples were taken on two separate dates, "early" Dec. 19, 2013, as shown in FIG. 4A-F (the horizontal solid line represents the check), and "late" Jan. 8, 2014, as shown in FIG. 5A-F (the horizontal solid line represents the check), to measure NPK nutrient uptake. Midwest Labs conducted the complete nutrient analysis.

The nutrient uptake data shown in FIGS. 4A-F and FIGS. 5A-F shows a general trend for the cobalt lactate composition to exhibit higher early nutrient uptake and lower late nutrient uptake. Conversely, the nutrient uptake data shown in FIGS. 4A-F and FIGS. 5A-F shows a general trend for the cobalt sulfate composition to exhibit lower early nutrient uptake and higher late nutrient uptake. These data speak to the time-release aspects of the cobalt MCMS composition, which is backed by the nutrient uptake data shown in FIGS. 4A-F and FIGS. 5A-F. At most ai/a levels, the cobalt MCMS composition had more consistent, and often higher, nutrient uptake than the cobalt lactate composition and the cobalt sulfate composition. The cobalt MCMS also outperformed the check at all ai/a levels.

Example 2: Soybean Seed Treatment

A study was conducted wherein a cobalt MCMS composition pre-treatment was applied to soybean seeds at an active ingredient weight in grams per acre (ai/a) of 15 ai/a, 20 ai/a, and 25 ai/a. In this case, "active ingredient" refers to the total weight of all non-carrier components in the MCMS composition, and 1 acre is the equivalent of 50 lbs of seeds. The cobalt MCMS composition was applied to soybean seeds in a combination conveyor/tumbler, wherein application rate is controlled by sprayers. The cobalt MCMS composition is detailed in Table 4:

TABLE 4

Cobalt MCMS composition for Example 2

| Cobalt MCMS Composition Ingredients | %/wt | grams |
|---|---|---|
| R.O. Water (Carrier) | 67.13 | 671.3 |
| Cobalt Lactate, Dihydrate (21.579% Co) | 2.8 | 28 |
| Cobalt Sulfate, Heptahydrate (20.965% Co) | 9.18 | 91.8 |
| Ferric Sodium EDTA (13.26% Fe) | 9.38 | 93.8 |
| Manganese Lactate, Dihydrate (20.42% Mn) | 3.99 | 39.9 |
| Copper Sulfate, Pentahydrate (25.46% Cu) | 2.34 | 23.4 |
| Zinc Sulfate, Monohydrate (36% Zn) | 1.41 | 14.1 |
| Molybdic Acid (59.2% Mo) | 0.01 | 0.1 |
| Enzyme W | 0.01 | 0.1 |
| Larafeed Liquid | 0.94 | 9.4 |
| Saponix 5000 | 2.81 | 28.1 |
| Total | 100 | 1000 |

The cobalt MCMS composition was tested against a cobalt lactate composition and a cobalt sulfate composition at each active ingredient rate. All three compositions contain the same percent cobalt per unit with or without the carrier (R.O. water). The cobalt sulfate composition is detailed in Table 5, and the cobalt lactate composition is detailed in Table 6:

TABLE 5

Cobalt Sulfate Composition for Example 2:

| Cobalt Sulfate Composition | %/wt | grams |
|---|---|---|
| R.O. Water (Carrier) | 67.047 | 670.47 |
| Cobalt Sulfate, Heptahydrate (20.964% Co) | 12.063 | 120.63 |
| Ferric Sodium EDTA (13.26% Fe) | 9.38 | 93.8 |
| Manganese Lactate, Dihydrate (20.42% Mn) | 3.99 | 39.9 |
| Copper Sulfate, Pentahydrate (25.46% Cu) | 2.34 | 23.4 |
| Zinc Sulfate, Monohydrate (36% Zn) | 1.41 | 14.1 |
| Molybdic Acid (59.2% Mo) | 0.01 | 0.1 |
| Enzyme W | 0.01 | 0.1 |
| Larafeed Liquid (Commercial Product) | 0.94 | 9.4 |
| Saponix 5000 (Commercial Product) | 2.81 | 28.1 |
| Total | 100 | 1000 |

TABLE 6

Cobalt Lactate Composition for Example 2:

| Cobalt Lactate Composition | %/wt | grams |
|---|---|---|
| R.O. Water (Carrier) | 66.79 | 667.9 |
| TIC Gum | 0.6 | 6 |
| Cobalt Lactate, Dihydrate (21.579% Co) | 11.72 | 117.2 |
| Ferric Sodium EDTA (13.26% Fe) | 9.38 | 93.8 |
| Manganese Lactate, Dihydrate (20.42% Mn) | 3.99 | 39.9 |
| Copper Sulfate, Pentahydrate (25.46% Cu) | 2.34 | 23.4 |
| Zinc Sulfate, Monohydrate (36% Zn) | 1.41 | 14.1 |
| Molybdic Acid (59.2% Mo) | 0.01 | 0.1 |
| Enzyme W | 0.01 | 0.1 |
| Larafeed Liquid (Commercial Product) | 0.94 | 9.4 |
| Saponix 5000 (Commercial Product) | 2.81 | 28.1 |
| Total | 100 | 1000 |

Figure 6A:
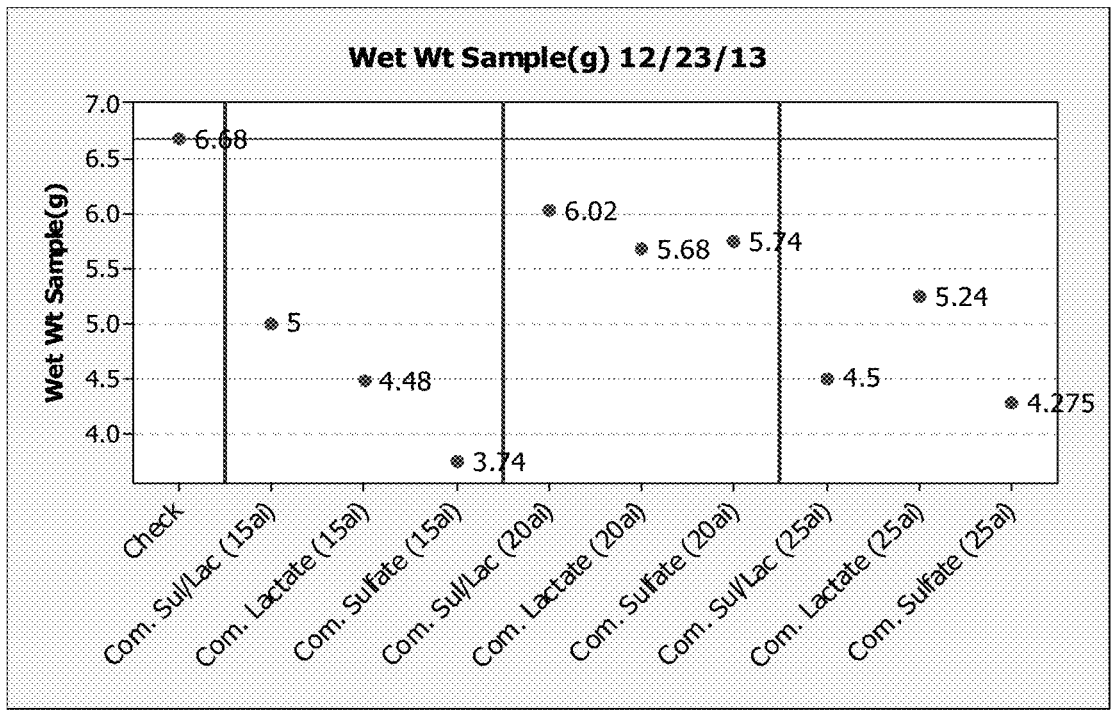
FIGS. 6A-B illustrate wet weight data for soybean seed pre-treatment studies, according to one or more embodiments of this disclosure.
Figure 6B:
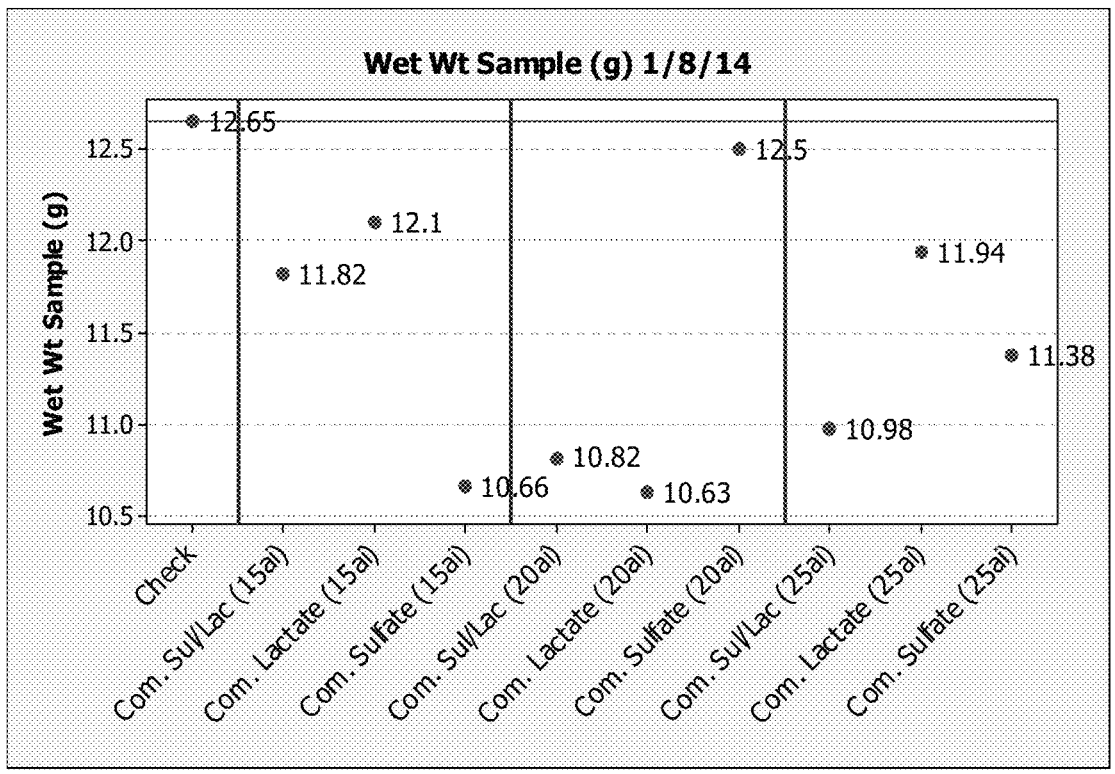
Figure 7A:
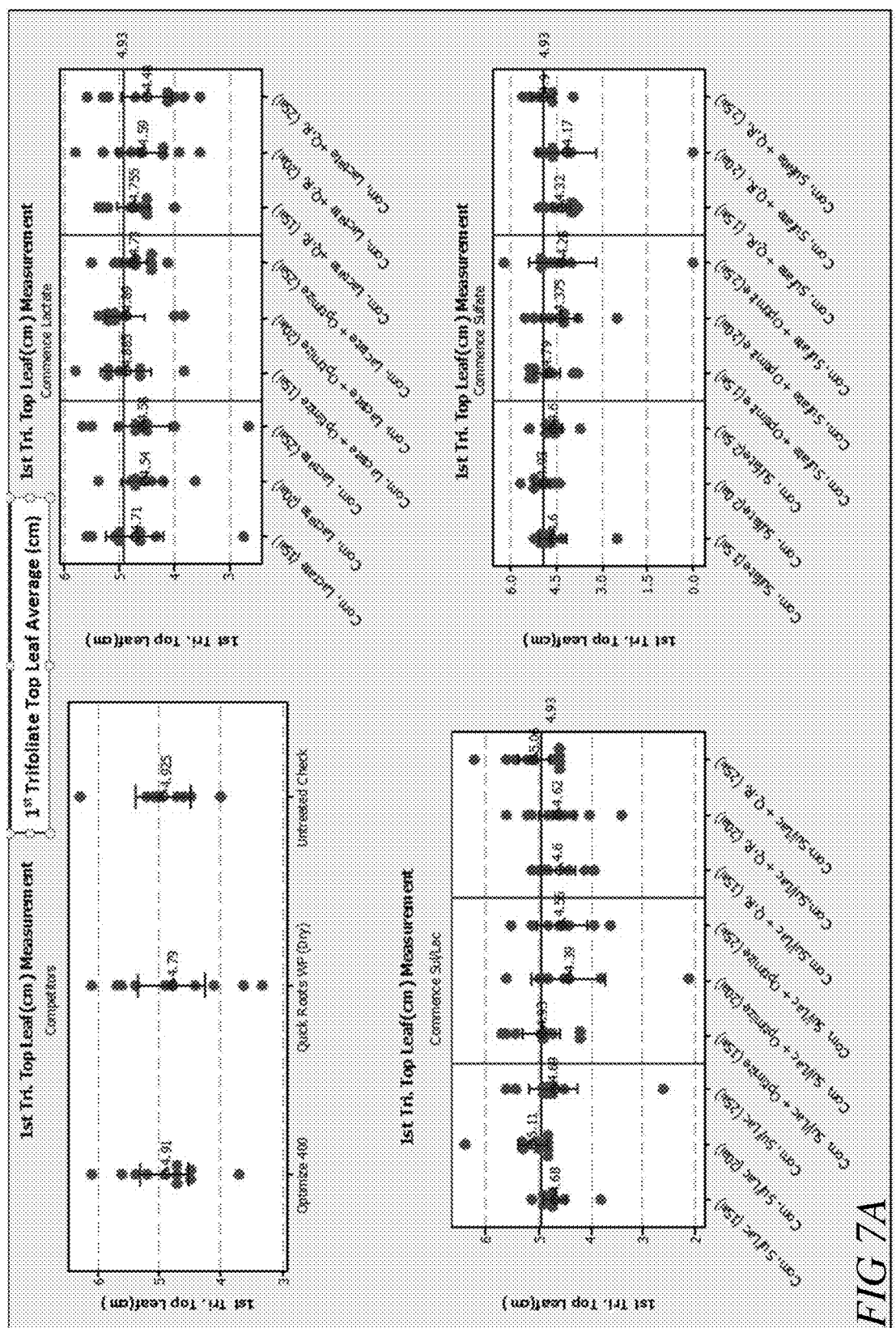
FIGS. 7A-F illustrate leaf measurement data for soybean seed pre-treatment studies, according to one or more embodiments of this disclosure.
Figure 7B:
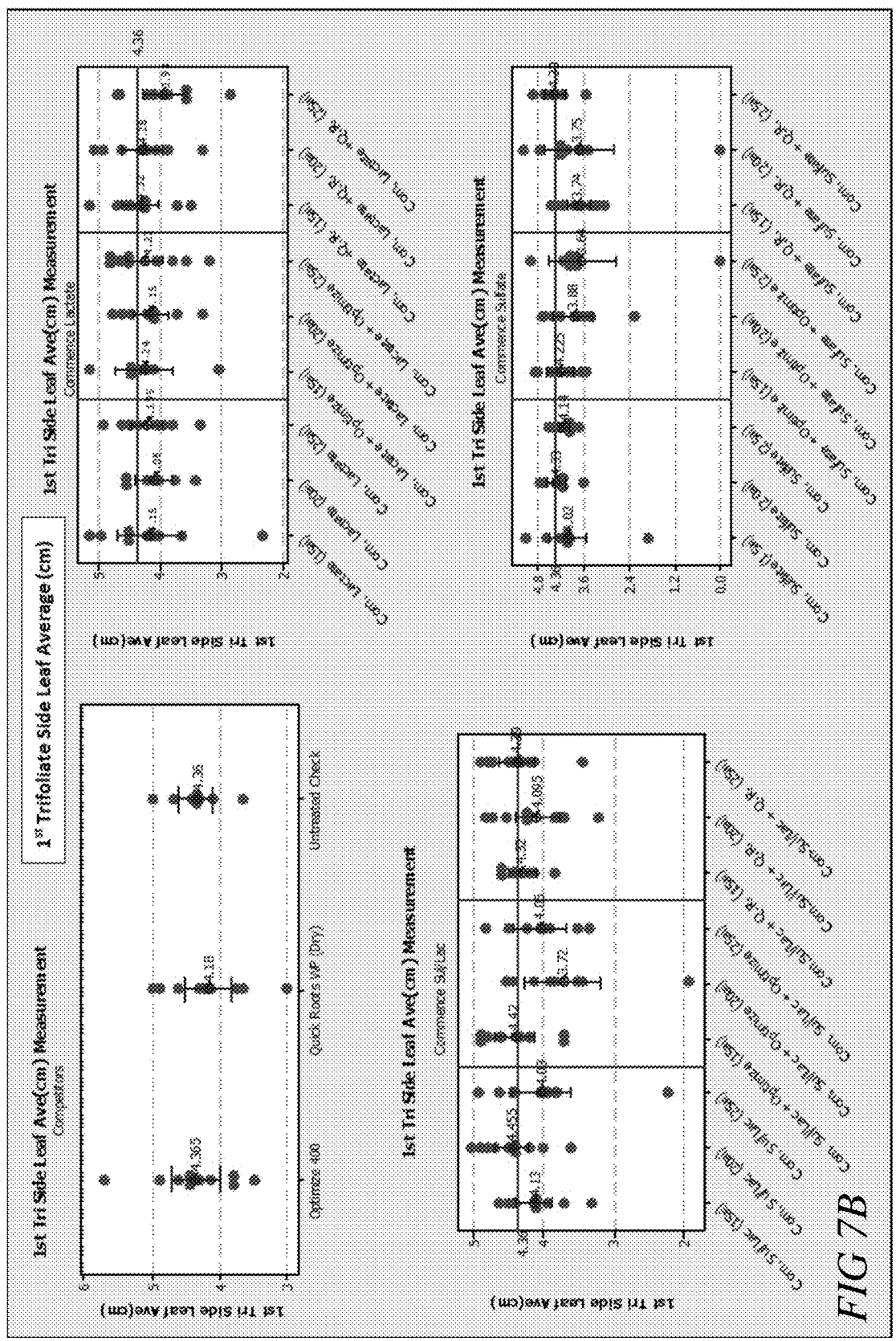
Figure 7C:
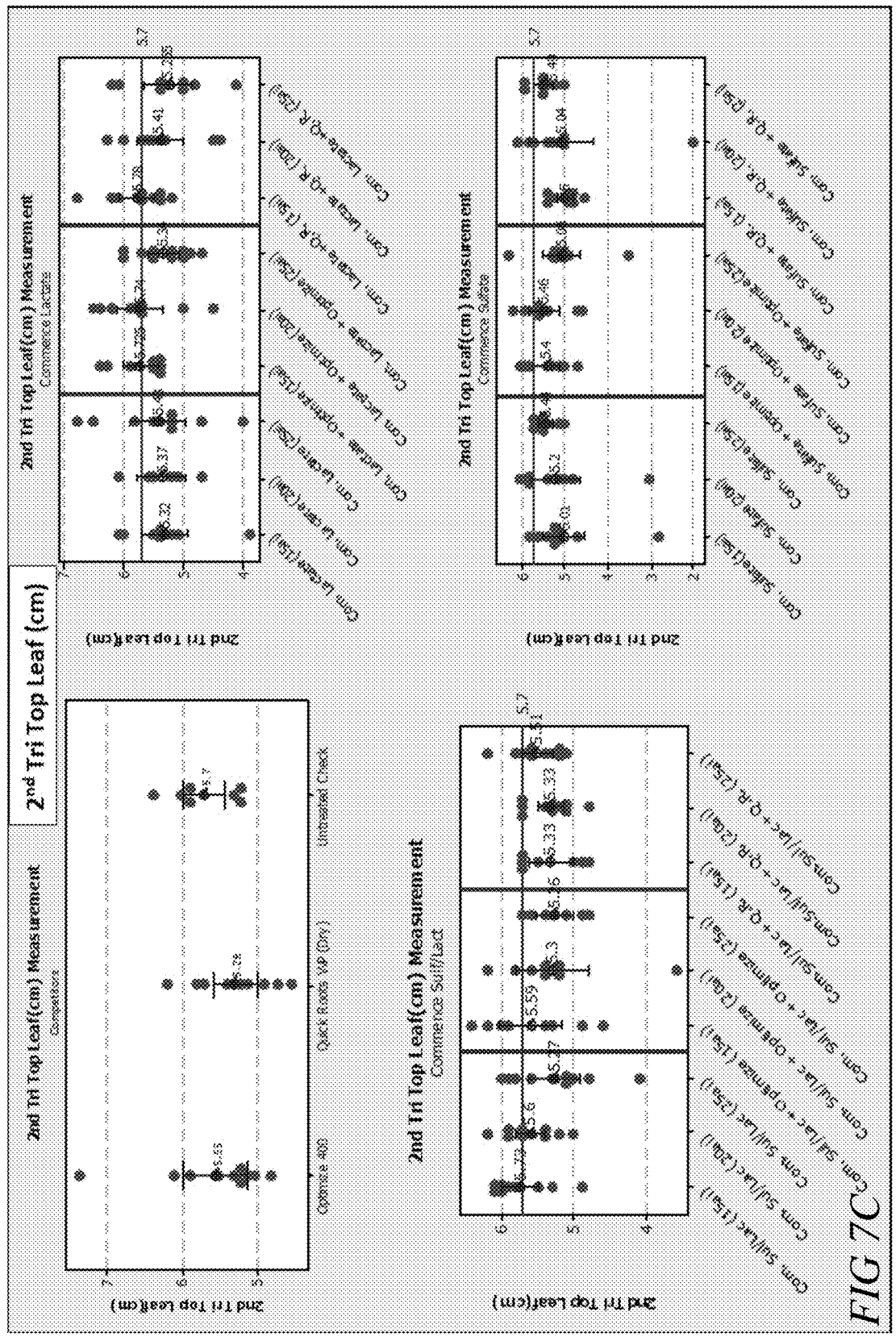
Figure 7D:
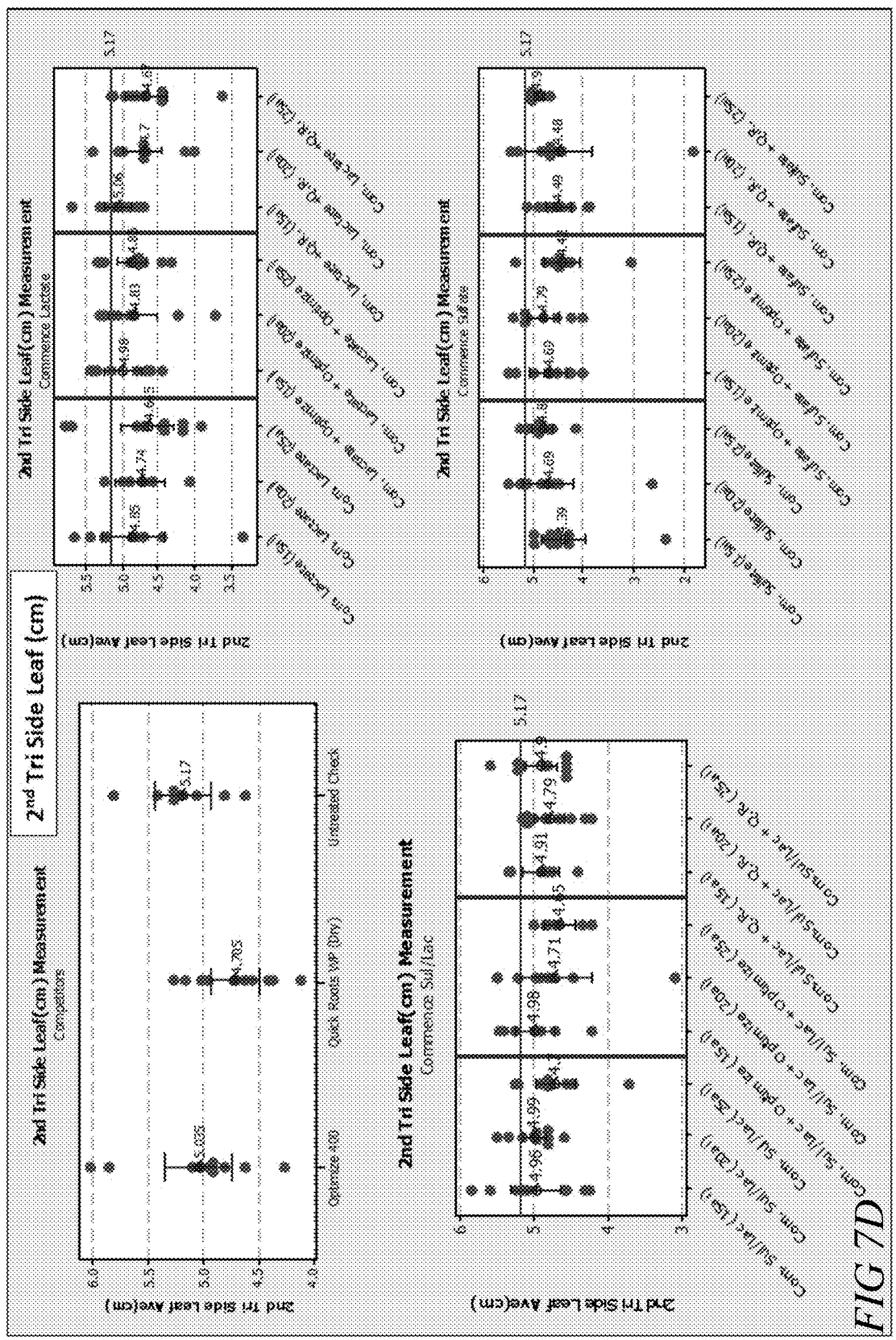
Figure 7E:
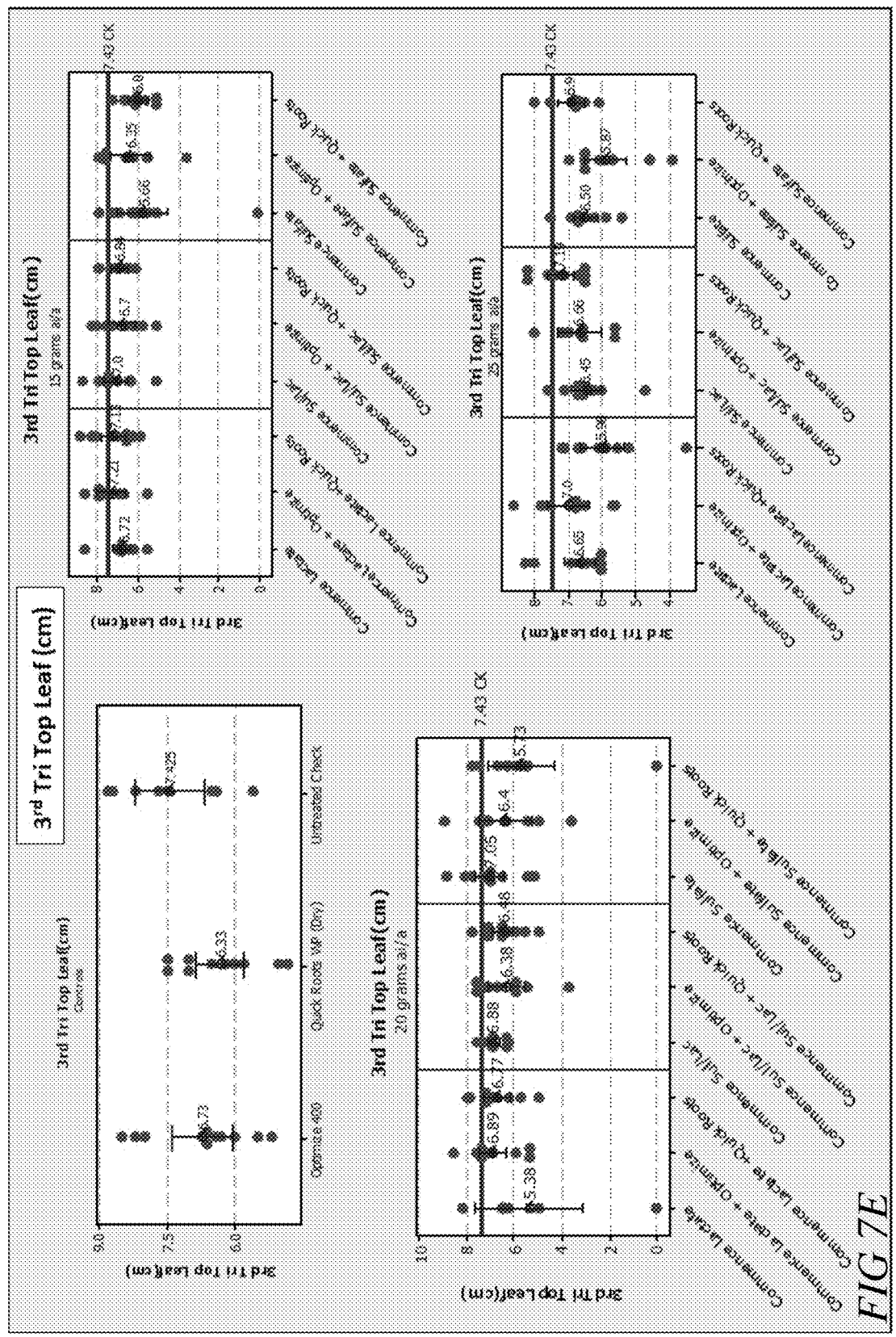
Figure 7F:
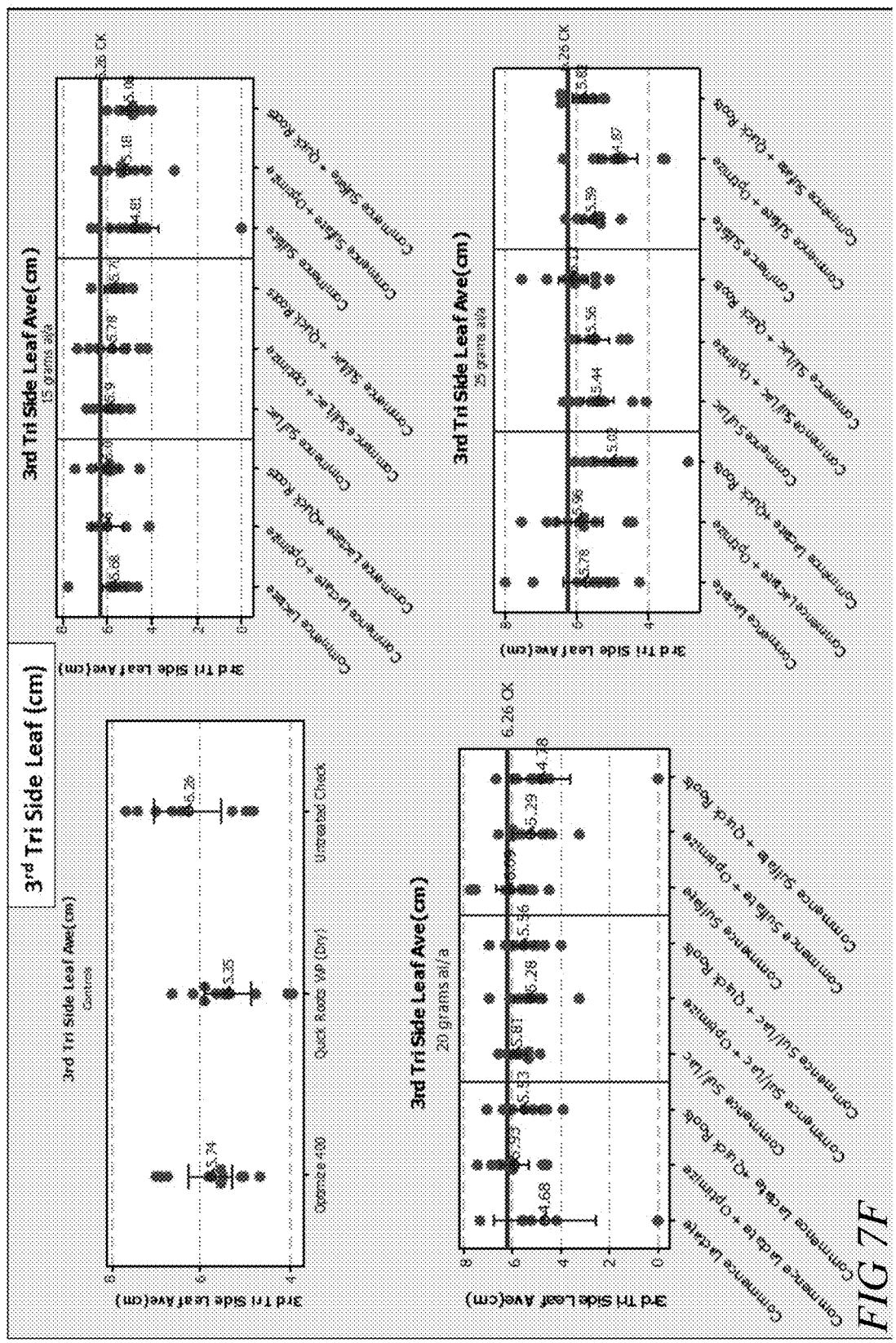
Figure 8A:
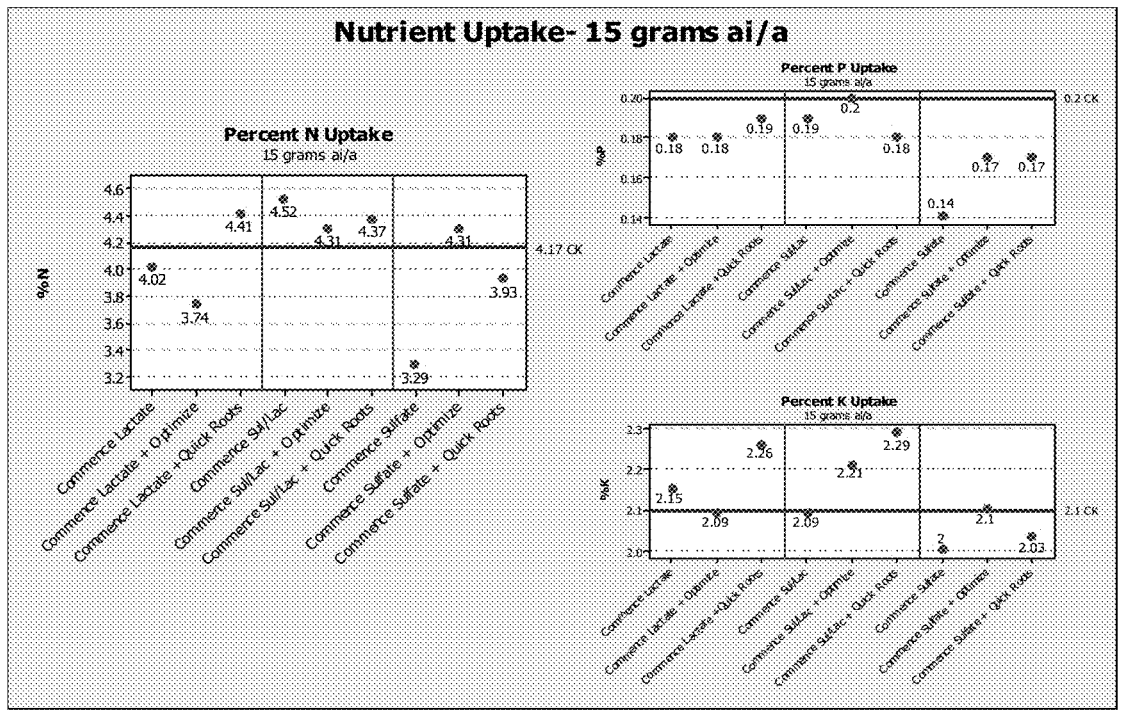
FIGS. 8A-C illustrate early nutrient uptake data for soybean seed pre-treatment studies, according to one or more embodiments of this disclosure.
Figure 8B:
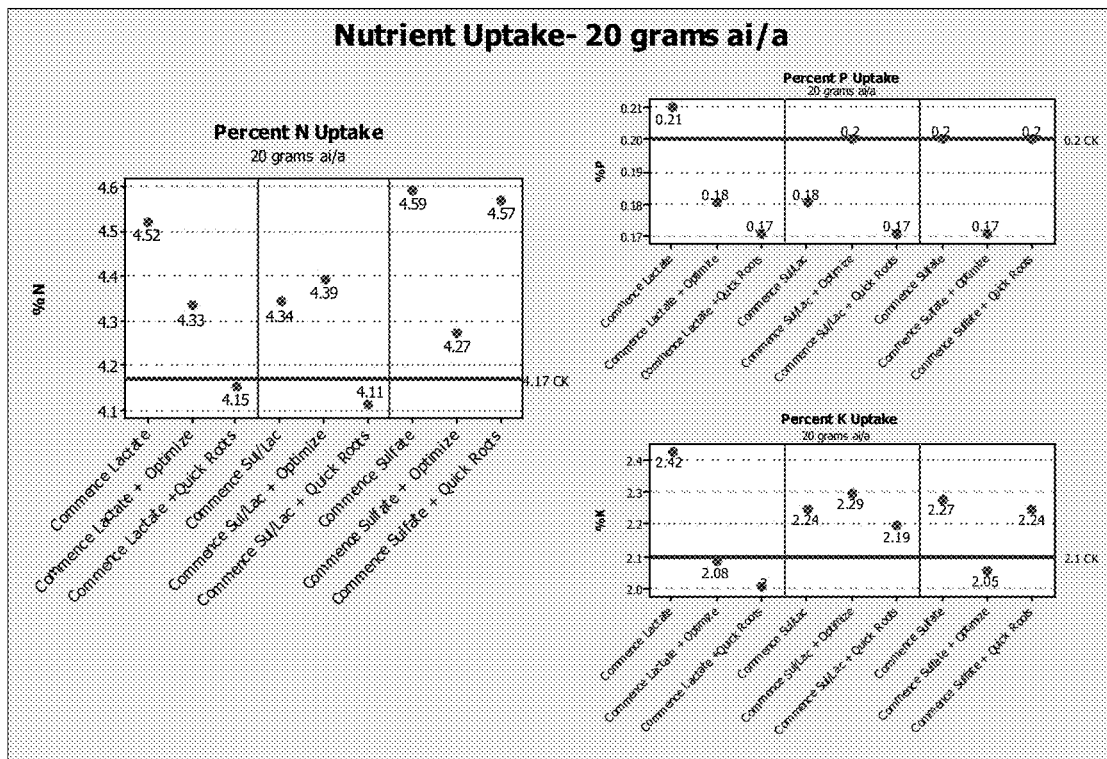
Figure 8C:
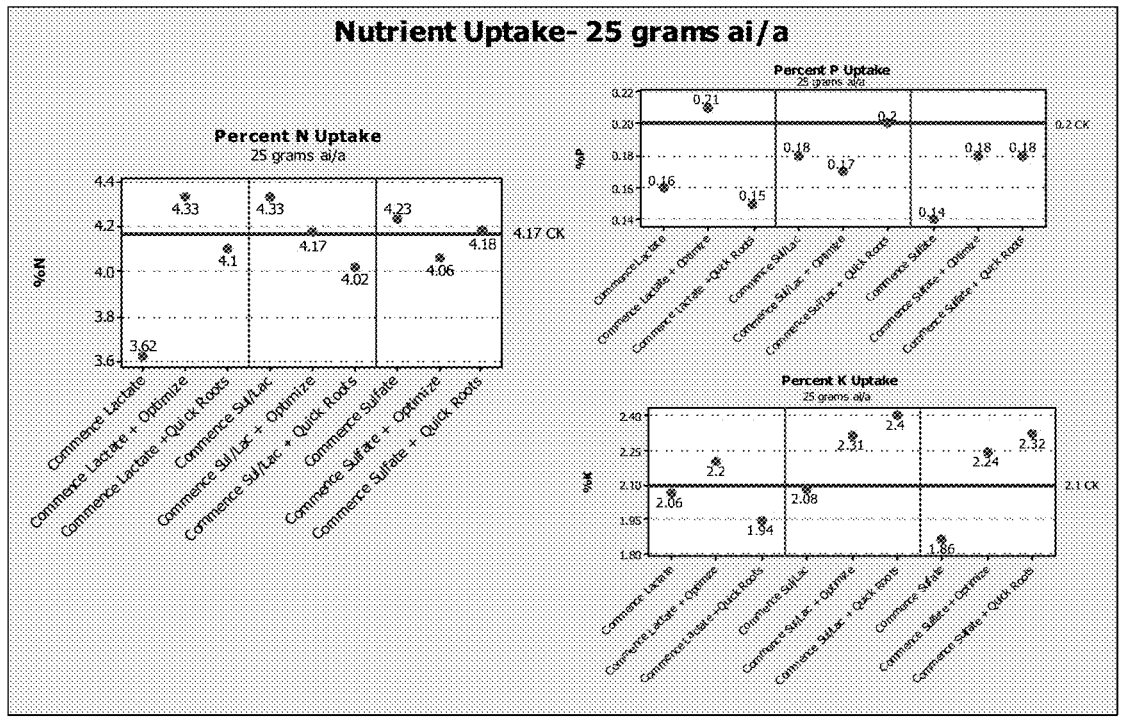
Figure 9A:
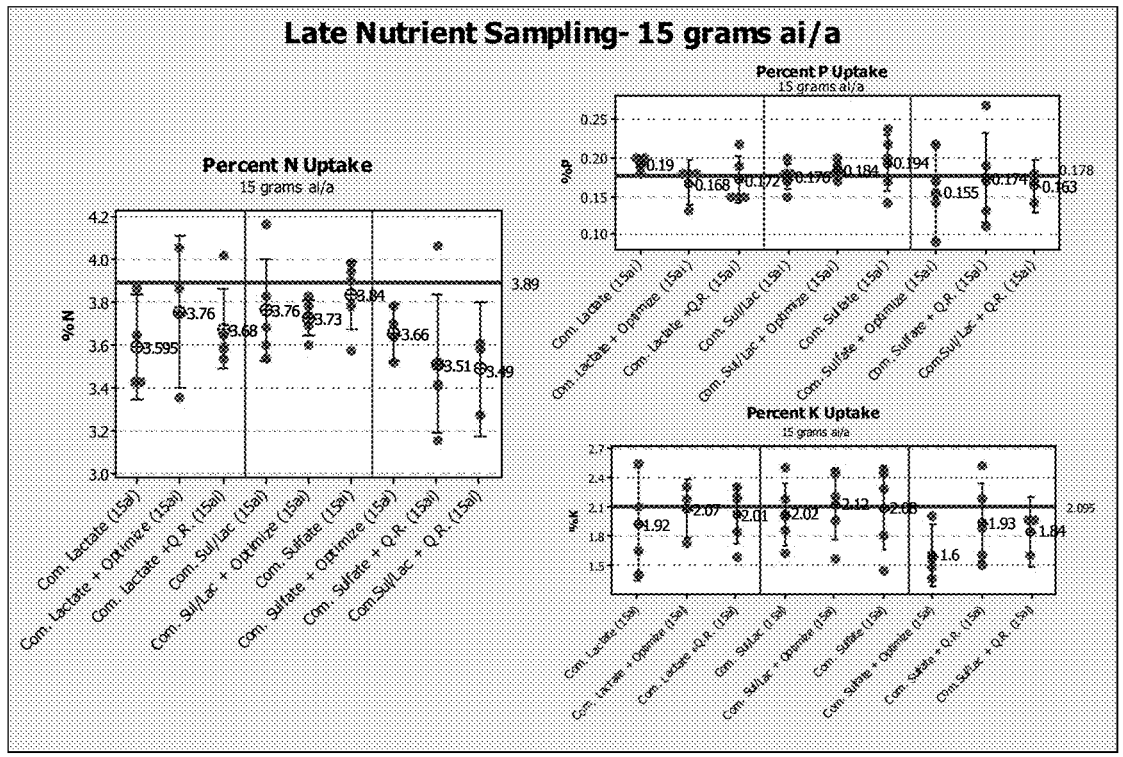
FIGS. 9A-C illustrate late nutrient uptake data for soybean seed pre-treatment studies, according to one or more embodiments of this disclosure.
Figure 9B:
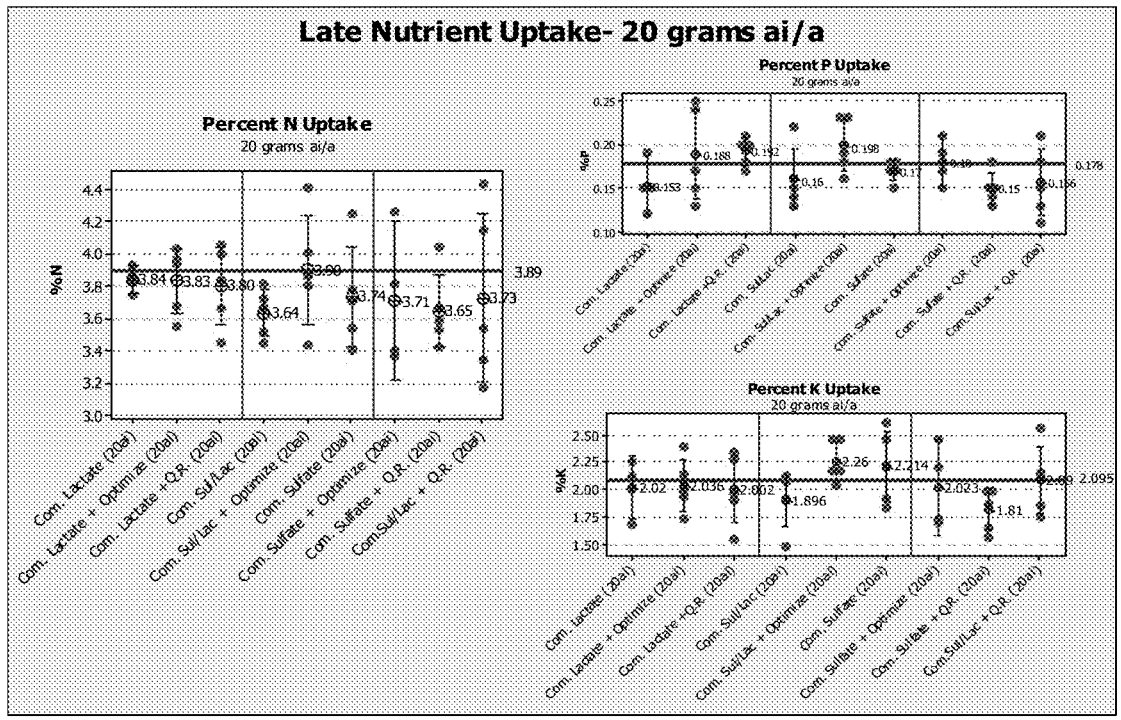
Figure 9C:
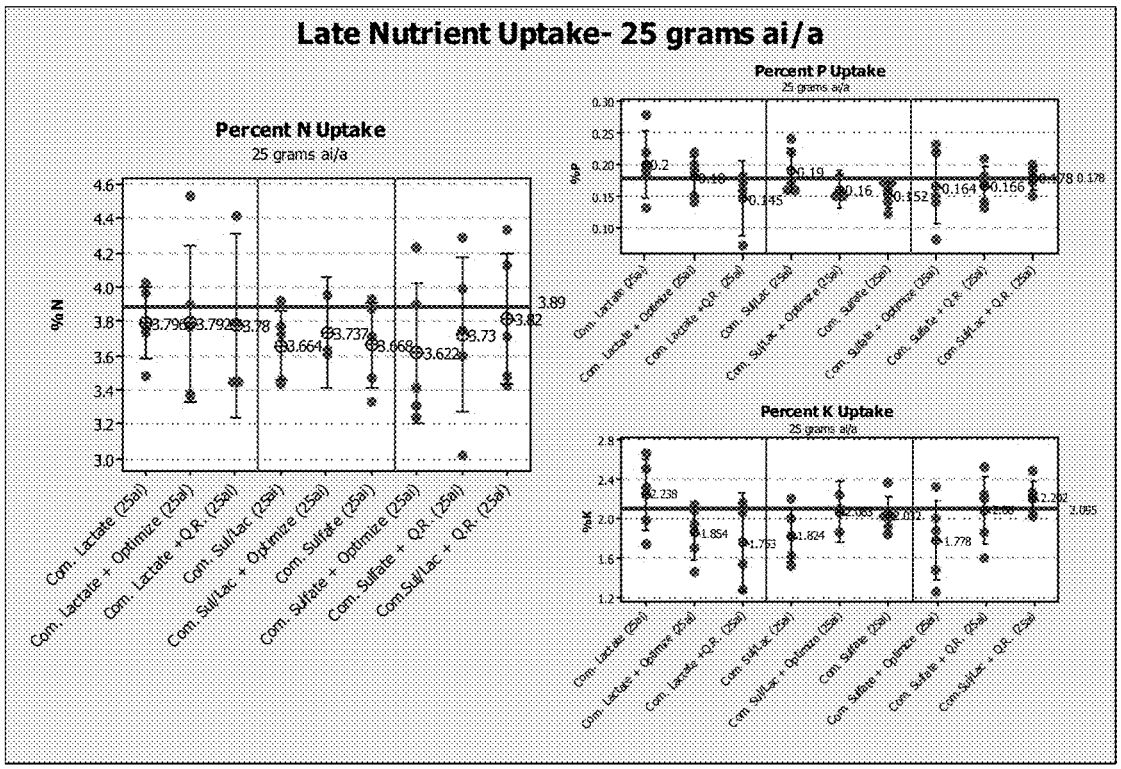
Figure 10A:
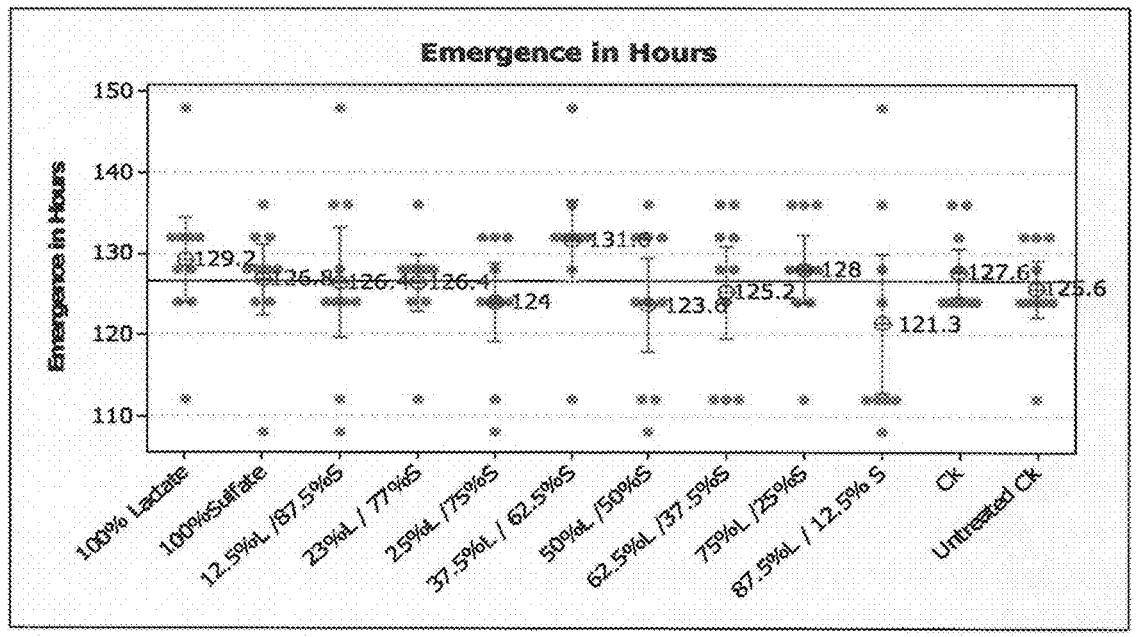
FIG. 10A illustrates emergence data for corn seed pre-treatment studies, according to one or more embodiments of this disclosure.
Figure 10B:
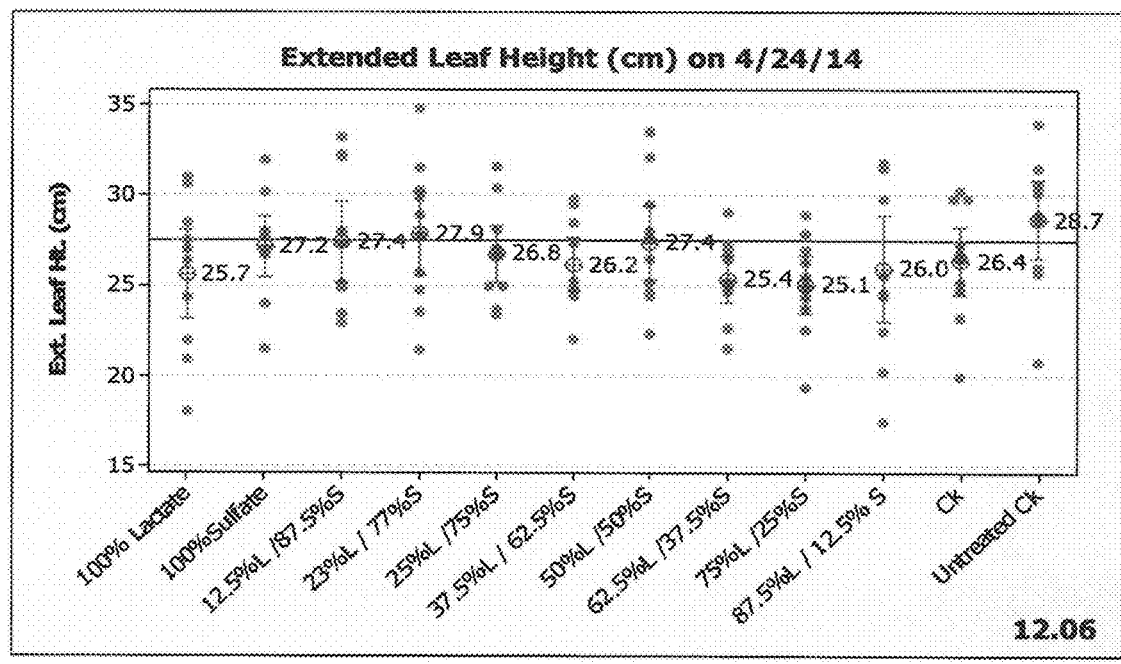
FIG. 10B illustrates extended leaf height data for corn seed pre-treatment studies, according to one or more embodiments of this disclosure.
Figure 10C:
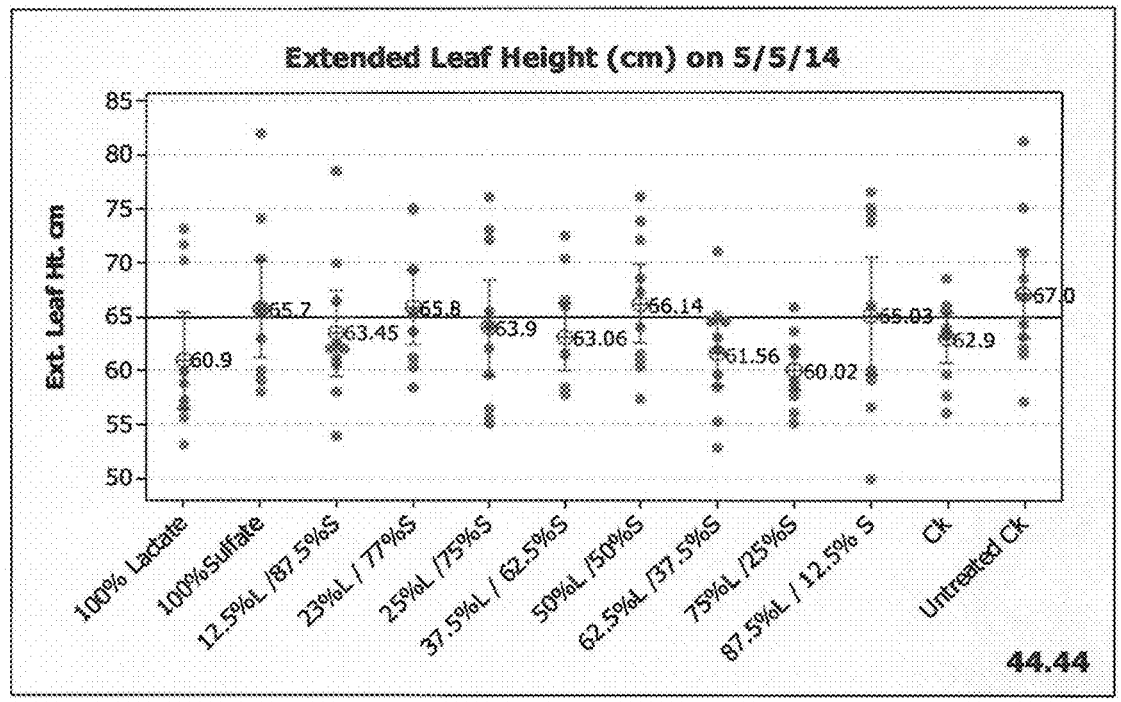
FIG. 10C illustrates extended leaf height data for corn seed pre-treatment studies, according to one or more embodiments of this disclosure.
Figure 10D:
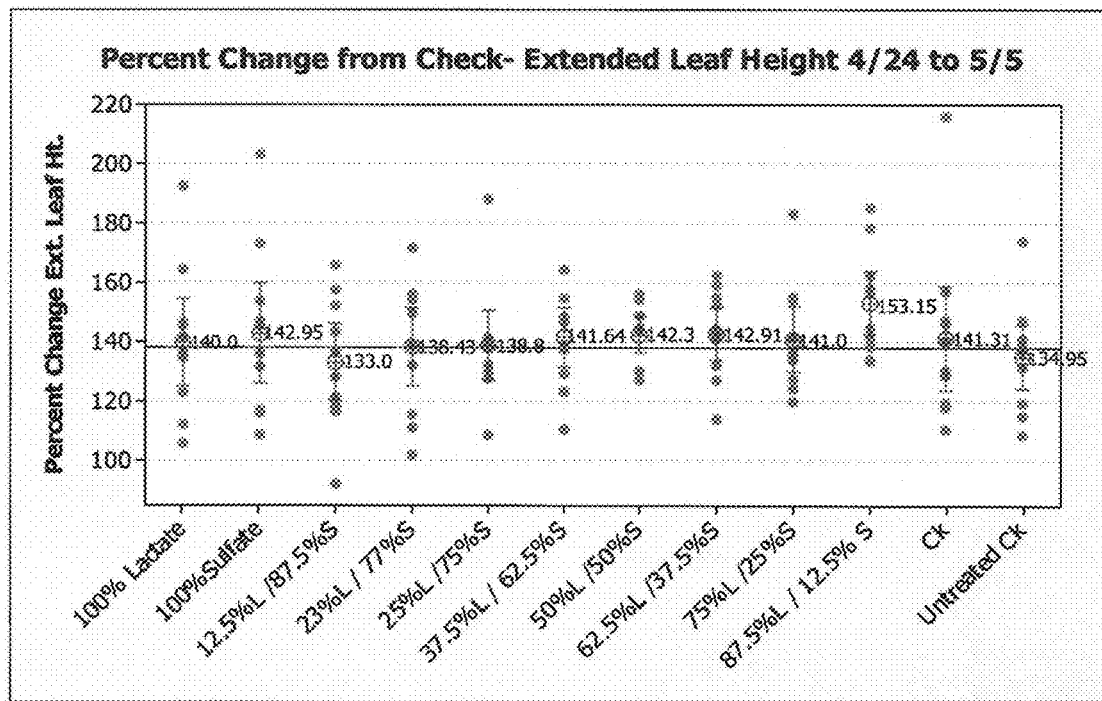
FIG. 10D illustrates extended leaf height data for corn seed pre-treatment studies, according to one or more embodiments of this disclosure.
Figure 10E:
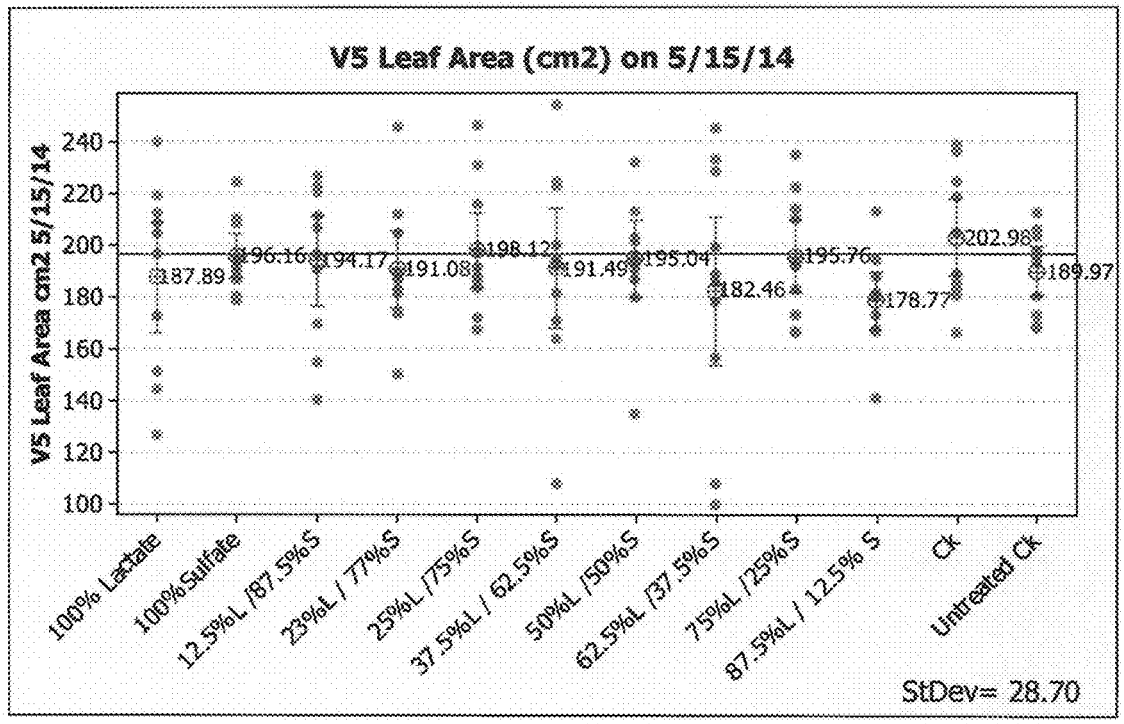
FIG. 10E illustrates leaf area data for corn seed pre-treatment studies, according to one or more embodiments of this disclosure.
Figure 10F:
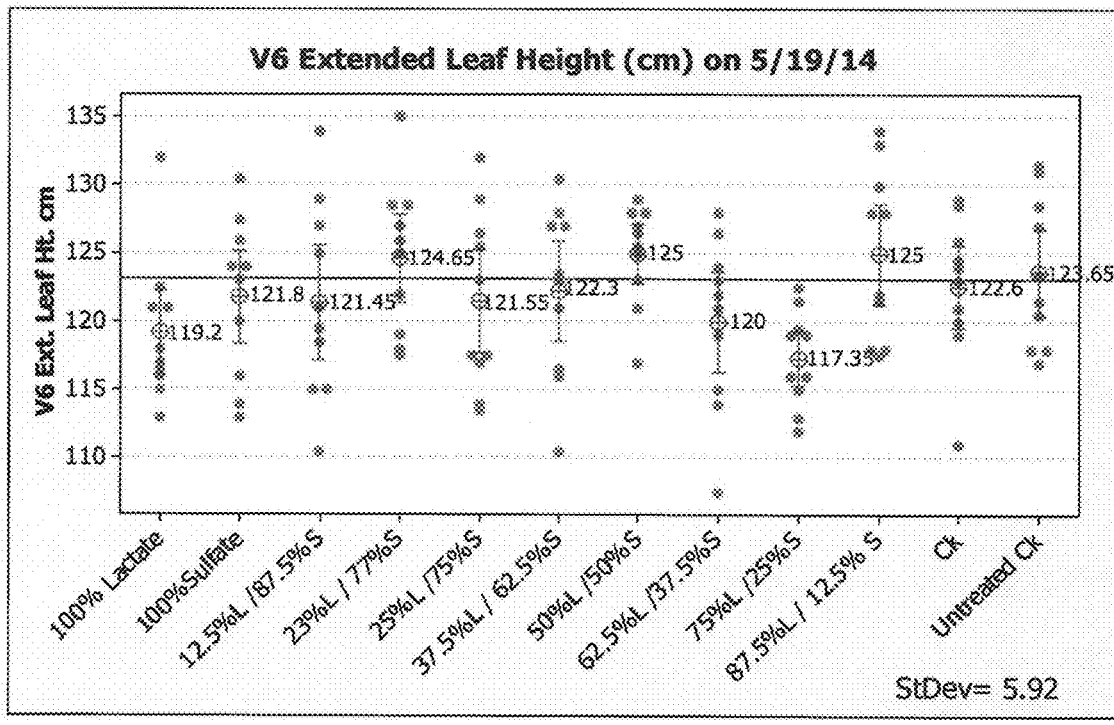
FIG. 10F illustrates extended leaf height data for corn seed pre-treatment studies, according to one or more embodiments of this disclosure.
Figure 10G:
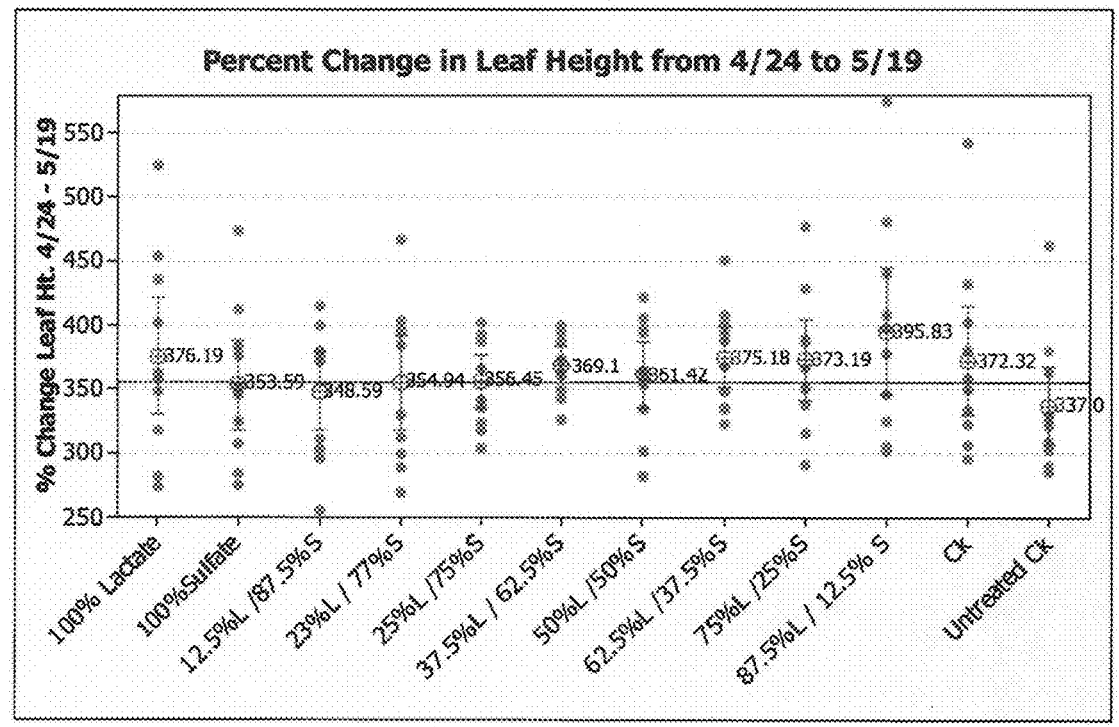
FIG. 10G illustrates leaf height data for corn seed pre-treatment studies, according to one or more embodiments of this disclosure.
Figure 10H:
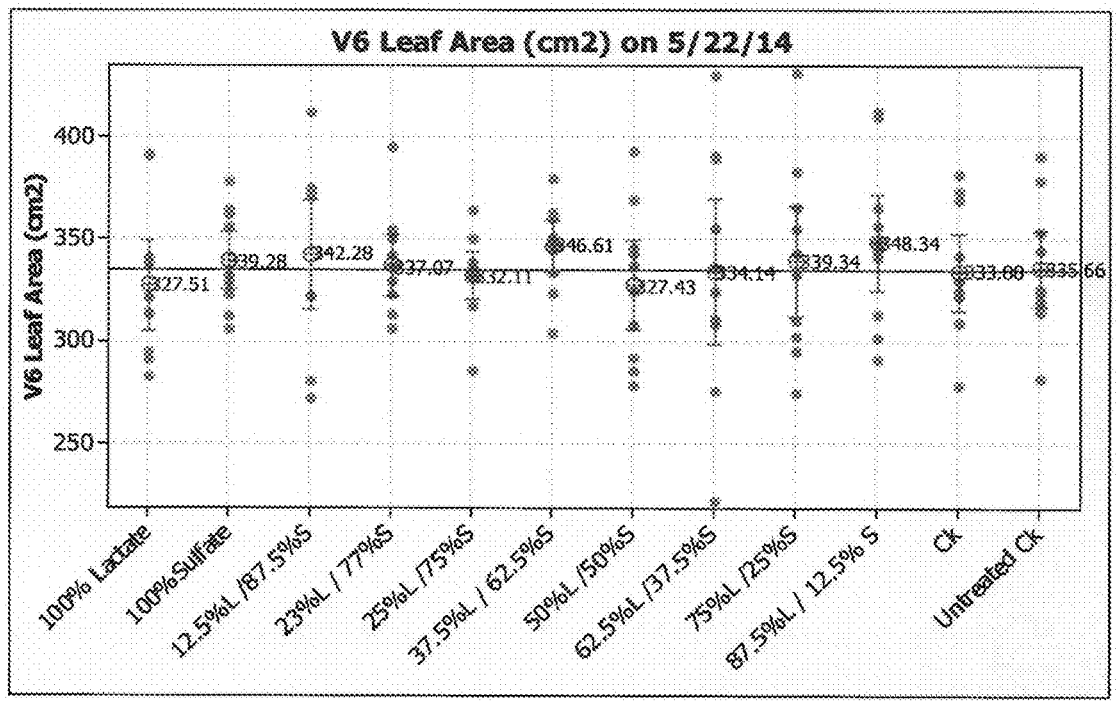
FIG. 10H illustrates leaf area data for corn seed pre-treatment studies, according to one or more embodiments of this disclosure.
Figure 10I:
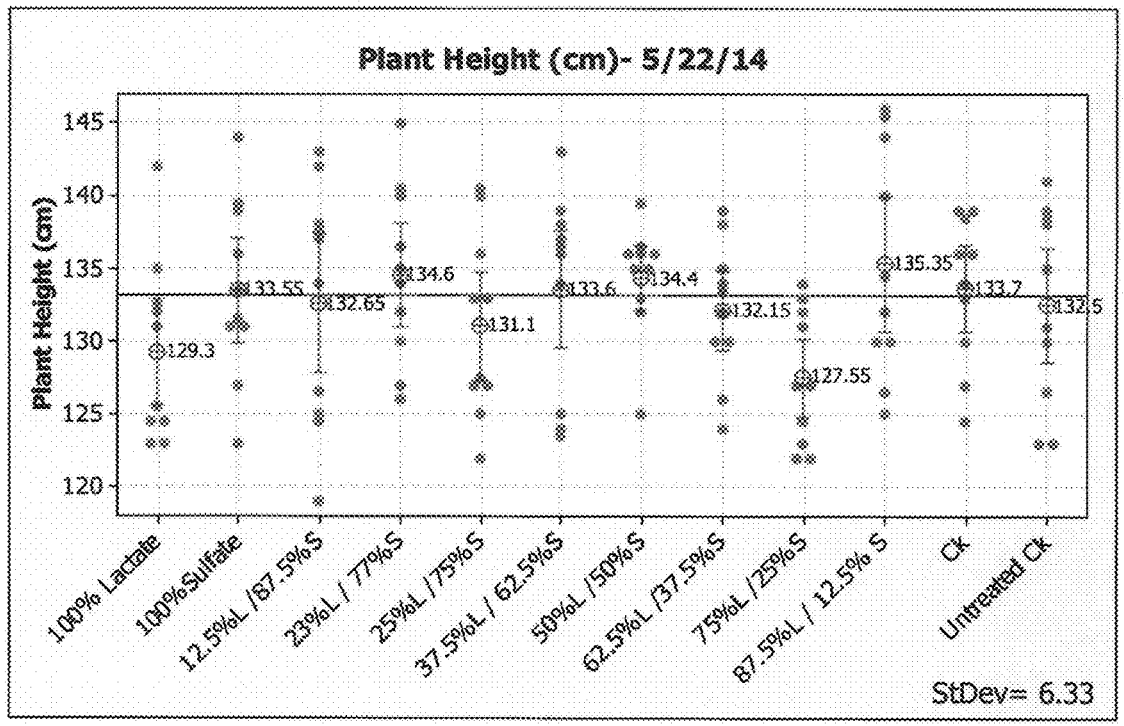
FIG. 10I illustrates plant height data for corn seed pre-treatment studies, according to one or more embodiments of this disclosure.
Figure 10J:
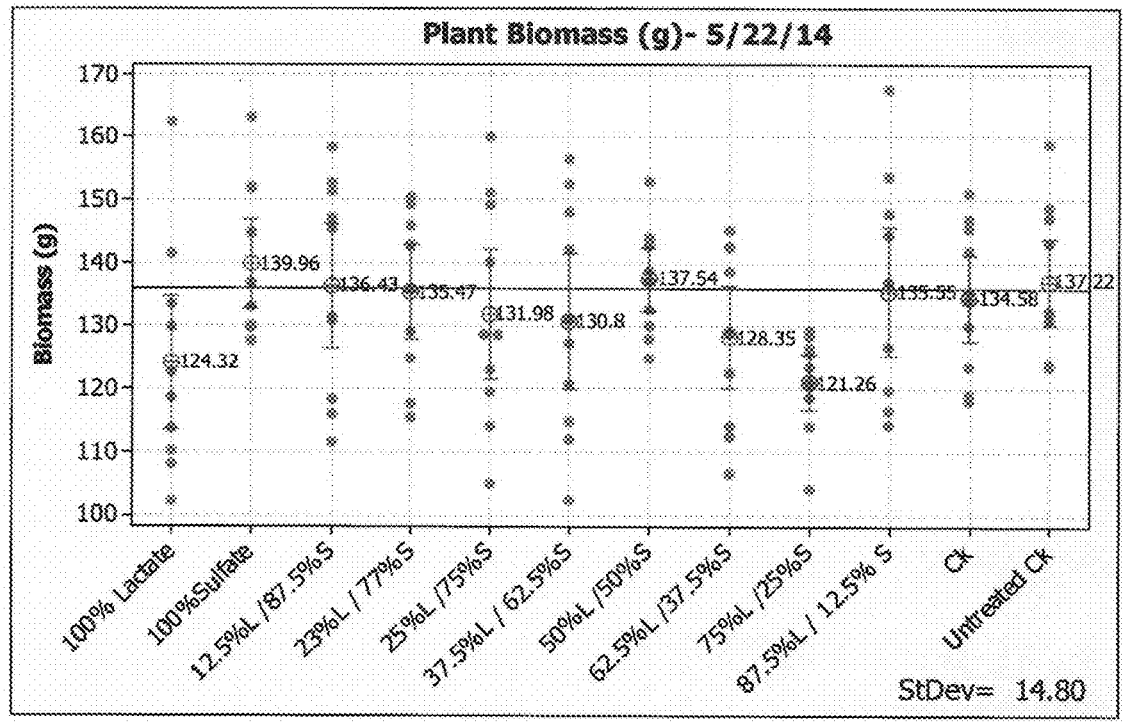
FIG. 10J illustrates plant biomass data for corn seed pre-treatment studies, according to one or more embodiments of this disclosure.
Figure 11A:
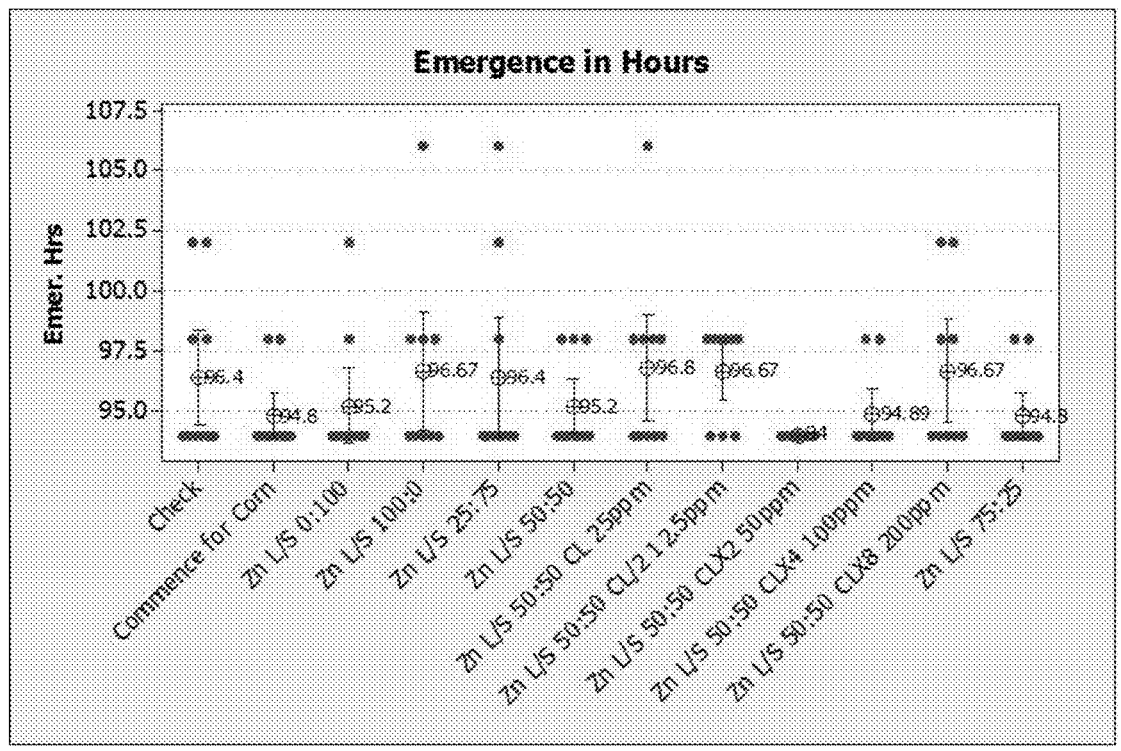
FIG. 11A illustrates emergence data for corn seed pre-treatment studies, according to one or more embodiments of this disclosure.
Figure 11B:
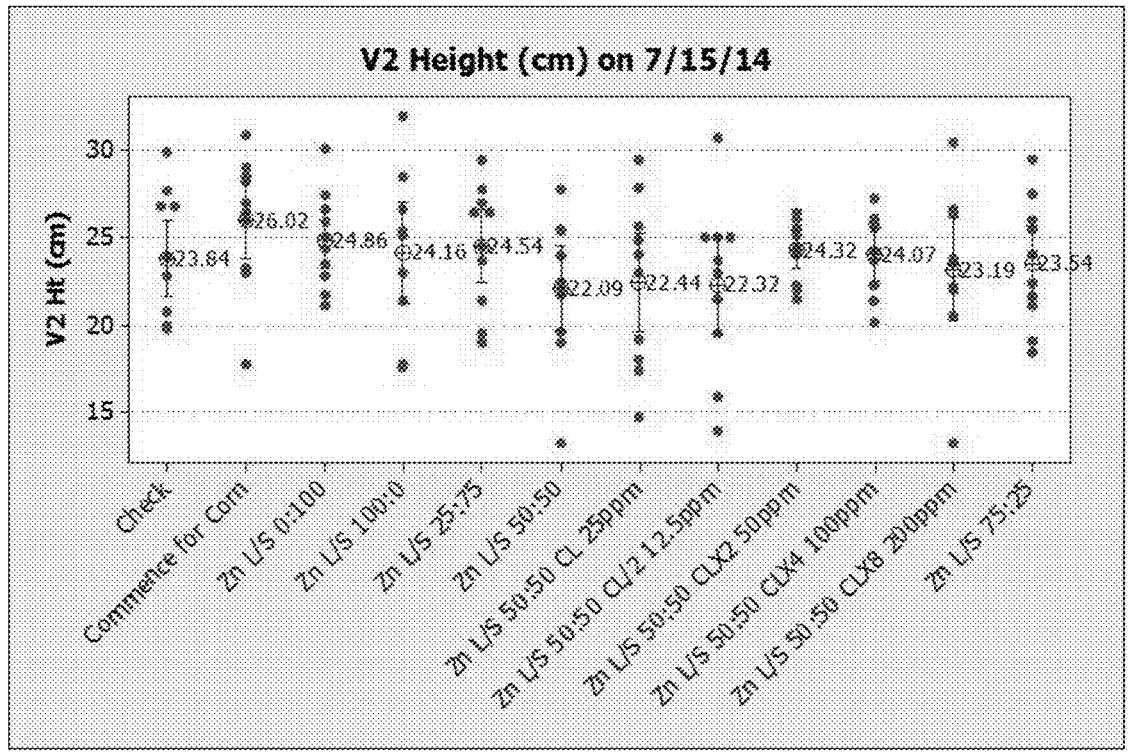
FIG. 11B illustrates height data for corn seed pre-treatment studies, according to one or more embodiments of this disclosure.
Figure 11C:
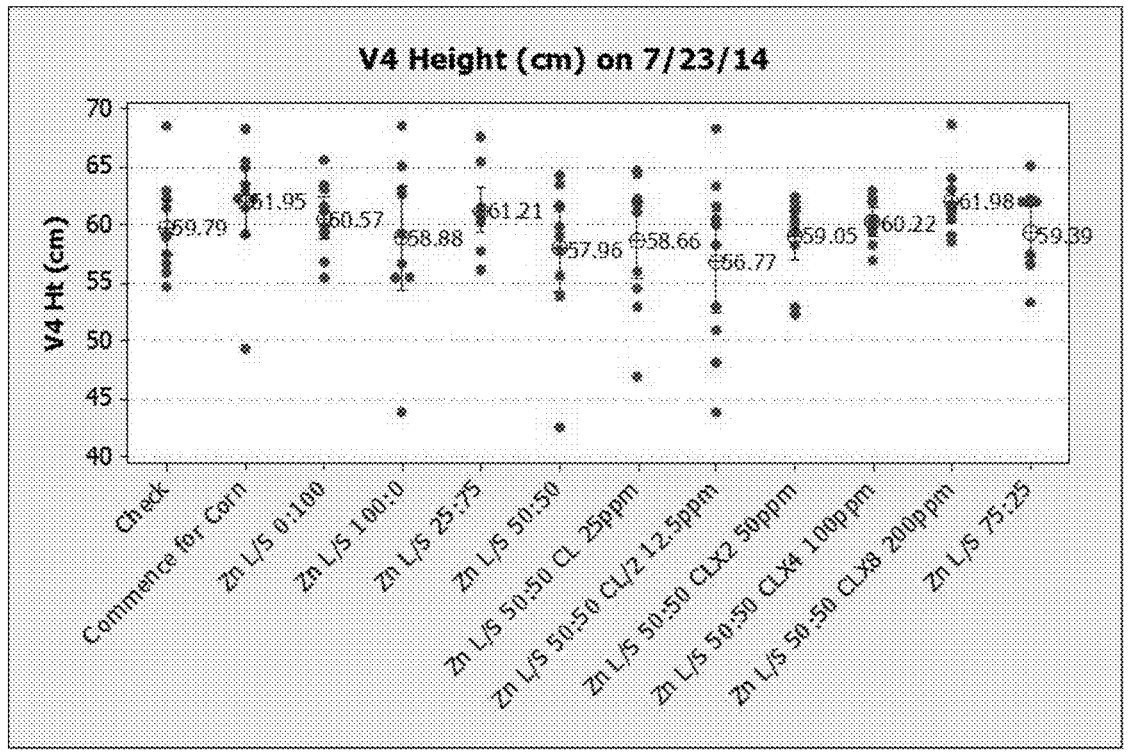
FIG. 11C illustrates height data for corn seed pre-treatment studies, according to one or more embodiments of this disclosure.
Figure 11D:
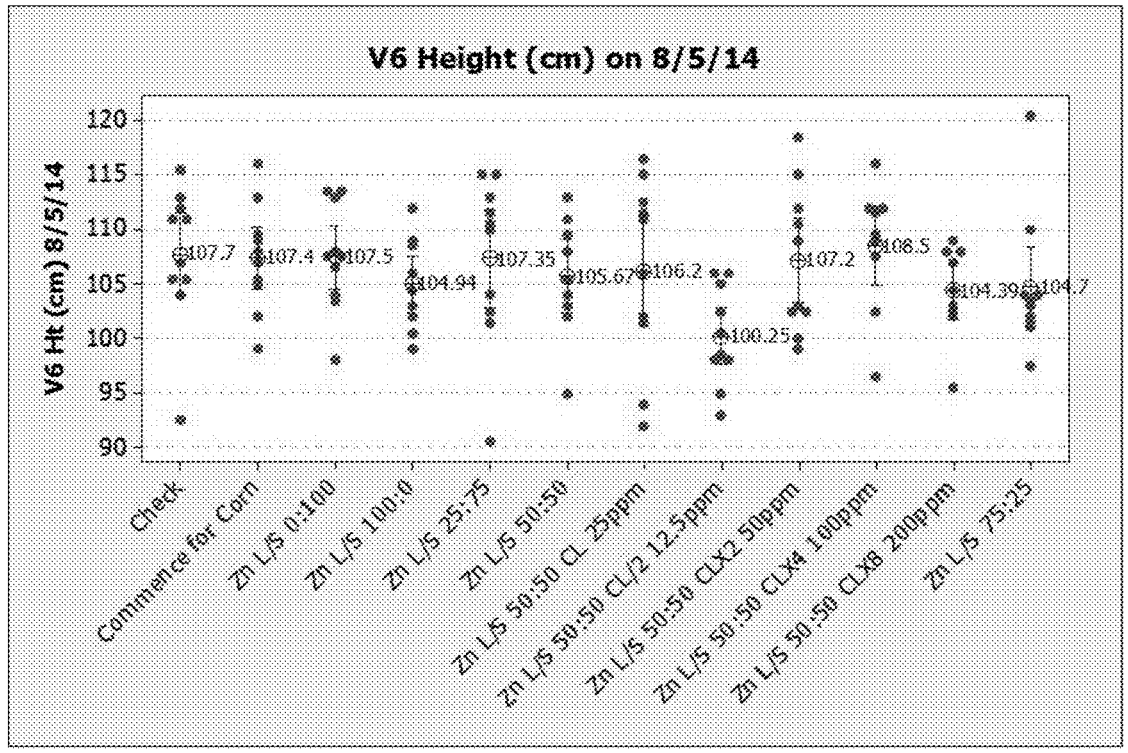
FIG. 11D illustrates height data for corn seed pre-treatment studies, according to one or more embodiments of this disclosure.
Figure 11E:
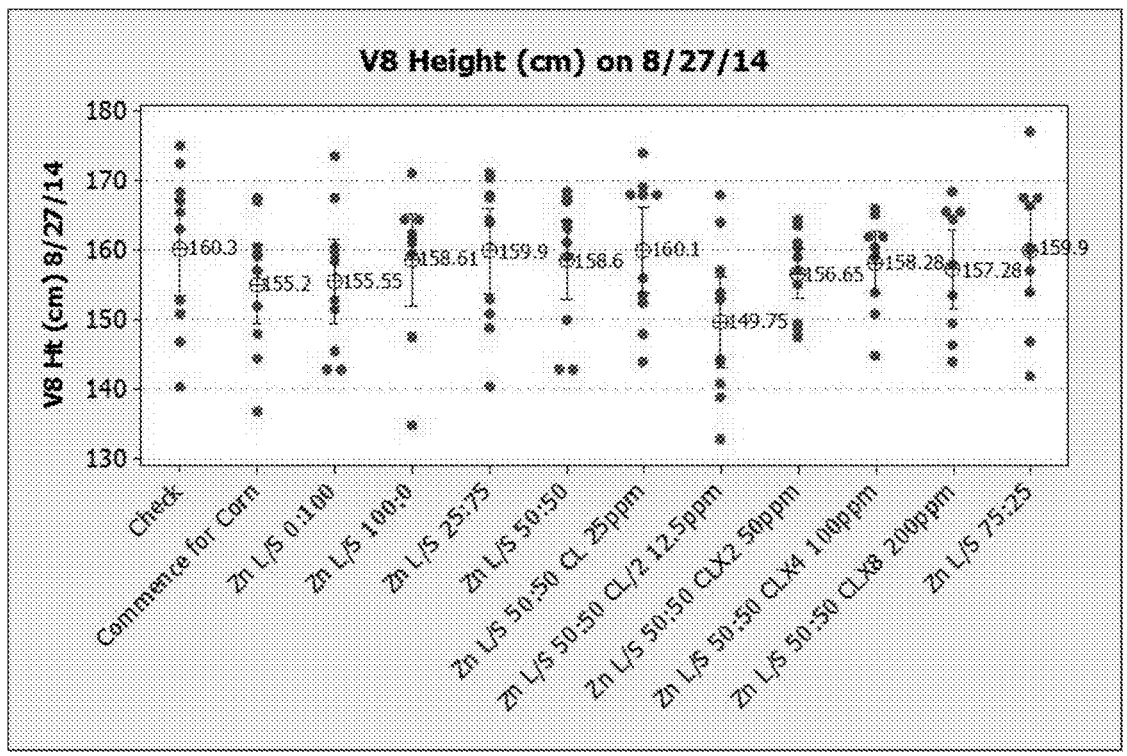
FIG. 11E illustrates height data for corn seed pre-treatment studies, according to one or more embodiments of this disclosure.
Figure 11F:
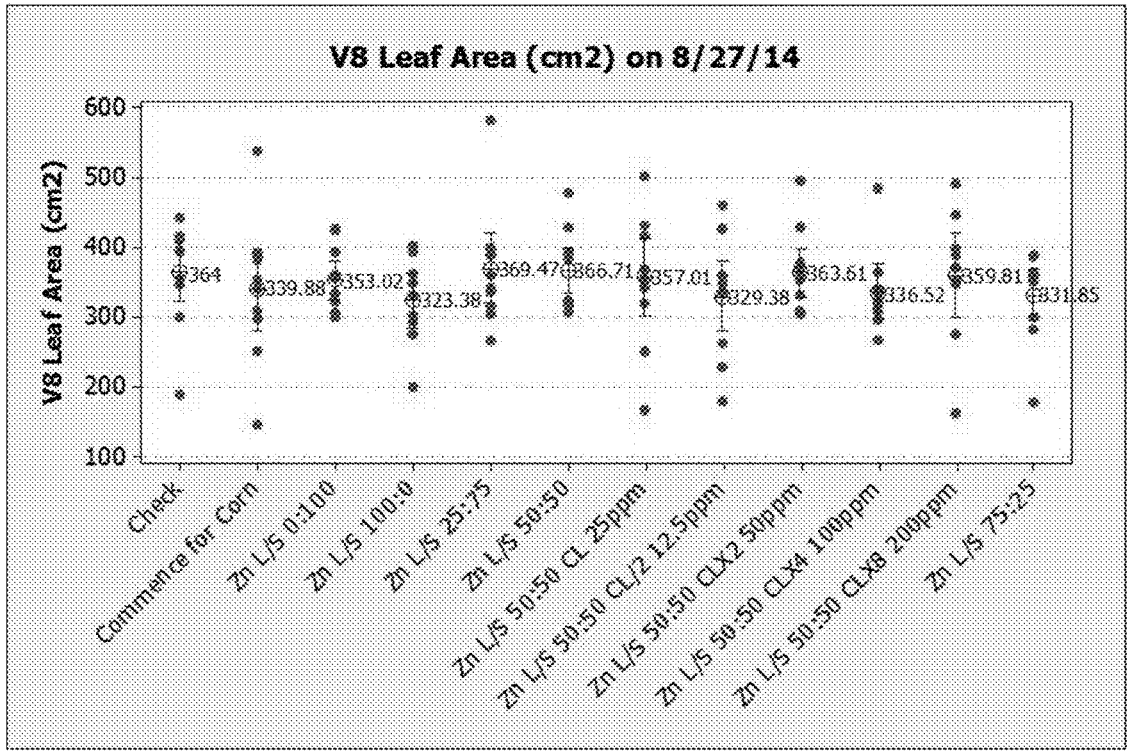
FIG. 11F illustrates leaf area data for corn seed pre-treatment studies, according to one or more embodiments of this disclosure.
Figure 11G:
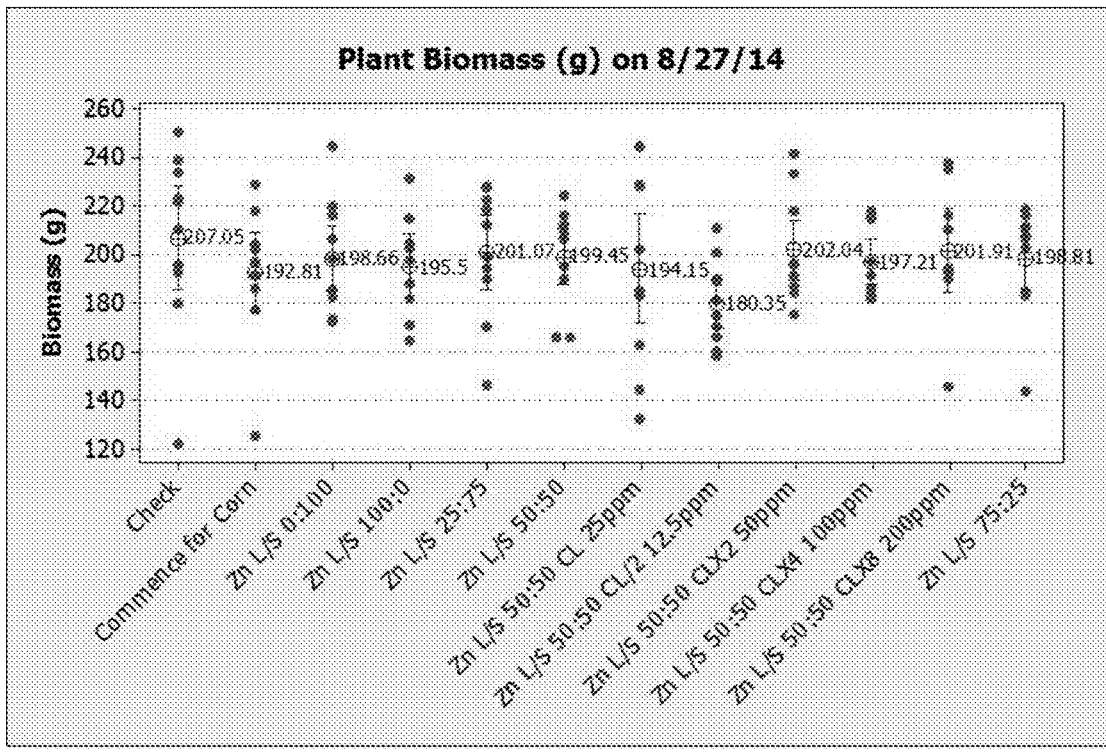
FIG. 11G illustrates plant biomass data for corn seed pre-treatment studies, according to one or more embodiments of this disclosure.
Figure 12A:
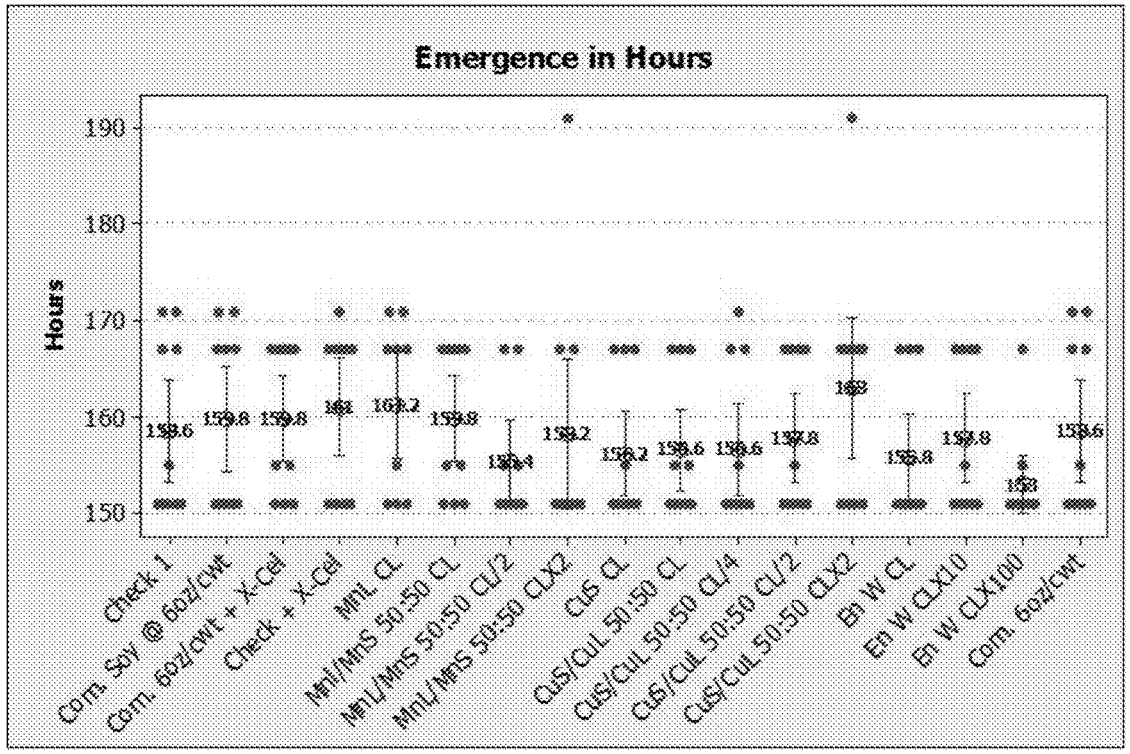
FIG. 12A illustrates emergence data for corn seed pre-treatment studies, according to one or more embodiments of this disclosure.
Figure 12B:
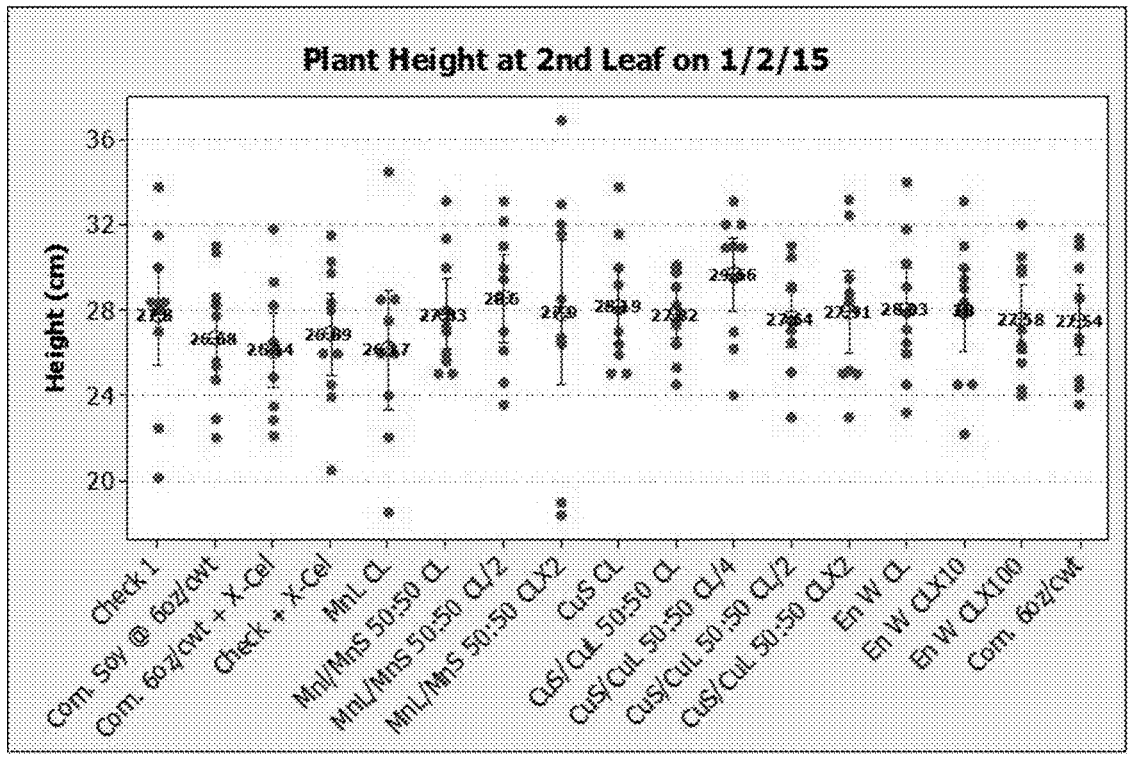
FIG. 12B illustrates height at second leaf data for corn seed pre-treatment studies, according to one or more embodiments of this disclosure.
Figure 12C:
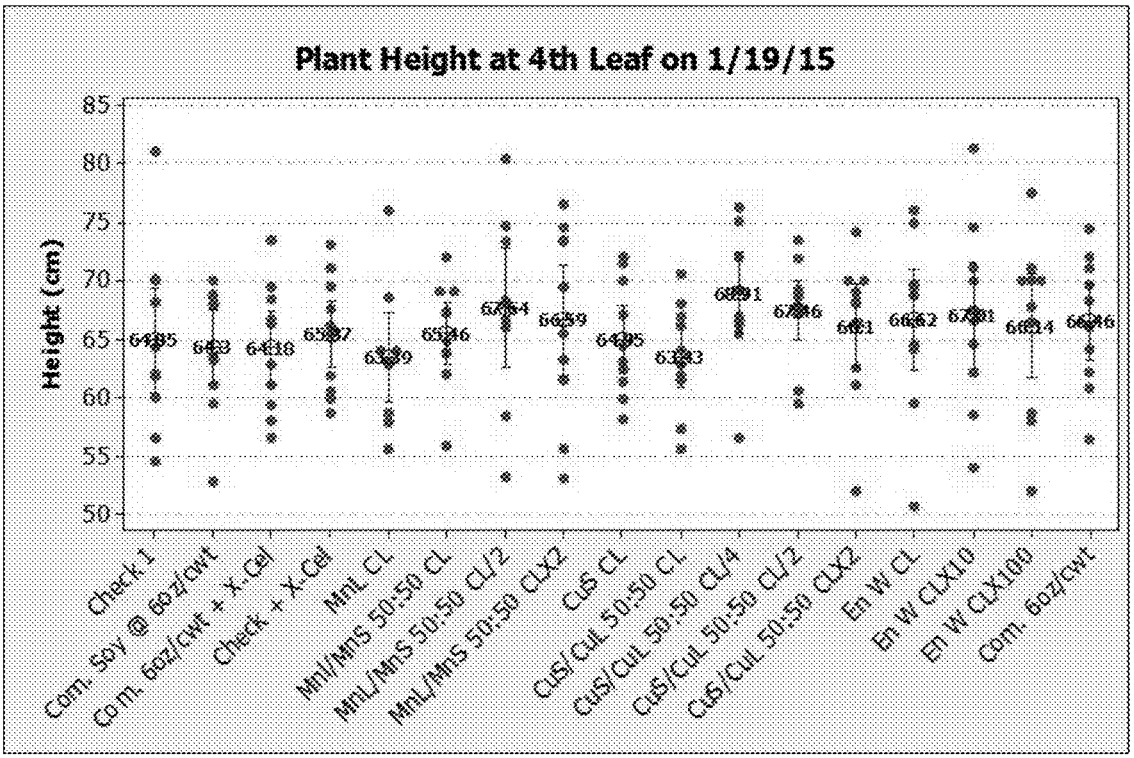
FIG. 12C illustrates height at fourth leaf data for corn seed pre-treatment studies, according to one or more embodiments of this disclosure.
Figure 12D:
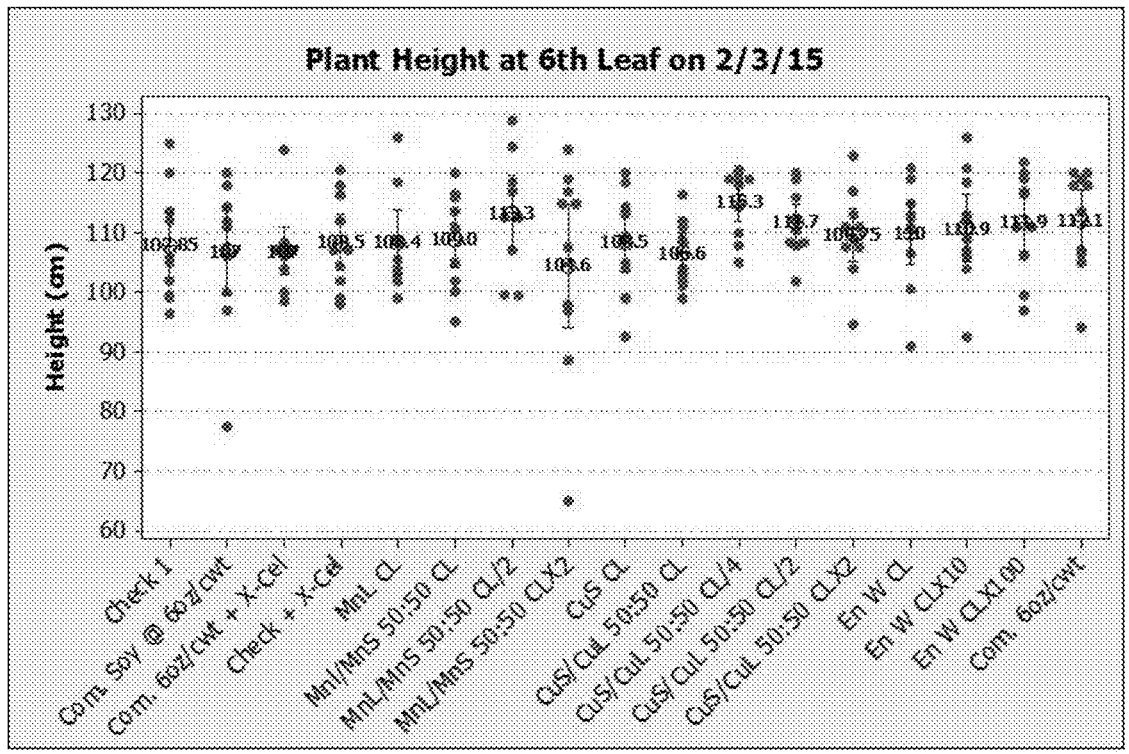
FIG. 12D illustrates height at sixth leaf data for corn seed pre-treatment studies, according to one or more embodiments of this disclosure.
Figure 12E:
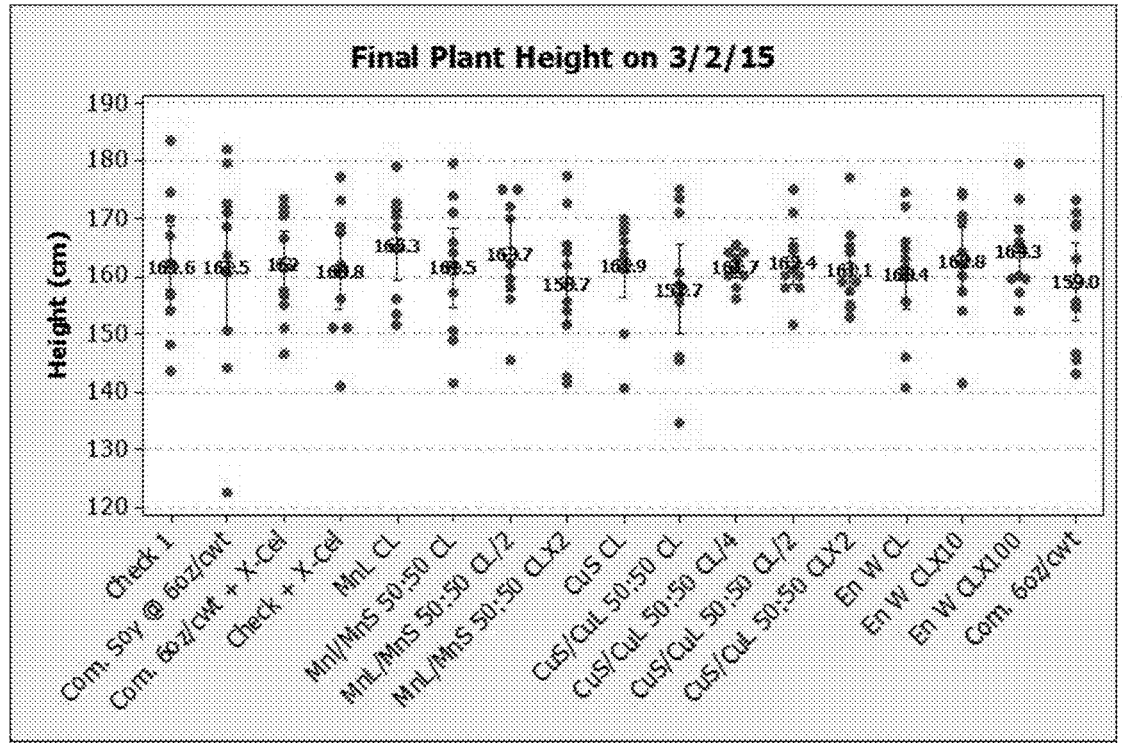
FIG. 12E illustrates final plant height data for corn seed pre-treatment studies, according to one or more embodiments of this disclosure.
Figure 12F:
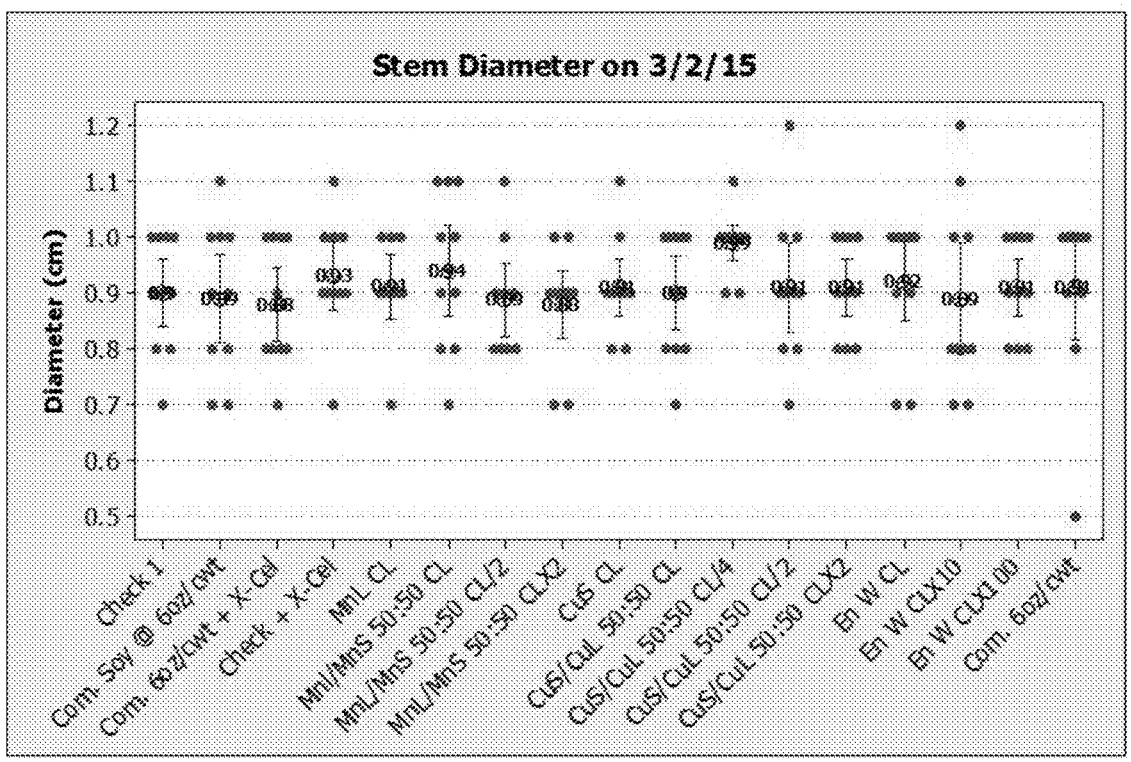
FIG. 12F illustrates stem diameter data for corn seed pre-treatment studies, according to one or more embodiments of this disclosure.
Figure 12G:
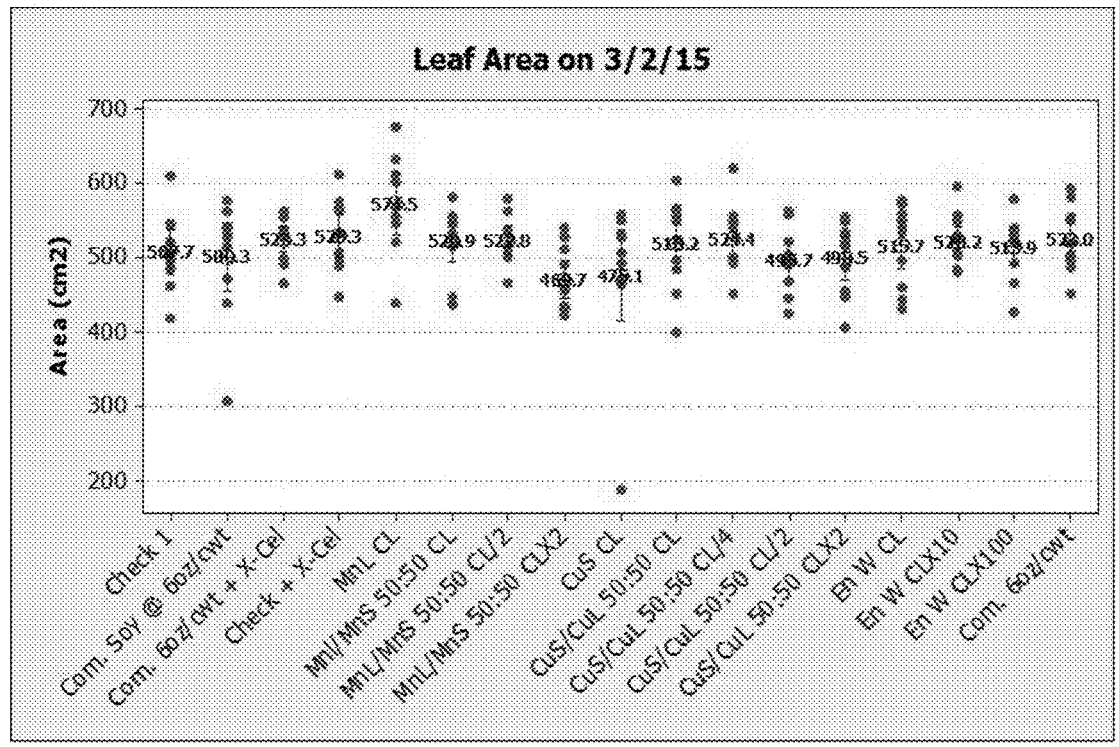
FIG. 12G illustrates leaf area data for corn seed pre-treatment studies, according to one or more embodiments of this disclosure.
Figure 12H:
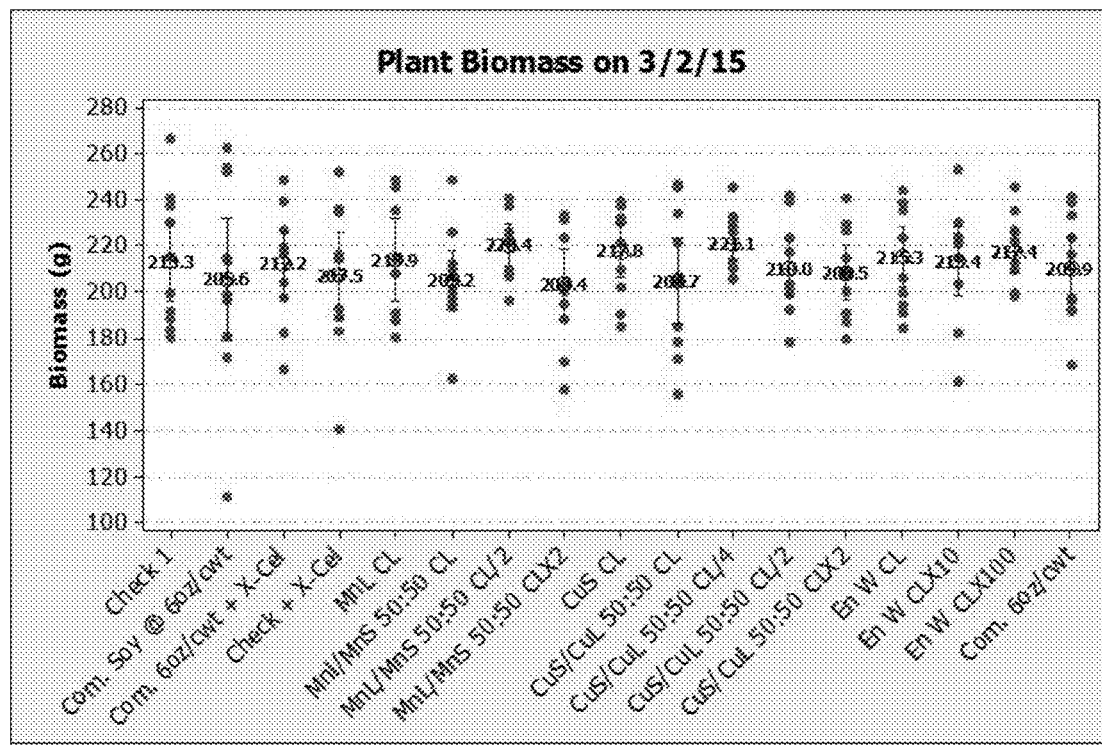
FIG. 12H illustrates plant biomass data for corn seed pre-treatment studies, according to one or more embodiments of this disclosure.
Figure 13A:
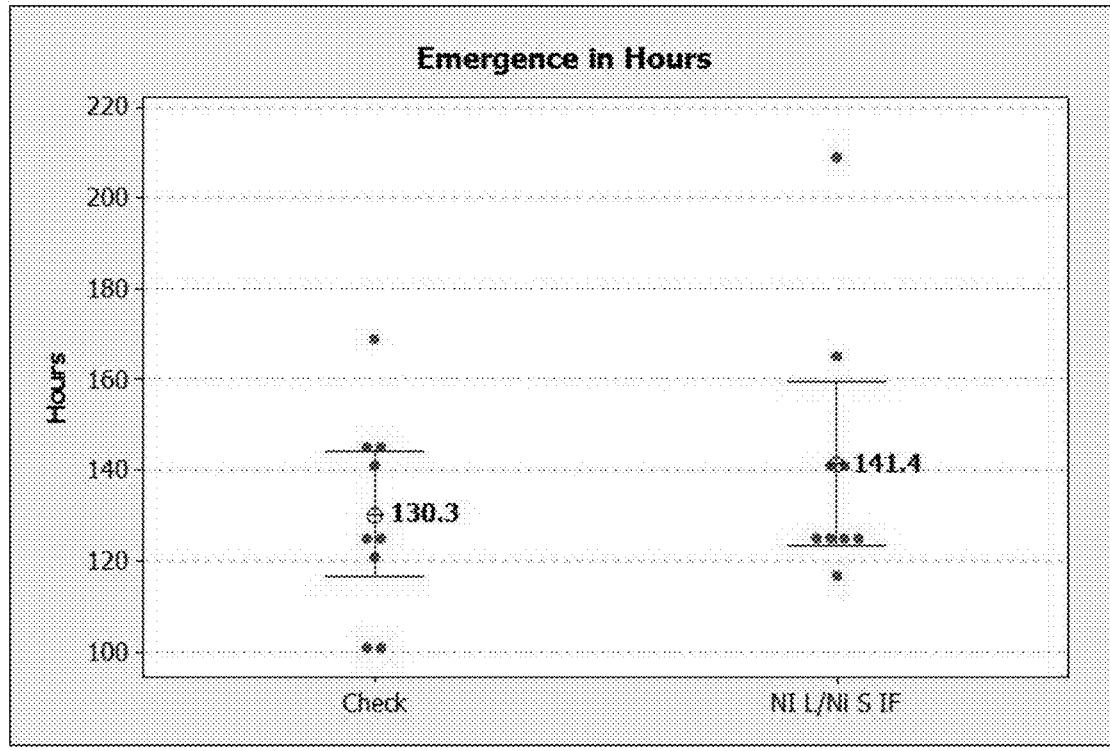
FIG. 13A illustrates emergence data for soybean seed pre-treatment studies, according to one or more embodiments of this disclosure.
Figure 13B:
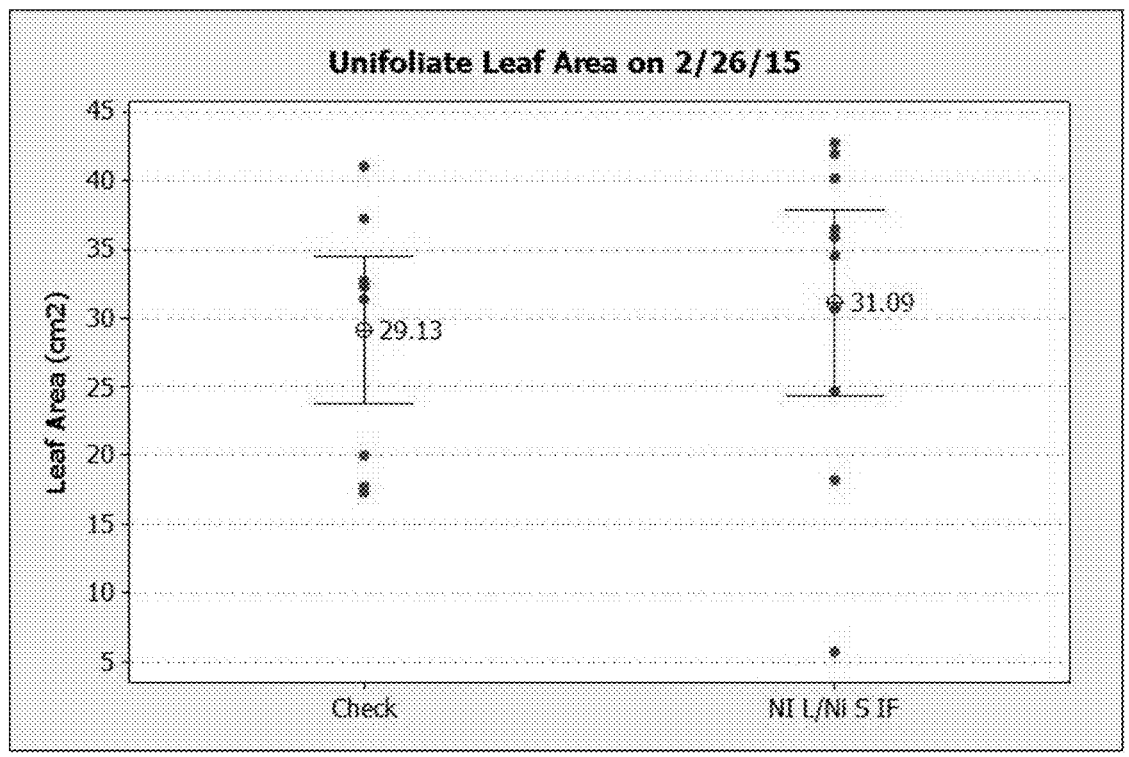
FIG. 13B illustrates unifoliate height data for soybean seed pre-treatment studies, according to one or more embodiments of this disclosure.
Figure 13C:
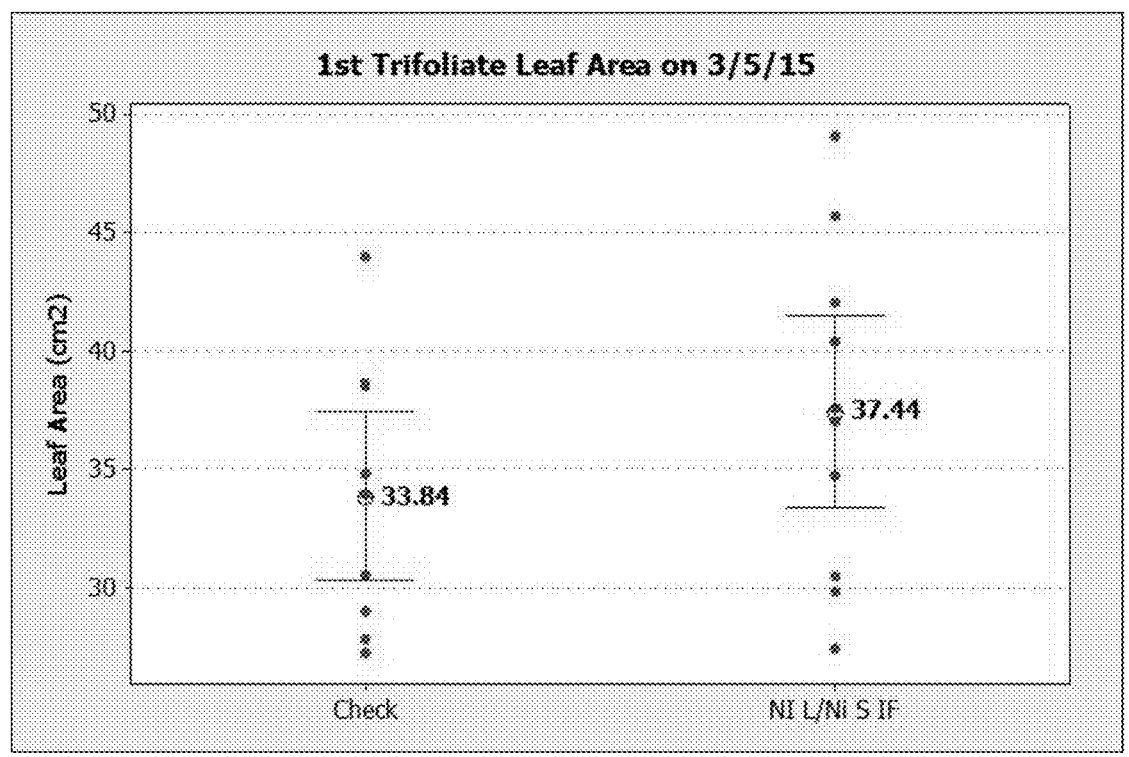
FIG. 13C illustrates $1^{st}$ trifoliate height data for soybean seed pre-treatment studies, according to one or more embodiments of this disclosure.
Figure 13D:
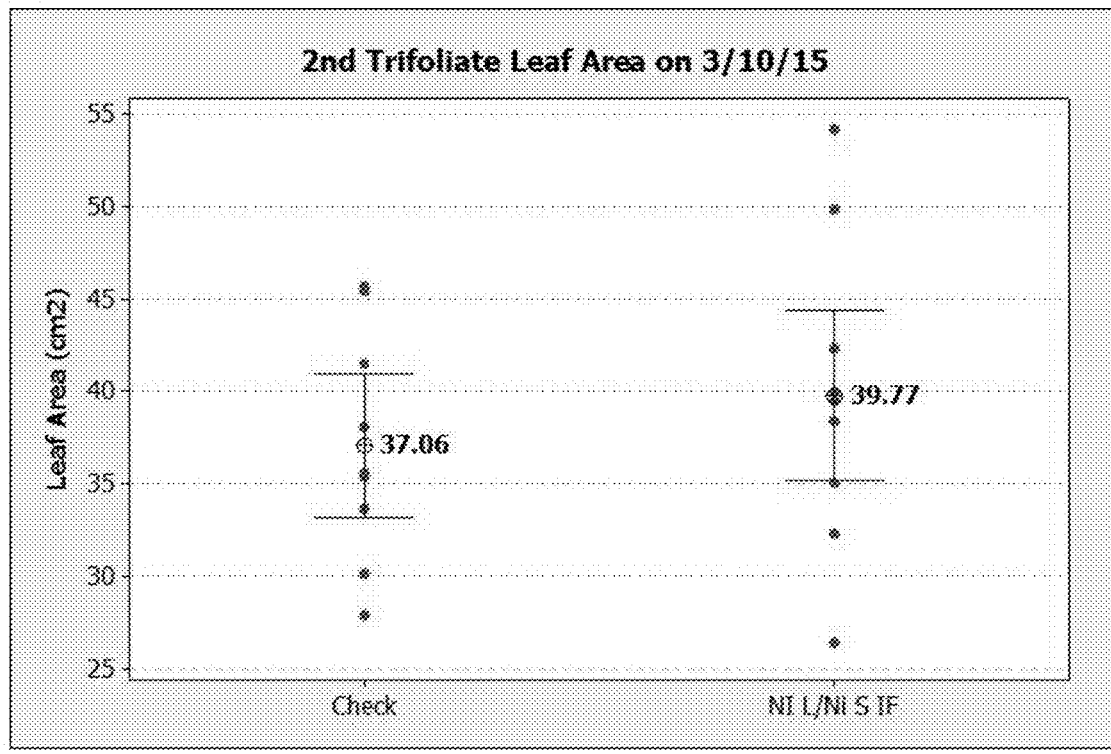
FIG. 13D illustrates $2^{nd}$ trifoliate height data for soybean seed pre-treatment studies, according to one or more embodiments of this disclosure.
Figure 13E:
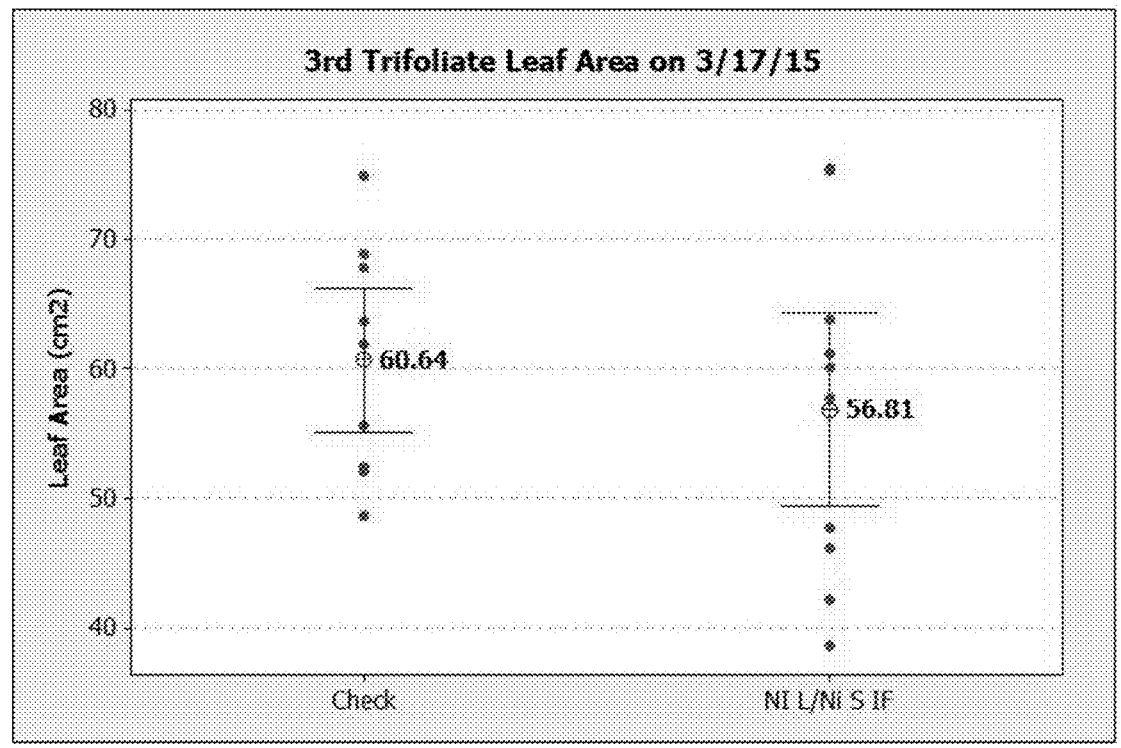
FIG. 13E illustrates $3^{rd}$ trifoliate height data for soybean seed pre-treatment studies, according to one or more embodiments of this disclosure.
Figure 13F:
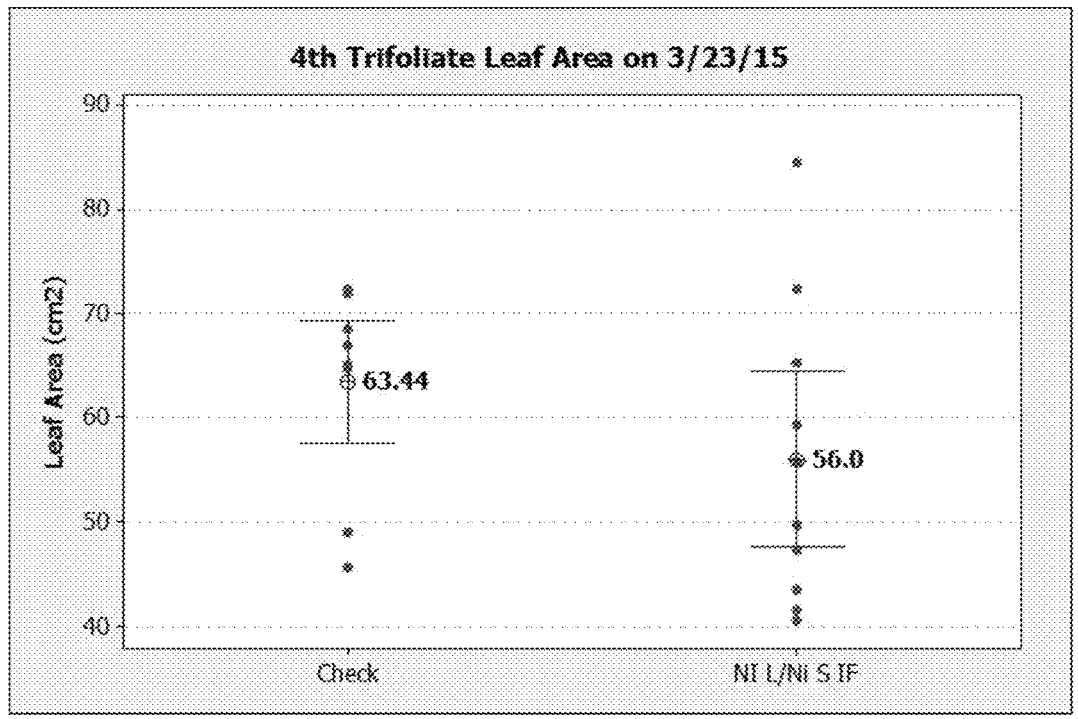
FIG. 13F illustrates $4^{th}$ trifoliate height data for soybean seed pre-treatment studies, according to one or more embodiments of this disclosure.
Figure 13G:
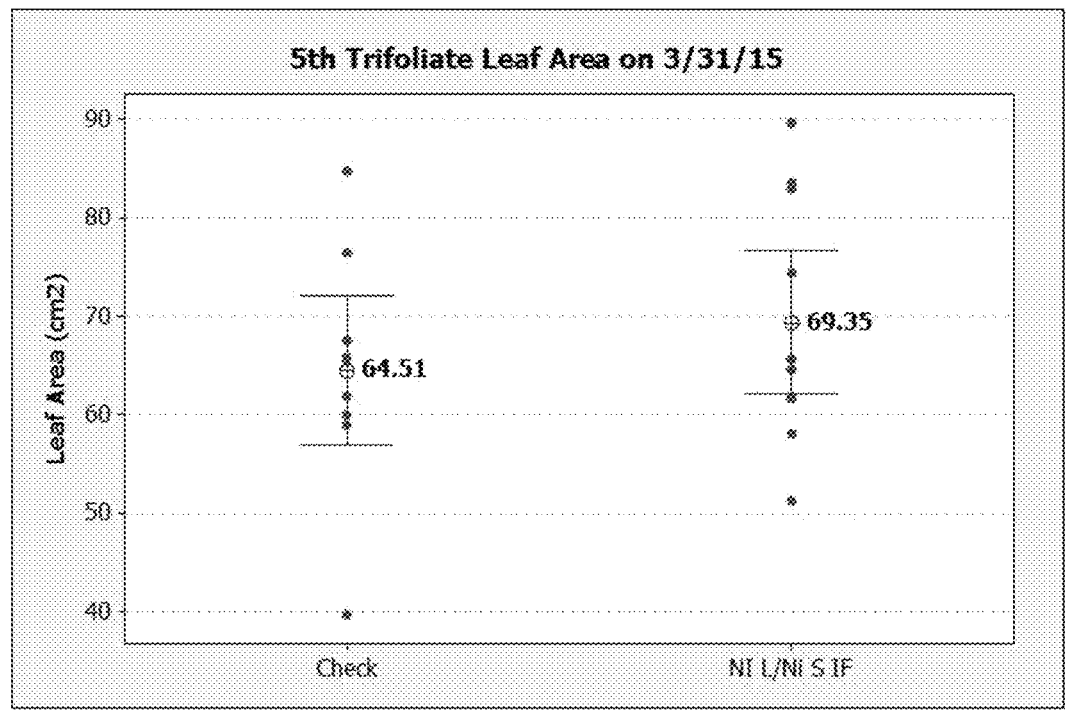
FIG. 13G illustrates $5^{th}$ trifoliate height data for soybean seed pre-treatment studies, according to one or more embodiments of this disclosure.

The study was conducted in a greenhouse with a complete randomized block format. Seeds were planted ¾ inches deep and watered consistently throughout the trial. Wet weight, leaf height, and NPK nutrient uptake were measured for seeds treated with all three compositions, and were also measured against a check (untreated seeds). All three compositions were also each combined with commercial products Optimize 400 and Quick Roots for further comparison in Leaf measurements and NPK nutrient uptake. There were 10 replications and 30 treatments. Wet weight was measured on two separate dates, Dec. 23, 2013 (48 days after planting) and Jan. 8, 2014 (64 days after planting), as shown in FIGS. 6A-B (the horizontal solid line represents the check). Leaf measurements were taken for true leaf size, 1st, 2nd, and 3rd trifoliate top and side leaf FIGS. 7A-F. Tissue samples were taken on two separate dates, "early" Dec. 23, 2013, as shown in FIGS. 8A-C (the horizontal solid line represents the check), and "late" Jan. 8, 2014, as shown in FIGS. 9A-C (the horizontal solid line represents the check), to measure NPK nutrient uptake. Midwest Labs conducted the complete nutrient analysis.

The nutrient uptake data in FIGS. 8A-C and FIGS. 9A-C show a general trend for the cobalt lactate composition to exhibit higher early nutrient uptake and lower late nutrient uptake. Conversely, the nutrient uptake data shown in FIGS. 8A-C and FIGS. 9A-C show a general trend for the cobalt sulfate composition to exhibit lower early nutrient uptake and higher late nutrient uptake. These data speak to the time-release aspects of the cobalt MCMS composition, which is backed by the nutrient uptake data shown in FIGS. 4A-F and FIGS. 5A-F. At most ai/a levels, the cobalt MCMS composition had more consistent, and often higher, nutrient uptake than the cobalt lactate composition and the cobalt sulfate composition. The data also show that the performance of commercial products, such as Optimize 400 and Quick Roots, can be enhanced when used in combination with one or more MCMS compositions, particularly cobalt MCMS compositions, described herein.

Example 3: Corn Seed Treatment

A study was conducted wherein a cobalt MCMS pre-treatment was applied to corn seeds at even incremental ratios (intervals of 12.5%) from 100%:0% cobalt sulfate:cobalt lactate to 0%:100% cobalt sulfate:cobalt lactate. This study, in part, follows Example 1 in order to determine the optimum first-order ratio of cobalt sulfate to cobalt lactate for use in various agricultural applications including seed pretreatments, in furrow applications, foliar applications, and others. The application rate of total cobalt in this trial is equivalent to the 100 g ai/a level of Example 1, without the other formula ingredients detailed in Table 4, with 1 acre being the equivalent of 50 lbs of seeds. "Active ingredient" refers to the total weight of all non-carrier components in the MCMS composition. In this case, the application rate amounts to 2.5 g elemental Co per acre and 100 ppm of elemental cobalt as applied to corn seed. The cobalt MCMS composition was applied to corn seeds in a simple lab container which was rolled by hand until all carrier liquid was absorbed by the seed. The study was conducted with a complete randomized block format in a greenhouse. Seeds were planted 1½ inches deep and watered consistently throughout the trial. There were 10 replications in each of 10 treatments and 2 checks.

Time to emergence, extended leaf height, leaf area, and plant height and plant biomass at harvest were measured for all treatments, including the untreated check, as shown in FIGS. 10A-J. The data shows that a combination of cobalt lactate and cobalt sulfate out-performs cobalt sulfate by itself, cobalt lactate by itself and the negative controls. Generally plant emergence is a key predictor of plan health, with faster emergence correlating to plant heigh, leaf area, biomass, and other factos. In this study, the sulfate:lactate combinations showed the quickest emergence at many different ratios. V6 extended leaf heights and leaf areas also showed good response from the cobalt combinations compared to the pure forms and the checks. Overall corn plant height at harvest showed superior plant performance at three ratios versus the checks and pure cobalt compounds. In summary the preponderance of plant response measurements favored the cobalt sulfate, cobalt lactate combination over the pure cobalt compounds and checks.

Example 4: Corn Seed Treatment

A study was conducted wherein a zinc MCMS pre-treatment was applied to corn seeds at even incremental ratios (intervals of 25%) from 100%:0% zinc sulfate:zinc lactate to 0%:100% zinc sulfate:zinc lactate. Total elemental zinc applied to seeds amounted to 25 ppm. Additionally, the amount of total elemental zinc applied to seeds was varied from 12.5 ppm to 200 ppm with a 50%:50: ratio of zinc sulfate:zinc lactate. The control application rate of total zinc in this trial (25 ppm elemental zinc as applied to seeds) was equivalent to that level of zinc when 100 g ai/a level of Example 1, without the other formula ingredients detailed in Table 4, with 1 acre being the equivalent of 50 lbs of seeds. "Active ingredient" refers to the total weight of all non-carrier components (e.g., the zinc-containing compounds) in the applied compositions. The zinc MCMS composition was applied to corn seeds in a simple lab container which was rolled by hand until all carrier liquid was absorbed by the seed. The study was conducted with a complete randomized block format in a greenhouse. Seeds were planted 1½ inches deep and watered consistently throughout the trial. There were 10 replications in each of 10 treatments and 2 checks.

Time to emergence, extended leaf heights, leaf area and plant height and plant biomass at harvest were measured for all treatments, including the positive and untreated checks as shown in FIGS. 11A-G. The data shows that a combination of zinc lactate and zinc sulfate out-performed zinc sulfate and zinc lactate alone. Of particular interest here are the trends in emergence time and harvest (V8) plant height, leaf area and biomass. Specifically, V8 leaf area showed two ratios of sulfate to lactate that exceeded the negative and positive controls and both pure zinc forms. One of those ratios was 50:50 sulfate:lactate which when tested at various total zinc levels showed better performance against one or more of the controls and the pure zinc compounds with respect to emergence hours, harvest plant height, harvest leaf area and biomass. The purpose of this trial was to demonstrate as has been demonstrated earlier with other trace minerals that the combination of zinc sulfate and zinc lactate out-performs the pure zinc compounds alone with respect to a number of plant growth parameters (corn) and to help optimize the overall level of zinc, a specific plant trace mineral, based upon the trial outcomes.

Example 5: Corn Seed Treatment

Examples 1-4 show that plant performance is improved with combinations of the lactate-sulfate forms of trace mineral micronutrients (e.g., cobalt and zinc). These results can be optimized in greenhouse settings for further product development which is translatable to field demonstrations. This Example 5 continues the lactate-sulfate testing for other trace mineral micronutrients including manganese and copper.

A study was conducted wherein manganese and copper MCMS pre-treatments were applied to corn seeds at 50:50 manganese sulfate:manganese lactate and 50:50 copper sulfate:copper lactate, following the 50:50 mineral ratio level found to be effective in previous trace mineral micronutrient studies. Total amounts of manganese and copper applied to the corn seeds were varied from levels similar to those in the previous examples up and down from one-half to twice the current level for manganese and from one-fourth to twice the current level for copper. The control application rates of total manganese and copper in this trial were equivalent to that level of those minerals when 100 grams per acre active "Commence for Corn" (denoted "Com." in FIGS. 12A-H) is applied to corn seed, though no other formula ingredients were included in this test except for several Commence positive controls. The "Com." composition is detailed in Table 7, and the "Com. Soy" composition is detailed in Table 8:

TABLE 7

Commence Composition ("Com.") for Example 5:

| Cobalt Sulfate/Lactate Composition | %/wt | grams |
|---|---|---|
| R.O. Water (Carrier) | 70.670 | 706.700 |
| Cobalt Lactate, Dihydrate (21.579% Co) | 2.800 | 28.000 |
| Cobalt Sulfate, Monohydrate (34.063% Co) | 5.650 | 56.500 |
| Ferric Sodium EDTA (13.26% Fe) | 9.380 | 93.800 |
| Manganese Lactate, Dihydrate (20.42% Mn) | 3.990 | 39.900 |
| Copper Sulfate, Pentahydrate (25.46% Cu) | 2.340 | 23.400 |
| Zinc Sulfate, Monohydrate (36% Zn) | 1.410 | 14.100 |
| Enzyme W | 0.010 | 0.100 |
| Larafeed Liquid (Commercial Product) | 0.940 | 9.400 |
| Saponix 5000 (Commercial Product) | 2.810 | 28.100 |
| Total | 100 | 1000 |

TABLE 8

Commence for Soy Composition ("Com. Soy") for Example 5:

| Cobalt Sulfate/Lactate Composition | %/wt | grams |
|---|---|---|
| R.O. Water (Carrier) | 53.367 | 533.670 |
| Cobalt Lactate, Dihydrate (21.579% Co) | 2.114 | 21.140 |
| Cobalt Sulfate, Monohydrate (34.063% Co) | 4.267 | 42.670 |
| Ferric Sodium EDTA (13.26% Fe) | 7.084 | 70.840 |
| Manganese Lactate, Dihydrate (20.42% Mn) | 3.013 | 30.130 |
| Copper Sulfate, Pentahydrate (25.46% Cu) | 1.767 | 17.670 |
| Zinc Sulfate, Monohydrate (36% Zn) | 1.065 | 10.650 |
| Enzyme W | 0.080 | 0.080 |
| Larafeed Liquid (Commercial Product) | 0.711 | 7.110 |
| Saponix 5000 (Commercial Product) | 2.122 | 21.22 |
| Regano 4XL | 12.241 | 122.410 |
| Ralco Select | 12.241 | 122.410 |
| Total | 100 | 1000 |

Regano 4XL comprises 67.9 wt. % RO water, 12.75 wt. % commercial product Larafeed powder (Larch tree arabinogalactan) extract, 0.60 wt. % TIC gum, and 18.75 wt. % essential oils. The essential oils fraction comprised 60.4 wt. % carvacrol, 10.8 wt. % thymol, 9.9 wt. % paracymene, and 18.9 secondary oil constituents from oregano oil and thyme oil. Ralco select comprises 67.9 wt. % RO water, 12.75 wt. % commercial product Larafeed powder (Larch tree arabinogalactan) extract, 0.60 wt. % TIC gum, and 18.75 wt. % essential oils. The essential oils fraction comprised 66.66% thyme oil and 33.33% synthetic cinnamaldehyde, with a total assay of 0.13% wt. % carvacrol, 30.5 wt. % thymol, 18.0 wt. % para-cymene, 18.0 wt. % other secondary thyme oil constituents, and 33.33 wt. % cinnamaldehyde.

In this case, "active ingredient" refers to the total weight of all non-carrier components in the MCMS composition, and 1 acre is the equivalent of 50 lbs of seeds. The manganese and copper MCMS compositions were applied to corn seeds in a simple lab container which was rolled by hand until all carrier liquid was absorbed by the seed. The study was conducted with a complete randomized block format in a greenhouse. Seeds were planted 1½ inches deep and watered consistently throughout the trial. There were 10 replications in each of 10 treatments and several checks.

Time to emergence, extended leaf heights, leaf area and plant height and plant biomass at harvest were measured for all treatments, including the positive and untreated checks, as shown in FIGS. 12A-H.

The data shows that the 50:50 mineral weight combinations of lactates and sulfates for manganese and copper out-performed the pure form of either mineral alone as currently formulated into the Commence for Corn (manganese lactate and copper sulfate). Plant emergence was quickest for the manganese 50:50 combination at one-half its current Commence level, bettering the negative and positive controls and pure manganese lactate. This test level continued to out-perform negative and positive controls and pure manganese lactate on subsequent leaf height measurements, final plant height and perhaps most importantly plant biomass. For copper one-fourth the current Commence level yielded several top leaf heights, stem diameter, leaf area and biomass at harvest compared to the current level of copper sulfate, the negative controls and the positive controls. It was surprising to see significantly lower levels of both manganese and copper out-perform higher levels previously tested with positive results.

Further, this trial evaluated what was once considered a relatively minor formulation constituent, Enzyme W, at various levels compared to its current formulation level. This is an enzyme cocktail product purchased from AB Technologies in Oregon by Ralco Agnition which is sold as an animal feed. The cocktail enzyme package contains alpha-amylase, protease, cellulase, lipase and pectinase. Because it is used at very low levels, plant response was tested at ten and one hundred times the current formulation level. At one hundred times its current level Enzyme W recorded the fastest of all emergence times in this entire set of treatments. It was not until final plant height and biomass though that superior performance was once again observed compared to lower levels of Enzyme W. At that level though only the manganese and copper 50:50 sulfate:lactate forms performed better, making it superior also to both negative and positive control treatments. Because the enzymes are plated on what appeared to be an insoluble carrier the direction for further work is under study and will be further with even better results expected when paired with a more soluble carrier such as sugar, dextrose, sucrose, and others.

In the greenhouse trials have begun investigating the plant response to chemical wetting agents, in this trial a non-ionic wetting agent called X-Celerate from Royal Oil Co in Fort Worth, Tex. This product is advertised for use with herbicides, pesticides and more. It was added to one of the positive and one of the negative controls but in seed treatment and not as a foliar application aide. A small response may have been seen and further work is needed to document its potential plant response.

Example 6: Soy Seed Treatment

A study was conducted wherein a nickel MCMS pre-treatment was applied to soy at a nickel sulfate:nickel lactate ratio of 50%:50%. This study follows the 50:50 mineral ratio level found to be effective in previous trace mineral micronutrient studies, although many other ratios are believed to be effective. In particular, nickel sulfate:nickel lactate ratios between 25%:75% to 75%:25% are believed to be effective ratios ranges, in addition to broader ranges including 12.5%:87.5% to 87.5%:12.5%. The application rate of total nickel in this trial is equivalent to the 100 g ai/a level of Example 1, without the other formula ingredients detailed in Table 4, with 1 acre being the equivalent of 50 lbs of seeds. "Active ingredient" refers to the total weight of all non-carrier components in the MCMS composition. In this case, the application rate amounts to 2.5 g elemental Ni per acre and 100 ppm of elemental Ni as applied to soy beans. The nickel MCMS composition was applied to soy beans in a simple lab container which was rolled by hand until all carrier liquid was absorbed by the bean. The study was conducted with a complete randomized block format in a greenhouse. Beans were planted ¾ inches deep and watered consistently throughout the trial. There were 10 replications of the nickel sulfate nickel lactate treatment, and 10 replications of the 1 check.

Time to emergence, and height at the unifoliate, $1^{st}$ trifoliate, $2^{nd}$ trifoliate, 3rd trifoliate, and $4^{th}$ trifoliate stages were measured for the treated beans and the untreated check, as shown in FIGS. 13A-F. The data shows that a combination of nickel lactate and nickel sulfate out-performs the negative control. All of the foregoing results herein suggest that a combination of nickel lactate and nickel sulfate, at various ratios, will out-perform individual treatments of nickel sulfate and individual treatments of nickel lactate.

What is claimed is:

1. A seed, soil, or plant treatment composition, the composition comprising:
   present up to 12% by weight of a combination of cobalt sulfate and cobalt lactate;
   present up to 9% by weight of a combination of manganese sulfate and manganese lactate, wherein the weight ratio of manganese sulfate to manganese lactate in the composition is within a range of 10:90-75:25; and
   present up to 2% by weight of a combination of zinc sulfate and zinc lactate, wherein the weight ratio of zinc sulfate to zinc lactate in the composition is within a range of 10:90-75:25;
   wherein all percentages by weight are based on the total weight of the composition.

2. The treatment composition of claim 1, further comprising an additional combination of a mineral salt and a mineral chelate, wherein the mineral is nickel, iron, magnesium, calcium, molybdenum, scandium, selenium, titanium, vanadium, chromium, aluminum, tin, nickel or copper.

3. The treatment composition of claim 2, wherein the mineral salt comprises a sulfate.

4. The treatment composition of claim 2, wherein the mineral chelate comprises a mineral lactate.

5. The treatment composition of claim 2, wherein an anion of the mineral salt is one of bromide, chloride, fluoride, carbonate, hydroxide, nitrate, oxide, phosphate, sulfate, formate, acetate, propionate, butyrate, oxalate, citrate, malate, lactate, or tartrate.

6. The treatment composition of claim 2, wherein the chelant of the mineral chelate is one of lactate, acetate, propionate, butyrate, ethylene diamine, or EDTA.

7. The treatment composition of claim 1, further comprising one or more commercial seed, soil, or plant treatment compositions.

8. The treatment composition of claim 1, further comprising an adherent.

9. The treatment composition of claim 1, further comprising one or more enzymes.

10. The treatment composition of claim 1, further comprising one or more pesticides with the proviso that the pesticide is not copper hydroxide or copper sulfate.

11. The treatment composition of claim 1, further comprising one or more chemical wetting agents.

12. The treatment composition of claim 1, wherein the composition is nitrogen free.

13. The treatment composition of claim 1, wherein the composition is iron free.

14. The treatment composition of claim 1, further comprising an additional salt or additional chelate of cobalt, manganese, or zinc; wherein an anion of the additional salt is selected from the group consisting of bromide, oxalate, chloride, fluoride, carbonate, hydroxide, nitrate, oxide, and phosphate, and wherein the chelant of the additional chelate is selected from the group consisting of acetate, propionate, butyrate, ethylene diamine, and EDTA.

15. The composition of claim 1, further comprising up to 3% by weight copper lactate.

16. A method of treating a seed, soil, or plant, the method comprising:
   applying a treatment composition to one or more of a seed, soil, and a plant, wherein the treatment composition comprises:
   present up to 12% by weight of a combination of cobalt sulfate and cobalt lactate;
   present up to about 9% by weight of a combination of manganese sulfate and manganese lactate, wherein the weight ratio of manganese sulfate to manganese lactate in the composition is within a range of 10:90-75:25; and
   present up to 2% by weight of a combination of zinc sulfate and zinc lactate, wherein the weight ratio of zinc sulfate to zinc lactate in the composition is within a range of 10:90-75:25;
   wherein all percentages by weight are based on the total weight of the composition.

17. The method of claim 16, wherein the the treatment composition promotes one or more of seed growth, seed germination, microbial catalyzation, plant health, seed and plant drought resistance, enhanced plant health consistency, and steady bioavailability of nutrients in and around a seed, soil, or plant.

18. The composition of claim 16, further comprising up to 3% by weight copper lactate.

19. A liquid seed, soil, or plant treatment composition, the composition comprising:
   present up to 12% by weight of the total composition of a combination of cobalt sulfate and cobalt lactate;
   present up to about 9% by weight of a combination of manganese sulfate and manganese lactate, wherein the weight ratio of manganese sulfate to manganese lactate in the composition is within a range of 10:90-75:25;
   present up to 2% by weight of a combination of zinc sulfate and zinc lactate, wherein the weight ratio of zinc sulfate to zinc lactate in the composition is within a range of 10:90-75:25; and
   at least 50% by weight of a liquid;
   wherein all percentages by weight are based on the total weight of the composition.

20. The composition of claim 19, further comprising up to 3% by weight copper lactate.

* * * * *